US010609726B2

(12) United States Patent
Hosseini et al.

(10) Patent No.: US 10,609,726 B2
(45) Date of Patent: *Mar. 31, 2020

(54) DOWNLINK AND UPLINK TRANSMISSIONS FOR HIGH RELIABILITY LOW LATENCY COMMUNICATIONS SYSTEMS

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US); Alberto Rico Alvarino, San Diego, CA (US); Hao Xu, Beijing (CN); Jing Sun, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,683

(22) Filed: Mar. 19, 2018

(65) Prior Publication Data

US 2018/0270853 A1 Sep. 20, 2018

Related U.S. Application Data

(60) Provisional application No. 62/474,040, filed on Mar. 20, 2017.

(51) Int. Cl.
*H04W 72/12* (2009.01)
*H04W 76/11* (2018.01)
(Continued)

(52) U.S. Cl.
CPC ....... *H04W 72/1289* (2013.01); *H04L 1/0003* (2013.01); *H04L 1/0009* (2013.01);
(Continued)

(58) Field of Classification Search
CPC ......... H04W 72/1289; H04W 72/1278; H04W 72/12; H04W 72/1226; H04W 72/1205;
(Continued)

(56) References Cited

U.S. PATENT DOCUMENTS

2010/0278121 A1* 11/2010 Chun ................ H04L 1/1887
370/329
2013/0044713 A1* 2/2013 Suh .................. H04L 5/0048
370/329
(Continued)

FOREIGN PATENT DOCUMENTS

WO    WO-2016143968 A1    9/2016

OTHER PUBLICATIONS

Nokia, On design of DL control channel for shorter TTI operation, R1-163267, published in 2016 (Year: 2016).*
(Continued)

*Primary Examiner* — Jeffrey M Rutkowski
*Assistant Examiner* — Luna Weissberger
(74) *Attorney, Agent, or Firm* — Holland & Hart LLP

(57) ABSTRACT

Methods, systems, and devices for wireless communication are described. Wireless communications systems as described herein may be configured to support several service types with different latency, reliability, or throughput rates or standards. One such service type may be referred to as ultra-reliable, low-latency communications (URLLC). Enhancements to improve URLLC performance in coexistence with and as a complement to legacy service types, such as LTE are described. These include, for example, enhanced timing resource allocations, enhanced transmission repetition schemes, enhanced feedback mechanisms, or a combination of these features to achieve certain reliability and latency targets.

34 Claims, 32 Drawing Sheets

(51) Int. Cl.
| | |
|---|---|
| *H04L 5/00* | (2006.01) |
| *H04L 1/08* | (2006.01) |
| *H04L 1/18* | (2006.01) |
| *H04L 1/16* | (2006.01) |
| *H04L 1/00* | (2006.01) |
| *H04W 76/27* | (2018.01) |
| *H04W 72/04* | (2009.01) |
| *H04L 5/14* | (2006.01) |

(52) U.S. Cl.
CPC .............. *H04L 1/08* (2013.01); *H04L 1/1671* (2013.01); *H04L 1/1819* (2013.01); *H04L 1/1854* (2013.01); *H04L 5/0044* (2013.01); *H04L 5/0053* (2013.01); *H04L 5/0055* (2013.01); *H04L 5/0064* (2013.01); *H04L 5/0082* (2013.01); *H04L 5/0091* (2013.01); *H04L 5/0094* (2013.01); *H04W 72/1226* (2013.01); *H04W 76/11* (2018.02); *H04W 76/27* (2018.02); *H04L 1/00* (2013.01); *H04L 5/005* (2013.01); *H04L 5/0023* (2013.01); *H04L 5/0051* (2013.01); *H04L 5/14* (2013.01); *H04W 72/042* (2013.01)

(58) Field of Classification Search
CPC ........... H04W 72/0406; H04W 72/042; H04W 72/04; H04W 76/27; H04W 76/20; H04W 76/00; H04W 76/11; H04W 76/10; H04L 1/1671; H04L 1/1607; H04L 1/16; H04L 1/1854; H04L 1/1829; H04L 1/18; H04L 1/08; H04L 1/1819; H04L 1/1812; H04L 1/00; H04L 5/0082; H04L 5/0078; H04L 5/0003; H04L 5/0064; H04L 5/0044; H04L 5/0062; H04L 5/0058; H04L 5/0094; H04L 5/0091; H04L 5/00; H04L 5/0053; H04L 5/003; H04L 5/0055; H04L 5/0023; H04L 5/0014; H04L 5/0001; H04L 5/0051; H04L 5/0048; H04L 5/005
USPC ......................................................... 370/329
See application file for complete search history.

(56) References Cited

U.S. PATENT DOCUMENTS

| | | | | |
|---|---|---|---|---|
| 2016/0227425 | A1* | 8/2016 | Kim | H04L 5/0007 |
| 2017/0156140 | A1* | 6/2017 | Islam | H04L 5/0044 |
| 2017/0201968 | A1 | 7/2017 | Nam et al. | |
| 2017/0230954 | A1* | 8/2017 | Au | H04W 4/70 |
| 2017/0332377 | A1 | 11/2017 | Tseng et al. | |
| 2017/0353963 | A1 | 12/2017 | Hong et al. | |
| 2018/0029165 | A1* | 2/2018 | Grundmueller | B23K 26/57 |
| 2018/0035459 | A1 | 2/2018 | Islam et al. | |
| 2018/0049165 | A1 | 2/2018 | Byun et al. | |
| 2018/0205534 | A1* | 7/2018 | Yi | H04L 5/1469 |
| 2018/0270880 | A1 | 9/2018 | Hosseini et al. | |

OTHER PUBLICATIONS

Nokia: "On Design of DL Control Channel for Shorter TTI operation", R1-163267, 3GPP TSG-RAN WG1 Meeting #84bis, Busan, South Korea, Mar. 11-15, 2016, 5 Pages.

Intel Corporation: "Uplink URLLC Transmission Without Grant", 3GPP Draft; R1-1701206 Intel—UL GF URLLC_Revision, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 18, 2017, 10 Pages, XP051222250, Retrieved from the Internet: URL: http://www.3gpp.org/ftp/tsg_ran/WG1_RL1/TSGR1_AH/NR_AH_1701/Docs/ [retrieved on Jan. 18, 2017].

International Search Report and Written Opinion—PCT/US2018/023297—ISA/EPO—dated Jun. 27, 2018.

LG Electronics: "Overall Discussion on URLLC", 3GPP Draft; R1-166882, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051125619, Retrieved from the Internet: URL:http://www.3gpp.org/ftp/Meetings_3GPP_SYNC/RAN1/Docs/ [retrieved on Aug. 21, 2016], 5 pages.

Nokia et al., "DL HARQ-ACK Feedback and UL Scheduling for FS2 with 1-ms TTI", R1-1701996 1-MS FS2, 3rd Generation Partnership Project (3GPP), Mobile Competence Centre; 650, Route Des Lucioles; F-06921 Sophia-Antipolis Cedex; France; vol. RAN WG1, No. Athens, Greece; Feb. 13, 2017-Feb. 17, 2017 Feb. 12, 2017, XP051209158, Retrieved from the Internet: URL:http://www.3gpp.org/ftp/Meetings_3GPP_SYNC/RAN1/Docs/ [retrieved on Feb. 12, 2017], 5 pages.

Intel Corporation: "Design Aspects Affecting Reliability of URLLC Services", 3GPP Draft; R1-1702243 Intel—URLLC_Reliability, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), pp. 1-7, XP051209401, Retrieved from the Internet: URL: http://www.3gpp.org/ftp/Meetings_3GPP SYNC/RAN1/Docs/ [retrieved on Feb. 12, 2017].

Intel Corporation: "Protocol Impacts of TTI Shortening," 3GPP Draft; R2-167769 Protocol Impact of TTI Reduction, 3rd Generation Partnership Project (3GPP), Mobile Competence Centre; 650, Route Des Lucioles; F-06921 Sophia-Antipolis Cedex; France, vol. RAN WG, No. Reno, Nevada, USA; Nov. 14, 2016-Nov. 18, 2016, Nov. 13, 2016, XP051177551, 4 pages, Retrieved from the Internet: URL: http://www.3gpp.org/ftp/Meetings_3GPP_SYNC/RAN2/Docs/ [retrieved on Nov. 13, 2016].

Intel Corporation: "Support of Link Adaptation for UL Grant-free NOMA Schemes," 3GPP Draft; R1-1610374 LA Grant-Freenoma, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016, XP051150385, 4 pages, Retrieved from the Internet: URL: http://www.3gpp.org/ftp/Meetings_3GPP_SYNC/RAN1/Docs/ [retrieved on Oct. 9, 2016].

* cited by examiner

1200

DOWNLINK AND UPLINK TRANSMISSIONS FOR HIGH RELIABILITY LOW LATENCY COMMUNICATIONS SYSTEMS

CROSS REFERENCES

The present Application for Patent claims priority to U.S. Provisional Patent Application No. 62/474,040 by Hosseini, et al., entitled "Downlink and uplink Transmissions For High Reliability Low Latency Communications Systems," filed Mar. 20, 2017, assigned to the assignee hereof.

BACKGROUND

The present disclosure, for example, relates to wireless communication systems and more particularly to downlink and uplink transmission for high reliability low latency communications systems.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) networks, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

Different UEs within a multiple-access communications system may have varying requirements from one another based on particular applications or deployments. Systems may therefore need to support multiple wireless communication services. For example, a system may support a wireless communication service with certain enhanced reliability and latency targets. However, resource configurations and certain legacy transmission restrictions, for example, may limit the system's ability to achieve such targets.

SUMMARY

Some wireless communication systems may be operable to support several wireless communications service types. A system may, for example, support a service type associated with communications having high reliability and low latency. In such systems, these high-reliability low-latency communications (HRLLCs) or ultra-reliable low-latency communications (URLLC) may be configured to coexist with other service types with less constrained reliability and latency requirements. URLLC systems may be configured with enhanced timing resource allocations, enhanced transmission repetition schemes, enhanced feedback mechanisms, or a combination of these features to achieve certain reliability and latency targets. Various methods, systems, and apparatuses, are described herein that support high-reliability low-latency configurations.

A method for wireless communication is described. The method may include identifying a first set of transmission time intervals (TTIs) for a first wireless service and a second set of TTIs for the first wireless service, wherein an initial TTI of each of the sets of TTIs comprises a portion of a control region for a second wireless service, transmitting a downlink message for the first wireless service during a TTI of the first set of TTIs, receiving a negative acknowledgement for the downlink message during a subsequent TTI of the first set of TTIs, and retransmitting the downlink message during the control region of the second set of TTIs.

An apparatus for wireless communication is described. The apparatus may include means for identifying a first set of TTIs for a first wireless service and a second set of TTIs for the first wireless service, wherein an initial TTI of each of the sets of TTIs comprises a portion of a control region for a second wireless service, means for transmitting a downlink message for the first wireless service during a TTI of the first set of TTIs, means for receiving a negative acknowledgement for the downlink message during a subsequent TTI of the first set of TTIs, and means for retransmitting the downlink message during the control region of the second set of TTIs.

Another apparatus for wireless communication is described. The apparatus may include a processor, memory in electronic communication with the processor, and instructions stored in the memory. The instructions may be operable to cause the processor to identify a first set of TTIs for a first wireless service and a second set of TTIs for the first wireless service, wherein an initial TTI of each of the sets of TTIs comprises a portion of a control region for a second wireless service, transmit a downlink message for the first wireless service during a TTI of the first set of TTIs, receive a negative acknowledgement for the downlink message during a subsequent TTI of the first set of TTIs, and retransmit the downlink message during the control region of the second set of TTIs.

A non-transitory computer readable medium for wireless communication is described. The non-transitory computer-readable medium may include instructions operable to cause a processor to identify a first set of TTIs for a first wireless service and a second set of TTIs for the first wireless service, wherein an initial TTI of each of the sets of TTIs comprises a portion of a control region for a second wireless service, transmit a downlink message for the first wireless service during a TTI of the first set of TTIs, receive a negative acknowledgement for the downlink message during a subsequent TTI of the first set of TTIs, and retransmit the downlink message during the control region of the second set of TTIs.

In some examples of the method, apparatus, and non-transitory computer-readable medium described above, retransmitting the downlink message comprises retransmitting the downlink message within one millisecond of transmitting the downlink message.

In some examples of the method, apparatus, and non-transitory computer-readable medium described above, transmitting the downlink message comprises transmitting the downlink message during the control region of the first set of TTIs.

In some examples of the method, apparatus, and non-transitory computer-readable medium described above, the control region comprises a physical downlink control channel (PDCCH) for the second wireless service.

In some examples of the method, apparatus, and non-transitory computer-readable medium described above, the initial TTI of each of the sets of TTIs comprises at least two symbols.

In some examples of the method, apparatus, and non-transitory computer-readable medium described above, the first set of TTIs and the second set of TTIs each comprises fourteen symbols.

In some examples of the method, apparatus, and non-transitory computer-readable medium described above, the downlink message comprises data for the first wireless service.

In some examples of the method, apparatus, and non-transitory computer-readable medium described above, the first wireless service comprises an URLLC service.

A method for wireless communication is described. The method may include identifying a first set of TTIs for a first wireless service and a second set of TTIs for the first wireless service, wherein an initial TTI of each of the sets of TTIs comprises a portion of a control region for a second wireless service, receiving a downlink message for the first wireless service during a TTI of the first set of TTIs, transmitting a negative acknowledgement for the downlink message during a subsequent TTI of the first set of TTIs, and receiving a retransmission of the downlink message during the control region of the second set of TTIs.

An apparatus for wireless communication is described. The apparatus may include means for identifying a first set of TTIs for a first wireless service and a second set of TTIs for the first wireless service, wherein an initial TTI of each of the sets of TTIs comprises a portion of a control region for a second wireless service, means for receiving a downlink message for the first wireless service during a TTI of the first set of TTIs, means for transmitting a negative acknowledgement for the downlink message during a subsequent TTI of the first set of TTIs, and means for receiving a retransmission of the downlink message during the control region of the second set of TTIs.

Another apparatus for wireless communication is described. The apparatus may include a processor, memory in electronic communication with the processor, and instructions stored in the memory. The instructions may be operable to cause the processor to identify a first set of TTIs for a first wireless service and a second set of TTIs for the first wireless service, wherein an initial TTI of each of the sets of TTIs comprises a portion of a control region for a second wireless service, receive a downlink message for the first wireless service during a TTI of the first set of TTIs, transmit a negative acknowledgement for the downlink message during a subsequent TTI of the first set of TTIs, and receive a retransmission of the downlink message during the control region of the second set of TTIs.

A non-transitory computer readable medium for wireless communication is described. The non-transitory computer-readable medium may include instructions operable to cause a processor to identify a first set of TTIs for a first wireless service and a second set of TTIs for the first wireless service, wherein an initial TTI of each of the sets of TTIs comprises a portion of a control region for a second wireless service, receive a downlink message for the first wireless service during a TTI of the first set of TTIs, transmit a negative acknowledgement for the downlink message during a subsequent TTI of the first set of TTIs, and receive a retransmission of the downlink message during the control region of the second set of TTIs.

In some examples of the method, apparatus, and non-transitory computer-readable medium described above, receiving the retransmission comprises receiving the retransmission of the downlink message within one millisecond of receiving the downlink message.

In some examples of the method, apparatus, and non-transitory computer-readable medium described above, receiving the downlink message comprises receiving the downlink message during the control region of the first set of TTIs.

In some examples of the method, apparatus, and non-transitory computer-readable medium described above, the control region comprises a PDCCH for the second wireless service.

In some examples of the method, apparatus, and non-transitory computer-readable medium described above, the initial TTI of each of the sets of TTIs comprises at least two symbols.

In some examples of the method, apparatus, and non-transitory computer-readable medium described above, the first set of TTIs and the second set of TTIs each comprises fourteen symbols.

In some examples of the method, apparatus, and non-transitory computer-readable medium described above, the downlink message comprises data for the first wireless service.

In some examples of the method, apparatus, and non-transitory computer-readable medium described above, the first wireless service comprises an URLLC service.

A method for wireless communication is described. The method may include identifying a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service, transmitting a downlink message for the first wireless service during a first TTI of the third subset of TTIs, receiving a negative acknowledgement for the downlink message during a subsequent TTI of the set of TTIs, and retransmitting the downlink message during a second TTI of the third subset of TTIs.

An apparatus for wireless communication is described. The apparatus may include means for identifying a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service, means for transmitting a downlink message for the first wireless service during a first TTI of the third subset of TTIs, means for receiving a negative acknowledgement for the downlink message during a subsequent TTI of the set of TTIs, and means for retransmitting the downlink message during a second TTI of the third subset of TTIs.

Another apparatus for wireless communication is described. The apparatus may include a processor, memory in electronic communication with the processor, and instructions stored in the memory. The instructions may be operable to cause the processor to identify a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service, transmit a downlink message for the first wireless service during a first TTI of the third subset of TTIs, receive a negative acknowledgement for the downlink message during a subsequent TTI of the set of TTIs, and retransmit the downlink message during a second TTI of the third subset of TTIs.

A non-transitory computer readable medium for wireless communication is described. The non-transitory computer-readable medium may include instructions operable to cause a processor to identify a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service, transmit a downlink message for the first wireless service during a first TTI of the third subset of TTIs, receive a negative acknowledgement for the downlink message during a subsequent TTI of the set of TTIs, and retransmit the downlink message during a second TTI of the third subset of TTIs.

In some examples of the method, apparatus, and non-transitory computer-readable medium described above, retransmitting the downlink message comprises retransmitting the downlink message within one millisecond of transmitting the downlink message.

Some examples of the method, apparatus, and non-transitory computer-readable medium described above may further include processes, features, means, or instructions for receiving channel state information (CSI) with the negative acknowledgement.

In some examples of the method, apparatus, and non-transitory computer-readable medium described above, the third duration may be less than or equal to one half of the second duration.

In some examples of the method, apparatus, and non-transitory computer-readable medium described above, the subsequent TTI may be a TTI of the third subset of TTIs.

In some examples of the method, apparatus, and non-transitory computer-readable medium described above, the first duration comprises three symbols, the second duration comprises two symbols, and the third duration comprises one symbol.

In some examples of the method, apparatus, and non-transitory computer-readable medium described above, the control region comprises a PDCCH for the second wireless service.

In some examples of the method, apparatus, and non-transitory computer-readable medium described above, a timing gap between transmitting the downlink message and receiving the negative acknowledgement for the downlink message may be based at least in part on the third duration.

A method for wireless communication is described. The method may include identifying a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service, receiving a downlink message for the first wireless service during a first TTI of the third subset of TTIs, transmitting a negative acknowledgement for the downlink message during a subsequent TTI of the set of TTIs, and receiving a retransmission of the downlink message during a second TTI of the third subset of TTIs.

An apparatus for wireless communication is described. The apparatus may include means for identifying a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service, means for receiving a downlink message for the first wireless service during a first TTI of the third subset of TTIs, means for transmitting a negative acknowledgement for the downlink message during a subsequent TTI of the set of TTIs, and means for receiving a retransmission of the downlink message during a second TTI of the third subset of TTIs.

Another apparatus for wireless communication is described. The apparatus may include a processor, memory in electronic communication with the processor, and instructions stored in the memory. The instructions may be operable to cause the processor to identify a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service, receive a downlink message for the first wireless service during a first TTI of the third subset of TTIs, transmit a negative acknowledgement for the downlink message during a subsequent TTI of the set of TTIs, and receive a retransmission of the downlink message during a second TTI of the third subset of TTIs.

A non-transitory computer readable medium for wireless communication is described. The non-transitory computer-readable medium may include instructions operable to cause a processor to identify a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service, receive a downlink message for the first wireless service during a first TTI of the third subset of TTIs, transmit a negative acknowledgement for the downlink message during a subsequent TTI of the set of TTIs, and receive a retransmission of the downlink message during a second TTI of the third subset of TTIs.

In some examples of the method, apparatus, and non-transitory computer-readable medium described above, receiving the retransmission comprises receiving the retransmission of the downlink message within one millisecond of receiving the downlink message.

Some examples of the method, apparatus, and non-transitory computer-readable medium described above may further include processes, features, means, or instructions for transmitting CSI with the negative acknowledgement.

In some examples of the method, apparatus, and non-transitory computer-readable medium described above, the third duration may be less than or equal to one half of the second duration.

In some examples of the method, apparatus, and non-transitory computer-readable medium described above, the subsequent TTI may be a TTI of the third subset of TTIs.

In some examples of the method, apparatus, and non-transitory computer-readable medium described above, the first duration comprises three symbols, the second duration comprises two symbols, and the third duration comprises one symbol.

In some examples of the method, apparatus, and non-transitory computer-readable medium described above, the control region comprises a PDCCH for the second wireless service.

In some examples of the method, apparatus, and non-transitory computer-readable medium described above, a timing gap between receiving the downlink message and transmitting the negative acknowledgement for the downlink message may be based at least in part on the third duration.

A method for wireless communication is described. The method may include identifying a set of TTIs for a first wireless service, wherein an initial TTI of the set of TTIs comprises a portion of a control region for a second wireless service, transmitting a downlink message for the first wireless service during a TTI of the set of TTIs, wherein the downlink message comprises an assignment of resources for at least the downlink message, and retransmitting at least a portion of the downlink message during a subsequent TTI of the set of TTIs within a threshold time from transmitting the downlink message.

An apparatus for wireless communication is described. The apparatus may include means for identifying a set of TTIs for a first wireless service, wherein an initial TTI of the set of TTIs comprises a portion of a control region for a second wireless service, means for transmitting a downlink message for the first wireless service during a TTI of the set of TTIs, wherein the downlink message comprises an assignment of resources for at least the downlink message, and means for retransmitting at least a portion of the downlink message during a subsequent TTI of the set of TTIs within a threshold time from transmitting the downlink message.

Another apparatus for wireless communication is described. The apparatus may include a processor, memory in electronic communication with the processor, and instructions stored in the memory. The instructions may be operable to cause the processor to identify a set of TTIs for a first wireless service, wherein an initial TTI of the set of TTIs comprises a portion of a control region for a second wireless service, transmit a downlink message for the first wireless service during a TTI of the set of TTIs, wherein the downlink message comprises an assignment of resources for at least the downlink message, and retransmit at least a portion of the downlink message during a subsequent TTI of the set of TTIs within a threshold time from transmitting the downlink message.

A non-transitory computer readable medium for wireless communication is described. The non-transitory computer-readable medium may include instructions operable to cause a processor to identify a set of TTIs for a first wireless service, wherein an initial TTI of the set of TTIs comprises a portion of a control region for a second wireless service, transmit a downlink message for the first wireless service during a TTI of the set of TTIs, wherein the downlink message comprises an assignment of resources for at least the downlink message, and retransmit at least a portion of the downlink message during a subsequent TTI of the set of TTIs within a threshold time from transmitting the downlink message.

Some examples of the method, apparatus, and non-transitory computer-readable medium described above may further include processes, features, means, or instructions for transmitting an assignment of resources for the retransmission of at least the portion of the downlink message.

In some examples of the method, apparatus, and non-transitory computer-readable medium described above, the assignment of resources for at least the downlink message comprises an assignment of resources for retransmitting at least the portion of the downlink message.

In some examples of the method, apparatus, and non-transitory computer-readable medium described above, the portion of the downlink message retransmitted during the subsequent TTI comprises data.

In some examples of the method, apparatus, and non-transitory computer-readable medium described above, the downlink message and the retransmission of at least the portion of the downlink message may be transmitted over different frequency resources, over different ports, over different beams, using different modulation and coding schemes (MCS), using different redundancy versions (RV), using different precoders, or a combination thereof.

In some examples of the method, apparatus, and non-transitory computer-readable medium described above, the threshold time may be one millisecond.

In some examples of the method, apparatus, and non-transitory computer-readable medium described above, the subsequent TTI comprises a next TTI after the TTI.

Some examples of the method, apparatus, and non-transitory computer-readable medium described above may further include processes, features, means, or instructions for transmitting an indication of the threshold time.

In some examples of the method, apparatus, and non-transitory computer-readable medium described above, the indication may be transmitted in radio resource control (RRC) signaling.

In some examples of the method, apparatus, and non-transitory computer-readable medium described above, the assignment of resources comprises downlink control information (DCI).

A method for wireless communication is described. The method may include identifying a set of TTIs for a first wireless service, wherein an initial TTI of the set of TTIs comprises a portion of a control region for a second wireless service, receiving a downlink message for the first wireless service during a TTI of the set of TTIs, wherein the downlink message comprises an assignment of resources for at least the downlink message, and receiving a retransmission of at least a portion of the downlink message during a subsequent TTI of the set of TTIs within a threshold time from receiving the downlink message.

An apparatus for wireless communication is described. The apparatus may include means for identifying a set of TTIs for a first wireless service, wherein an initial TTI of the set of TTIs comprises a portion of a control region for a second wireless service, means for receiving a downlink message for the first wireless service during a TTI of the set of TTIs, wherein the downlink message comprises an assignment of resources for at least the downlink message, and means for receiving a retransmission of at least a portion of the downlink message during a subsequent TTI of the set of TTIs within a threshold time from receiving the downlink message.

Another apparatus for wireless communication is described. The apparatus may include a processor, memory in electronic communication with the processor, and instructions stored in the memory. The instructions may be operable to cause the processor to identify a set of TTIs for a first wireless service, wherein an initial TTI of the set of TTIs comprises a portion of a control region for a second wireless service, receive a downlink message for the first wireless service during a TTI of the set of TTIs, wherein the downlink message comprises an assignment of resources for at least the downlink message, and receive a retransmission of at least a portion of the downlink message during a subsequent TTI of the set of TTIs within a threshold time from receiving the downlink message.

A non-transitory computer readable medium for wireless communication is described. The non-transitory computer-readable medium may include instructions operable to cause a processor to identify a set of TTIs for a first wireless service, wherein an initial TTI of the set of TTIs comprises a portion of a control region for a second wireless service, receive a downlink message for the first wireless service during a TTI of the set of TTIs, wherein the downlink message comprises an assignment of resources for at least the downlink message, and receive a retransmission of at least a portion of the downlink message during a subsequent TTI of the set of TTIs within a threshold time from receiving the downlink message.

Some examples of the method, apparatus, and non-transitory computer-readable medium described above may further include processes, features, means, or instructions for receiving an assignment of resources for the retransmission of at least the portion of the downlink message.

In some examples of the method, apparatus, and non-transitory computer-readable medium described above, the assignment of resources for at least the downlink message comprises an assignment of resources for retransmitting at least the portion of the downlink message.

In some examples of the method, apparatus, and non-transitory computer-readable medium described above, the downlink message and the retransmission of at least the portion of the downlink message may be received over different frequency resources, over different ports, over different beams, using different MCS, using different RV, using different precoders, or a combination thereof.

In some examples of the method, apparatus, and non-transitory computer-readable medium described above, the threshold time may be one millisecond.

In some examples of the method, apparatus, and non-transitory computer-readable medium described above, the subsequent TTI comprises a next TTI after the TTI.

Some examples of the method, apparatus, and non-transitory computer-readable medium described above may further include processes, features, means, or instructions for receiving an indication of the threshold time.

In some examples of the method, apparatus, and non-transitory computer-readable medium described above, the indication may be transmitted in RRC signaling.

In some examples of the method, apparatus, and non-transitory computer-readable medium described above, the assignment of resources comprises DCI.

A method for wireless communication is described. The method may include identifying a set of TTIs for a first wireless service, wherein an initial TTI of the set of TTIs comprises a portion of a control region for a second wireless service, receiving a downlink message for the first wireless service during a TTI of the set of TTIs, and receiving a retransmission of at least a portion of the downlink message during a subsequent TTI of the set of TTIs within a threshold time from transmitting the downlink message.

An apparatus for wireless communication is described. The apparatus may include means for identifying a set of TTIs for a first wireless service, wherein an initial TTI of the set of TTIs comprises a portion of a control region for a second wireless service, means for receiving a downlink message for the first wireless service during a TTI of the set of TTIs, and means for receiving a retransmission of at least a portion of the downlink message during a subsequent TTI of the set of TTIs within a threshold time from transmitting the downlink message.

Another apparatus for wireless communication is described. The apparatus may include a processor, memory in electronic communication with the processor, and instructions stored in the memory. The instructions may be operable to cause the processor to identify a set of TTIs for a first wireless service, wherein an initial TTI of the set of TTIs comprises a portion of a control region for a second wireless service, receive a downlink message for the first wireless service during a TTI of the set of TTIs, and receive a retransmission of at least a portion of the downlink message during a subsequent TTI of the set of TTIs within a threshold time from transmitting the downlink message.

A non-transitory computer readable medium for wireless communication is described. The non-transitory computer-readable medium may include instructions operable to cause a processor to identify a set of TTIs for a first wireless service, wherein an initial TTI of the set of TTIs comprises a portion of a control region for a second wireless service, receive a downlink message for the first wireless service during a TTI of the set of TTIs, and receive a retransmission of at least a portion of the downlink message during a subsequent TTI of the set of TTIs within a threshold time from transmitting the downlink message.

Some examples of the method, apparatus, and non-transitory computer-readable medium described above may further include processes, features, means, or instructions for receiving signaling that indicates resources available for receiving the retransmission of at least the portion of the downlink message in the subsequent TTI.

Some examples of the method, apparatus, and non-transitory computer-readable medium described above may further include processes, features, means, or instructions for determining resources associated with the subsequent TTI based at least in part on the signaling.

Some examples of the method, apparatus, and non-transitory computer-readable medium described above may further include processes, features, means, or instructions for receiving an activation message that indicates resources associated with the TTI. Some examples of the method, apparatus, and non-transitory computer-readable medium described above may further include processes, features, means, or instructions for determining resources associated with the subsequent TTI based at least in part on the activation message.

Some examples of the method, apparatus, and non-transitory computer-readable medium described above may further include processes, features, means, or instructions for receiving an activation message that indicates resources associated with the TTI and the subsequent TTI.

Some examples of the method, apparatus, and non-transitory computer-readable medium described above may further include processes, features, means, or instructions for identifying a plurality of transport block sizes (TBSs) based at least in part on the signaling. Some examples of the method, apparatus, and non-transitory computer-readable medium described above may further include processes, features, means, or instructions for decoding at least the downlink message over at least the TTI of the set of TTIs using a plurality of hypotheses associated with the plurality of TBSs.

Some examples of the method, apparatus, and non-transitory computer-readable medium described above may further include processes, features, means, or instructions for monitoring for the retransmission of at least the portion of the downlink message based at least in part on the signaling.

Some examples of the method, apparatus, and non-transitory computer-readable medium described above may further include processes, features, means, or instructions for receiving a subsequent control message indicating a modification to the resources associated with the at least a portion of the downlink message retransmitted in the subsequent TTI.

Some examples of the method, apparatus, and non-transitory computer-readable medium described above may further include processes, features, means, or instructions for determining the subsequent control message comprises control information based at least in part on a flag in the subsequent control message.

Some examples of the method, apparatus, and non-transitory computer-readable medium described above may further include processes, features, means, or instructions for determining the subsequent control message comprises control information based at least in part on decoding the subsequent control message using a predetermined cyclic redundancy check (CRC) configuration.

In some examples of the method, apparatus, and non-transitory computer-readable medium described above, the subsequent control message may be received on an indicator channel reserved for configuring resources associated with the downlink message.

In some examples of the method, apparatus, and non-transitory computer-readable medium described above, the signaling comprises RRC signaling.

Some examples of the method, apparatus, and non-transitory computer-readable medium described above may further include processes, features, means, or instructions for deriving a hybrid automatic repeat request (HARQ) process identification based at least in part on an index of at least the TTI of the set of TTIs.

In some examples of the method, apparatus, and non-transitory computer-readable medium described above, a feedback configuration associated with at least the downlink message may be based at least in part on an on-off keying configuration.

Some examples of the method, apparatus, and non-transitory computer-readable medium described above may further include processes, features, means, or instructions for determining resources associated with the subsequent TTI based at least in part on resources associated with the TTI.

Some examples of the method, apparatus, and non-transitory computer-readable medium described above may further include processes, features, means, or instructions for identifying a set of TBs associated with the downlink message, wherein a coding scheme associated with the set of TBs may be based at least in part on a size of at least a TB of the set of TBs.

In some examples of the method, apparatus, and non-transitory computer-readable medium described above, the coding scheme comprises tail-biting convolutional code (TBCC) for TBs having a first size and turbo coding for TBs having a second size, wherein the first size may be smaller than the second size.

A method for wireless communication is described. The method may include identifying a set of TTIs for a first wireless service, wherein an initial TTI of the set of TTIs comprises a portion of a control region for a second wireless service, transmitting a downlink message for the first wireless service during a TTI of the set of TTIs, and retransmitting at least a portion of the downlink message during a subsequent TTI of the set of TTIs within a threshold time from transmitting the downlink message.

An apparatus for wireless communication is described. The apparatus may include means for identifying a set of TTIs for a first wireless service, wherein an initial TTI of the set of TTIs comprises a portion of a control region for a second wireless service, means for transmitting a downlink message for the first wireless service during a TTI of the set of TTIs, and means for retransmitting at least a portion of the downlink message during a subsequent TTI of the set of TTIs within a threshold time from transmitting the downlink message.

Another apparatus for wireless communication is described. The apparatus may include a processor, memory in electronic communication with the processor, and instructions stored in the memory. The instructions may be operable to cause the processor to identify a set of TTIs for a first wireless service, wherein an initial TTI of the set of TTIs comprises a portion of a control region for a second wireless service, transmit a downlink message for the first wireless service during a TTI of the set of TTIs, and retransmit at least a portion of the downlink message during a subsequent TTI of the set of TTIs within a threshold time from transmitting the downlink message.

A non-transitory computer readable medium for wireless communication is described. The non-transitory computer-readable medium may include instructions operable to cause a processor to identify a set of TTIs for a first wireless service, wherein an initial TTI of the set of TTIs comprises a portion of a control region for a second wireless service, transmit a downlink message for the first wireless service during a TTI of the set of TTIs, and retransmit at least a portion of the downlink message during a subsequent TTI of the set of TTIs within a threshold time from transmitting the downlink message.

Some examples of the method, apparatus, and non-transitory computer-readable medium described above may further include processes, features, means, or instructions for transmitting signaling that indicates resources available for receiving the retransmission of at least the portion of the downlink message in the subsequent TTI.

In some examples of the method, apparatus, and non-transitory computer-readable medium described above, the signaling comprises an indication of the subsequent TTI.

In some examples of the method, apparatus, and non-transitory computer-readable medium described above, the signaling comprises an indication of the threshold time.

In some examples of the method, apparatus, and non-transitory computer-readable medium described above, the signaling comprises RRC signaling.

Some examples of the method, apparatus, and non-transitory computer-readable medium described above may further include processes, features, means, or instructions for transmitting an activation message that indicates resources associated with the TTI.

Some examples of the method, apparatus, and non-transitory computer-readable medium described above may further include processes, features, means, or instructions for transmitting an activation message that indicates resources associated with the TTI and the subsequent TTI.

Some examples of the method, apparatus, and non-transitory computer-readable medium described above may further include processes, features, means, or instructions for deriving a HARQ process identification based at least in part on an index of at least the TTI of the set of TTIs.

In some examples of the method, apparatus, and non-transitory computer-readable medium described above, a feedback configuration associated with at least the downlink message may be based at least in part on an on-off keying.

Some examples of the method, apparatus, and non-transitory computer-readable medium described above may further include processes, features, means, or instructions for transmitting a subsequent control message indicating a modification to the resources associated with the at least a portion of the downlink message retransmitted in the subsequent TTI.

Some examples of the method, apparatus, and non-transitory computer-readable medium described above may further include processes, features, means, or instructions for receiving an uplink message from a device of a group of devices.

Some examples of the method, apparatus, and non-transitory computer-readable medium described above may further include processes, features, means, or instructions for determining an identity of the device based at least in part on a demodulation reference signal (DMRS) sequence associated with the device.

Some examples of the method, apparatus, and non-transitory computer-readable medium described above may further include processes, features, means, or instructions for determining an identity of the device based at least in part on a cell radio network temporary identifier (C-RNTI) associated with the device.

Some examples of the method, apparatus, and non-transitory computer-readable medium described above may further include processes, features, means, or instructions for determining an identity of the device based at least in part on a media access control (MAC) protocol data unit (PDU) associated with the device.

Some examples of the method, apparatus, and non-transitory computer-readable medium described above may further include processes, features, means, or instructions for identifying a set of TBs associated with the downlink message, wherein a coding scheme associated with the set of TBs may be based at least in part on a size of at least a TB of the set of TBs.

In some examples of the method, apparatus, and non-transitory computer-readable medium described above, the coding scheme comprises TBCC for TBs having a first size and turbo coding for TBs having a second size, wherein the first size may be smaller than the second size.

Some examples of the method, apparatus, and non-transitory computer-readable medium described above may further include processes, features, means, or instructions for assigning at least a subset of the set of TTIs to a first group of user equipment (UEs) based at least in part on a channel condition associated with the first group of UEs.

Some examples of the method, apparatus, and non-transitory computer-readable medium described above may further include processes, features, means, or instructions for forming at least the first group of UEs for a first transmission opportunity. Some examples of the method, apparatus, and non-transitory computer-readable medium described above may further include processes, features, means, or instructions for forming at least a second group of UEs that may be different than the first group of UEs for a second transmission opportunity.

Some examples of the method, apparatus, and non-transitory computer-readable medium described above may further include processes, features, means, or instructions for assigning a first sequence to the first group of UEs. Some examples of the method, apparatus, and non-transitory computer-readable medium described above may further include processes, features, means, or instructions for assigning a second sequence that may be different than the first sequence to a second group of UEs.

DETAILED DESCRIPTION

Wireless communications systems as described herein may be configured to support a plurality of service types with different latency, reliability, or throughput rates or standards. One such service type may be referred to herein as high-reliability, low-latency communication (HRLLC) or ultra-reliable, low latency communication (URLLC). Various techniques described may be employed to improve URLLC performance while supporting coexistence with legacy service types or other service types that may be supported by the wireless communications system. The described techniques may be employed to enhance URLLC downlink and uplink latency and reliability targets.

By way of example, a base station operating in LTE or new radio (NR) technology may transmit URLLC data within a control region typically reserved for a legacy service type. Additionally or alternatively, shorter time resource allocations may be used as compared to legacy service types. In yet other examples, transmission repetition schemes with enhanced feedback mechanisms may be used.

Aspects of the disclosure introduced above are described below in the context of a wireless communications system. Examples of various channel configurations and resource allocation schemes are described. Aspects of the disclosure are further illustrated by and described with reference to apparatus diagrams, system diagrams, and flowcharts that relate to high reliability, low latency communications.

Figure 1:
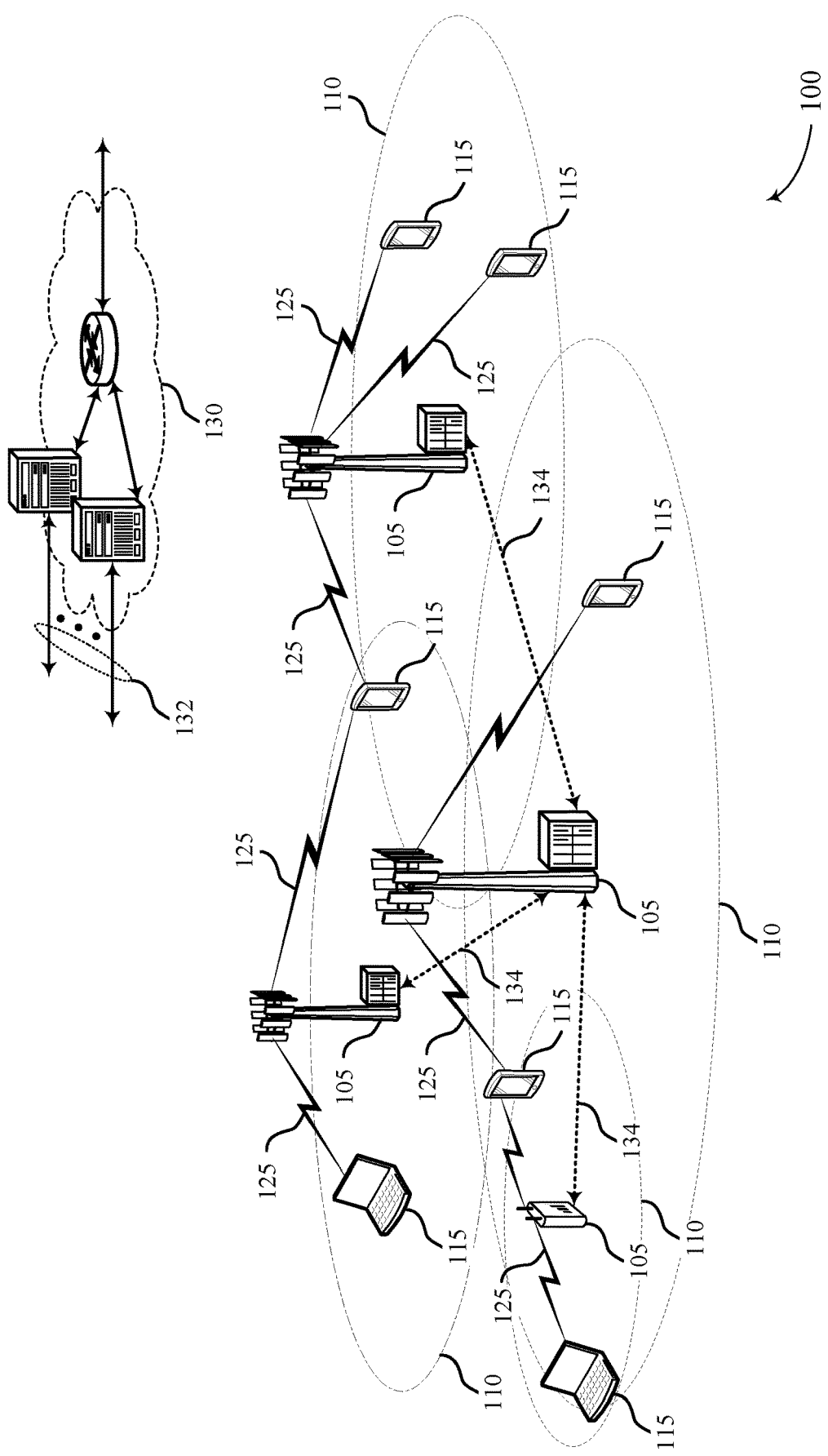
FIGS. 1 and 2 illustrate examples of systems for wireless communication that support downlink and uplink transmissions for high reliability low latency communications systems in accordance with aspects of the present disclosure.

FIG. 1 illustrates an example of a wireless communications system 100 in accordance with various aspects of the disclosure. The wireless communications system 100 includes base stations 105, user equipment (UEs) 115, and a core network 130. System 100 may be configured to provide multiple wireless communication services, including, for example ultra-reliable, low-latency communications.

The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller. In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, evolved NodeB (eNB), Home NodeB, a Home eNodeB, a next generation nodeB (gNB), or some other suitable terminology. The geographic coverage area 110 for a base station 105 may be divided into sectors making up only a portion of the coverage area. The wireless communications system 100 may include base stations 105 of different types (e.g., macro and/or small cell base stations). There may be overlapping geographic coverage areas 110 for different technologies. Base station 105 may support multiple wireless communication services on one or more cells. Base stations 105 may, for example, be configured for high reliability, low latency communications in addition to other mobile broadband, broadcast, and or other services.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels.

The MAC layer may also use Hybrid Automatic Repeat Request (HARQ) to provide retransmission at the MAC layer to improve link efficiency. HARQ enables the overhead of error correction to be adapted dynamically depending on the channel quality. When HARQ is used, if errors are able to be corrected using forward error correction (FEC) techniques, then no retransmission is requested. If errors are detected but not corrected, a retransmission is requested. Thus, HARQ be a method of ensuring that data is received correctly over a wireless communication link 125. HARQ may include a combination of error detection (e.g., using a cyclic redundancy check (CRC)), FEC, and retransmission (e.g., automatic repeat request (ARQ)) and may improve throughput at the MAC layer in poor radio conditions. In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NAK) indicating a failed attempt to decode the information. The chain of transmission, response and retransmission may be referred to as a HARQ process. In some cases, a limited number of HARQ processes may be used for a given communication link 125.

In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels. Different wireless communication services may be configured or activated by RRC or PHY layer signaling in various examples. For instance, a UE 115 may be configured for URLLC using RRC signaling, and the UE 115 may be assigned resources for URLLC using PHY layer control signaling.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations 105 and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. Communication links 125 may represent various wireless communication services, such as URLLC.

The communication links 125 may transmit bidirectional communications using frequency division duplexing (FDD) (e.g., using paired spectrum resources) or time division duplexing (TDD) operation (e.g., using unpaired spectrum resources). Frame structures for FDD (e.g., frame structure (FS) type 1) and TDD (e.g., FS type 2) may be defined. Frame structures for unlicensed carriers (e.g., FS type 3) may also be defined.

In some examples, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Some examples of wireless communication system 100 (e.g., NR systems, next generation LTE systems, etc.), may support communications with high reliability and low latency. For example, URLLC systems (e.g., for an NR system) may be defined by certain reliability and latency targets. For example, URLLCs may target a reliability of $10^{-5}$ with only two transmissions (e.g., an initial transmission and one retransmission) within 1 millisecond (ms). In this example, the reliability may refer to a bit error rate or some other suitable metric (e.g., such that the probability that a given bit may be decoded correctly is $1-10^{-5}$). Such communications may be associated with an URLLC channel. In some wireless systems (e.g., LTE systems), URLCC may be enabled for both 1 ms TTIs and shortened TTIs (sTTIs), while some systems (e.g., which may be referred to as legacy systems) may only support 1-ms based TTIs.

In some cases, HRLLCs may be examples of URLLCs. For example, HRLLCs may have relaxed latency and/or reliability standards compared to URLLCs, though both may offer improved latency and reliability compared to other (e.g., conventional or legacy) communications. In some examples, the enhancements may enable a base station 105 to have some flexibility in targeting the performance metrics. That is, the base station 105 may manage the desired reliability under a certain delay constraint. Techniques described herein consider configuration of URLLC, timing allocation enhancements, downlink transmission enhancements, and transmission repetition and control enhancements.

Figure 2:
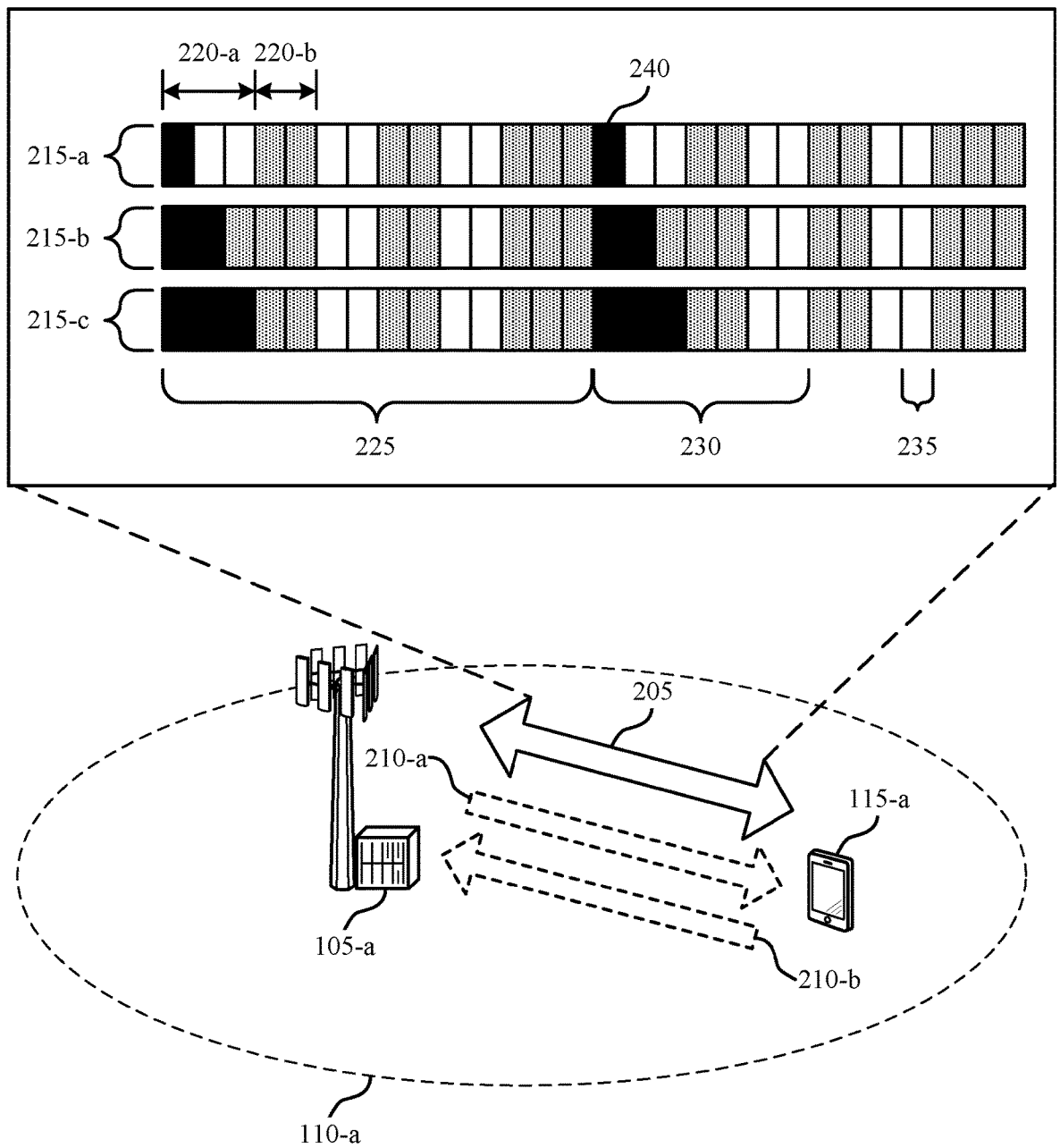

FIG. 2 illustrates an example of a wireless communications system 200 that supports URLLC configurations in accordance with various aspects of the present disclosure.

Wireless communications system 200 includes base station 105-a and UE 115-a, which may be examples of aspects of the corresponding devices as described above with reference to FIG. 1. In the example of FIG. 2, the wireless communications system 200 may operate according to a radio access technology (RAT) such as LTE, 5G, or NR RAT, although techniques described herein may be applied to any RAT and to systems that may concurrently use two or more different RATs. The wireless communications system 200 may be configured to satisfy certain reliability and latency targets. For example, wireless communications system 200 may be configured to satisfy a reliability target of $10^{-5}$ with only two transmissions (e.g., an initial transmission and one retransmission) within 1 ms. The wireless communications system 200 may be configured to achieve these reliability and latency targets in both the uplink and downlink directions.

Base station 105-a may transmit downlink messages to UE 115-a and receive uplink messages from UE 115-a over a communication link 205 (e.g., a carrier). A message (or at least a data portion of a message, such as a data portion) may be retransmitted by either the base station 105-a or the UE 115-a to improve the reliability associated with successfully decoding the message. For example, downlink message 210-a may include a retransmission of a downlink message transmitted over communication link 205. Similarly, uplink message 210-b may include a retransmission of an uplink message transmitted over communication link 205. As described below in more detail, the wireless communications system 200 may be configured to retransmit a message within a certain period of time (e.g., within 1 ms) from transmitting the initial message in order to satisfy certain latency targets for URLLC systems.

Base station 105-a (or some other network entity) may allocate time and frequency resources for communication with UE 115-a over the communication link 205. The allocation of time resources may be represented as a timing diagram 215. Timing diagrams 215-a, 215-b, and 215-c illustrate examples of downlink timing diagrams when a control format indicator (CFI) is set to one, two, and three, respectively. Each timing diagram 215 may be divided into two subframes 225. A subframe 225 may correspond to a legacy LTE TTI with a duration of 1 ms. Each subframe 225 may include two slots 230, and each slot 230 may include seven OFDM symbols 235 for a normal cyclic prefix. Thus, each timing diagram 215 illustrates two consecutive subframes 225, each including 14 symbols 235.

The timing diagrams 215 may also be divided into sTTIs 220 with various durations (e.g., measured in symbols). For example, sTTI 220-a is an example of a three-symbol sTTI, and sTTI 220-b is an example of a two-symbol sTTI. As described below in more detail, a one-symbol sTTI (e.g., a partial sTTI) may be configured for downlink and/or uplink communications to enhance latency capabilities of the wireless communications system 200. Referring to timing diagram 215-a, the pattern of sTTIs 220 when the CFI is set to one may include a three-symbol sTTI 220-a, followed by four two-symbol sTTIs 220-b, followed by another three-symbol sTTI 220-a (i.e., [3,2,2,2,2,3]). This sTTI pattern may also be used for downlink communications when the CFI is set to three (e.g., as illustrated in timing diagram 215-c). This sTTI pattern may also be used for uplink communications. Referring to timing diagram 215-b, when the CFI is set to two, the sTTI pattern may include a two-symbol sTTI 220-b, followed by a three-symbol sTTI 220-b, followed by three two-symbol sTTIs 220-b, followed by another three-symbol sTTI 220-a (i.e., [2,3,2,2,2,3]).

In some examples, a portion 240 of an initial sTTI 220 of each subframe 225 may be reserved for transmitting control information. For example, the portion 240 may be reserved for physical downlink control channel (PDCCH) communications for a wireless service or service type (e.g., a legacy wireless service) other than a HRLLC service or an URLLC service. The duration of the portion 240 measured in symbols may be configured through the CFI. For example, as illustrated in timing diagram 215-a, when the CFI is set to one, the duration of portion 240 is one symbol. As illustrated in timing diagram 215-b, when the CFI is set to two, the duration of portion 240 is two symbols. Similarly, as illustrated in timing diagram 215-c, when the CFI is set to three, the duration of the portion 240 is three symbols.

In some examples, when the CFI is set to two or three, the wireless communications system 200 may restrict downlink data or downlink control information from being transmitted during the portion 240. That is, the portion 240 may be reserved for legacy PDCCH transmissions. However, in accordance with aspects of the present disclosure, when the CFI is set to two or three, the wireless communications system 200 may be configured to transmit URLLC (e.g., LTE or NR URLLC) shortened physical downlink shared channel (sPDSCH) and/or shortened physical downlink control channel (sPDCCH) transmissions within the portion 240 previously reserved for legacy PDCCH transmissions. Configuring the wireless communications system 200 in this way may facilitate enhanced reliability (e.g., $10^{-5}$) while using at most two transmissions (e.g., one transmission and one retransmission) within a target latency (e.g., 1 ms).

In some examples, the base station 105-a may configure a one-symbol sTTI (e.g., a partial sTTI) for downlink or uplink communications to enhance latency capabilities of the wireless communications system 200. In one example, the base station 105-a may configure a one-symbol sTTI 220 for downlink communications and a two-symbol sTTI 220 for uplink communications. In another example, the base station 105-a may configure a one-symbol sTTI 220 for downlink communications and a one-symbol sTTI 220 for uplink communications to further enhance latency capabilities. In either example of uplink sTTI duration, the timing may be based on the duration of the downlink sTTI 220. Although a one-symbol duration is provided as an example, it should be understood that an sTTI 220 may be configured with other durations that are less than or greater than one symbol. Using one-symbol sTTIs 220 for downlink communications may facilitate enhanced reliability (e.g., $10^{-5}$) while using at most two transmissions (e.g., one transmission and one retransmission) within a target latency (e.g., 1 ms). Moreover, if configured in this way, the wireless communications system 200 may be able to achieve these reliability and latency targets without transmitting data during the portions 240 previously reserved for legacy PDCCH transmissions.

In the example of a one-symbol sTTI 220 for downlink communications and a two-symbol sTTI 220 for uplink communications, each sPUCCH (e.g., a two-symbol sPUCCH) transmission may also include channel state information (CSI) in addition to ACK/NAK information. For example, in the case of a NAK, the UE 115-a my be configured to transmit CSI along with NAK without the option of dropping the CSI from the NAK. In some examples, in the case of an ACK, the UE 115-a may choose not to send CSI along with the ACK. Transmitting CSI along with the NAK and/or ACK may enhance the reliability of successfully decoding the first retransmission of a downlink communication because the receiver (e.g., base station 105-a) may be able to determine the state of the channel more efficiently.

In the example of a one-symbol sTTI 220 for downlink communications and a one-symbol sTTI 220 for uplink communications, reception at the base station 105-a may be coherent or non-coherent. The reception at the base station 105-a may be non-coherent because the UE 115-a may be unable to send a demodulation reference signal (DMRS) along with uplink data within a one-symbol uplink sTTI 220. Therefore, to assist the base station 105-a in estimating the channel, each UE 115-a may be assigned a set of sPUCCH resources. This assignment may be similar to legacy PUCCH format 1b with channel selection, which may indicate four sPUCCH options with two bits of data. Additionally or alternatively, each UE 115-a may be assigned a set of cyclic shifts (e.g., by transmitting two bits of data). Therefore, based on the sPUCCH resources used, or the selected cyclic shift, the base station 105-a may be able to determine which ACK/NAK bits are sent.

For coherent reception at the base station 105-a, the base station 105-a may use a previous channel estimation (e.g., from a previous uplink transmission). In some examples, relying on a previous channel estimation may include the UE 115-a sending sounding reference signal (SRS) messages during multiple sTTIs 220 within a subframe 225 (instead of only during the last symbol 235 of a subframe 225). Sending multiple sTTIs 220 within a subframe 225 may be referred to as "fast" SRS transmission. Additionally or alternatively, a modified interleaved FDMA (IFDMA) scheme may be used by using one symbol (e.g., the data symbol) instead of a two symbol configuration that includes a DMRS symbol and a data symbol.

Moreover, in the example of a one-symbol sTTI 220 for downlink communications and a one-symbol sTTI 220 for uplink communications, the wireless communications system 200 may employ one or more channel estimation techniques. For example, channel estimate may rely on "fast" SRS transmission (e.g., transmitting SRS more frequently than in a legacy system). Additionally or alternatively, DMRS transmission may be used with a shorter processing timeline as compared to a partial sPUSCH. In some examples, the phase continuity between SRS and DMRS and/or between the DMRS and the data symbols is preserved. For example, in some cases there is no power change across the SRS and DMRS data symbols. Moreover, the SRS may be pre-coded. The precoding might be different from that of a data symbol. If the base station 105-a is unaware of the precoders used, data decoding may be unsuccessful. Therefore, in some examples, the precoding matrix indicator (PMI) may be known at the receiver (e.g., the base station 105-a).

Additionally or alternatively, the base station 105-a or the UE 115-a may be configured to transmit and then retransmit a message without first receiving a feedback indication for the message (e.g., an ACK or NAK). Such a repetition-based scheme may provide diversity gain (e.g., in time, frequency, or spatial domains) for the first transmission of a message, which may increase the reliability of successfully decoding the message without a need for rescheduling the transmission. In some examples, each downlink transmission may be triggered by a specific assignment of resources (e.g., a grant-based approach). In other examples, the transmissions and retransmissions may be grant-free.

Under a grant-based approach, the repetition of downlink messages may be based on the transport block (TB) size. For example, if a TB spans multiple symbols, an initial transmission and a retransmission of a downlink message may occur over the course of a multi-symbol sTTI 220 or over the course of multiple one-symbol sTTIs 220 bundled together. Transmitting a downlink message over a multi-symbol sTTI 220 or over the course of multiple one-symbol sTTIs 220 may facilitate DMRS-based transmissions where DMRS ports are located over more than one symbol. If a TB is smaller (e.g., spans less than one symbol), then resources may be modified for each retransmission on a per-symbol basis.

As indicated above, the same transmission may be sent multiple times over different time, frequency, and/or spatial domains to improve diversity gain. For example, the same packet may be sent over different sTTIs 220, over different resource blocks, using different modulation and coding schemes (MCS), or with different redundancy versions (RV), to enable incremental combining. In the case of URLLC, the code rates may be relatively low as compared to legacy systems. As such, even if RV0 is missed (e.g., the RV that contains the most amount of systematic bits), other versions may be decodable at low signal-to-noise ratio (SNR) regimes. Additionally or alternatively, the same packet may be sent over different ports, over different directional beams, or using different pre-coders.

In some examples, the number of repetitions of a packet and/or the time window within which to send repetitions may be set by RRC signaling. In such examples, the UE 115-*a* may monitor for retransmissions of a packet within the configured window. Additionally or alternatively, the information regarding the number of repetitions or the repetition window may be included in the first transmission (e.g., as a flag) and/or in the retransmissions themselves. In such examples, the UE 115-*a* may monitor for downlink transmissions, and the HARQ process ID and new data indicator (NDI) in the shortened downlink control information (sDCI) may indicate whether a particular transmission is a new transmission or a retransmission. The wireless communications system 200 may be configured to accept back-to-back transmissions even before a round trip time (RTT) has finished, as opposed to dropping a back-to-back transmission based on the RTT.

In some examples, the resources allocated for a transmission or a retransmission may be indicated via sDCI for each sTTI 220. In such examples, the UE 115-*a* may monitor control regions within each sTTI 220 during the repetition period. Additionally or alternatively, the base station 105-*a* may indicate a group of sTTIs 220 to the UE 115-*a* to monitor for transmissions and retransmissions during a configuration stage (e.g., via RRC signaling). Although a grant-based approach may use an increased amount of control signaling as compared to a grant-free approach (described in more detail below), each sTTI 220 may be individually decodable by a UE 115-*a* (e.g., each sTTI 220 may be self-sufficient). Moreover, a grant-based approach may facilitate dynamic resource allocation (e.g., from one sTTI 220 or transmission opportunity to the next) once CSI feedback is available to the base station 105-*a*.

In some examples, the UE 115-*a* may be configured to send a NAK to indicate to the base station 105-*a* that a downlink transmission was not successfully decoded. For example, the UE 115-*a* may be configured to send a NAK once all the downlink messages (e.g., sent over sPDSCH) have been received and combined. The UE 115-*a* may wait to send the NAK until after the retransmission window has lapsed or until the specified number of retransmissions have occurred, as specified by RRC signaling, for example. Additionally or alternatively, the UE 115-*a* may be configured to send a NAK each time a downlink message fails to successfully decode. For example, the UE 115-*a* may fail to decode a first downlink message and then send a NAK. However, in the meantime, the UE 115-a may receive the first retransmission of the downlink message, combine it with the first transmission, and successfully decode the message. In this example, because the UE 115-*a* already sent a NAK, the base station 105-*a* may send a second retransmission of the downlink message, which may be redundant. To save power, the UE 115-*a* may discard a redundant downlink transmission once the UE 115-*a* successfully decodes a message. These features may also be applied to the base station 105-*a* sending a NAK to the UE 115-*a*.

In some examples, the UE 115-*a* may be configured to send an ACK to indicate to the base station 105-*a* that a downlink transmission was successfully decoded. Similar to the NAK as discussed above, the UE 115-*a* may be configured to wait until all the downlink transmissions have been received and combined before sending the ACK. However, to save power, the UE 115-*a* may be configured to send an ACK once a packet is successfully decoded (e.g., even before the repetition window has elapsed), which may allow the UE 115-*a* to avoid decoding redundant downlink transmissions. Additionally or alternatively, the UE 115-*a* may be configured to send an ACK as soon as a packet is successfully decoded without regard to the repetition window. These features may also be applied to the base station 105-*a* sending an ACK to the UE 115-*a*.

In some examples, instead of sending a grant for each downlink transmission, the wireless communications system 200 may be configured for grant-free repetition of a downlink transmission. In a grant-free repetition scheme, the retransmissions may include only the data itself, whereas under a grant-based approach, each retransmission may include some control information (e.g., an assignment of resources) along with the retransmitted data. A grant-free transmission scheme may be activation-based or activation-free.

For example, under an activation-based approach, the base station 105-*a* may configure a UE 115-*a* for grant-free repetition transmission during a configuration stage (e.g., via RRC signaling), and then subsequently send an activation message via a control message (e.g., via sDCI) to activate the UE 115-*a*. In some other examples, a grant-free transmission scheme may be activation free. In such examples, the base station 105-*a* may reserve certain resources via higher layer signaling (e.g., RRC signaling) for transmission and retransmission of downlink messages. A UE 115-*a* configured for grant-free repetition may be configured for either activation-based or activation-free transmissions. In other examples, a UE 115-*a* may be configured to monitor for both activation-based and activation-free transmissions, but each data pipe may be independent (e.g., each approach may be used for different types of services or payload sizes). To monitor for both configurations, the wireless communications system 200 may use different radio network temporary identifiers (RNTIs) for grant-free TBS and grant-based (e.g., dynamically scheduled) TBS. Additionally or alternatively, a UE 115-*a* may be configured to use both grant-free and grant-based approaches for the same transport block (TB). For example, a TB can be transmitted using a mixture of grant-free and grant-based approaches with different RNTIs.

As indicated above, under an activation-based approach, resources used, as well as a repetition window (e.g., a repetition duration and/or how many repetitions will occur during the window) may be signaled to the UE 115-*a* during a configuration stage (e.g., via RRC signaling). In some examples, the MCS, resource allocation, and other relevant control information may be established during the configuration stage. Moreover, the sTTIs 220 used for transmission and retransmission of a downlink message within a repetition window may also be indicated to the UE 115-*a* during the configuration stage.

Additionally or alternatively, an activation message may indicate resources for one sTTI 220, while the UE 115-*a* may derive other sTTIs (e.g., based on an algorithm for hopping). For example, if a UE 115-*a* received a first downlink message on a particular time or frequency resource (e.g., during a particular sTTI), the UE 115-*a* may derive the time or frequency resources used for retransmissions based on a known correlation. In some other examples, an activation message may indicate the resources for all the sTTIs during a given repetition window. In yet other examples, a set of resources may be configured via RRC signaling, and the activation message may indicate certain resources for each transmission opportunity from the configured set. In some cases, turbo coding may be used under the activation-based approach may be turbo coding. Although the above features are described in the context of a downlink message, these features may also be applied for uplink transmissions and the associated retransmissions, from the UE 115-*a* to the base station 105-*a*.

Under an activation-free approach, some of the resources (e.g., particular sTTIs 220 or frequency resources) used for transmission and retransmission may be configured via higher layer signaling (e.g., RRC signaling). In some examples, the packets to be transmitted may be relatively small (e.g., the sizes of control payload). In such examples, instead of sending an assignment of resources (e.g., a grant) along with the data, the base station 105-*a* may instead send the data without any explicit control signaling. Under this configuration, the UE 115-*a* may be configured to monitor (e.g., using blind decoding) the pre-configured time and frequency resources for potential data transmissions.

In some examples, the wireless communications system 200 may use an activation-free approach by default (e.g., as a minimum data pipe) and may use the activation-based approach if there is additional demand. In some examples, one or a set of transport block sizes (TBSs) may be configured under the activation-free approach. Since the data packets may be relatively small, tail biting convolution coding (TBCC) may be used for the coding scheme. Also, if multiple TBSs are indicated, the UE 115-*a* may perform decoding over each of the indicated resources with multiple hypothesis (e.g., each hypothesis being associated with one TBS). In addition to TBS, the UE 115-*a* may decode with multiple hypothesis of MCS or other channel configurations. The UE 115-*a* may implicitly derive the MCS based on the indicated time and frequency resources and the indicated set of TBSs.

Under a grant-free approach, the HARQ process ID for a communication may be either explicitly or implicitly derived based on an sTTI index. For an activation-based scheme, the HARQ process ID may be explicitly derived based on the index of the sTTI 220 (e.g., STTI0) where the activation message is received. To derive the HARQ process ID from an sTTI index, the UE 115-*a* or base station 105-*a* may send a packet once it is ready. However, for an activation-free scheme, a receiver may test multiple hypotheses in order to decode the data and obtain the HARQ process ID. In some cases, the HARQ process ID may be implicitly derived based on an sTTI index and the HARQ RTT. For example, if the HARQ RTT is 1 ms and an sTTI pattern is used as shown in timing diagrams 215, there may be six implicit HARQ processes. In some examples, a receiver may combine retransmissions of the same implicit HARQ process ID. Additionally or alternatively, a receiver may decode a current sTTI 220 by itself and/or the current sTTI 220 plus a previous sTTI 220 if automatic repetition is enabled. In some examples, if a packet is decoded by itself, the packet may be delivered (e.g., to higher layers) even if there is some HARQ process ID ambiguity. Under this approach, the HARQ may be considered synchronous (e.g., one HARQ process followed by another).

In some examples, under an activation-free scheme, a receiver may not be able to distinguish between a failed transmission and an absence of a transmission. Therefore, the receiver may not send a NAK. An ON-OFF keying feature for ACK/NAK may be adopted, whereby NAK may not be sent, but ACK may be sent.

In some examples, a combination of activation-free and activation-based approaches may be used. For example, if an activation-free transmission fails, an activation-based transmission scheme may be used for the retransmission.

In some examples, the resources allocated (e.g., via RRC signaling) for transmission or retransmissions may be modified by the base station 105-*a*. For example, the base station 105-*a* may indicate to the UE 115-*a* whether a transmission is data or control, and if control, whether the resources have been modified or not. In some examples, the base station 105-*a* may indicate to the UE 115-*a* whether a transmission is control or data by introducing a flag within the downlink transmission. If the UE 115-*a* successfully decodes the data, the flag (e.g., a 1-bit field flag) may indicate whether the decoded message should be interpreted as data or as control. In the case of a control message, the base station 105-*a* may indicate a TB to be scheduled over a different set of resources than those originally indicated via RRC signaling. In some examples, a 16-bit CRC may be insufficient to handle false alarms associated with control information and/or data. Therefore, in certain examples, a virtual CRC may be introduced with an 8-bit information bit within the data or control information that is used as a virtual CRC. The 8 bits may all be set to zeros, which may reduce the false alarm probability to that associated with a 24-bit CRC.

In other examples, instead of using a flag, the UE 115-*a* may use different CRC hypotheses for control and for data. As such, once a downlink message is decoded, the UE 115-*a* may check the decoded message against two hypotheses. One hypothesis may be a 16-bit CRC for control and the other hypothesis may be a 24-bit CRC for data. In this example, a flag may not be needed to distinguish between control and data.

In some examples, a base station 105-*a* may configure different resources for the initial transmission than the retransmission. For example, an initial transmission may use 10 RBs or one sTTI 220, whereas a first retransmission may use 20 RBs or two sTTIs 220. The receiver (e.g., the UE 115-*a*) may be configured to decode each message using multiple hypotheses (e.g., assuming 10 RB then assuming 20 RB), but doing so may increase the receive complexity. Alternatively, an indicator channel (e.g., a compact channel) may be used to indicate the resources used for the transmission and/or a retransmission, and the UE 115-*a* may be configured to monitor the indicator channel. In some examples, a control message and the data may be sent together. For example, a set of RRC-configured parameters for each transmission and retransmission may be indicated, and an index may be used in the control message to indicate to the receiver (e.g., the UE 115-*a*) which set of parameters to use to decode the message.

Under a grant-free approach, the wireless communications system 200 may employ collision avoidance features to prevent collisions during uplink transmissions, for example. In some examples, for uplink transmission, the base station 105-*a* may assign each UE 115 a set of UE-specific resources. In this example, if the base station 105-*a* receives an uplink transmission on some UE-specific resources, the base station 105-*a* may be able to determine which UE 115 sent the transmission. Additionally or alternatively, the base station 105-*a* may assign a group of UEs 115 to an identical set of resources for both uplink and downlink communications. In such examples, the base station 105-*a* may need to determine which UE 115 from the group of UEs 115 sent an uplink transmission.

The wireless communications system 200 may employ one or more techniques for identifying which UE 115 sent an uplink transmission when a set of resources is shared among a group of UEs 115. In one example, a base station 105-*a* may identify a UE 115 (e.g., UE 115-*a*) based on a DMRS sequence that is uniquely assigned to the particular UE 115 within the group. However, if the wireless communications system 200 is configured to use a one-symbol sTTI for uplink transmission (e.g., for sPUSCH), identifying a UE 115 based on a unique DMRS sequence may not be used, because the DMRS may not be sent along with data over a one-symbol sTTI. In another example, the base station 105-*a* may identify a UE 115 by testing multiple hypotheses regarding the identity of the UE 115. For example, if the uplink data is scrambled by C-RNTIs, then the base station 105-*a* may try to decode an uplink message based on the various C-RNTIs of the group of UEs 115. Once an uplink message is successfully decoded, the base station 105-*a* may determine that the UE 115-*a* associated with that C-RNTI sent the uplink message.

In another example, the base station 105-*a* may determine the identity of a UE 115 based on a media access control (MAC) protocol data unit (PDU). For example, a particular group of UEs 115 may be assigned a group-specific RNTI. In such an example, the data for each UE 115 in the group may be scrambled by the same RNTI. Therefore, the base station 105-*a* may attempt to decode an uplink message based on the group-specific RNTI, which may reduce the number of hypotheses needed to decode as compared to decoding based on UE-specific C-RNTIs. Once an uplink message is successfully decoded, the identity of the UE 115-*a* that sent the message may be derived based on the MAC PDU.

In some examples, the wireless communications system 200 may employ one or more techniques for grouping multiple UEs 115 that share a set of resources for uplink transmissions. For example, the base station 105-*a* may group UEs 115 based on their respective location within a cell, which may correspond to their signal strength with respect to the base station 105-*a*. Accordingly, assuming successive interference cancellation (SIC) at the base station 105-*a*, it may be beneficial to group UEs 115 based on their signal strength (e.g., based on a rate region comparison between various UEs 115-*a* and/or CSI reports). In an example, UEs 115 near the center of the cell may be grouped together in one or more groups, whereas UEs 115 near the edge of a cell may be grouped together. Alternatively, UEs 115 near the edge of a cell may be assigned UE-specific resources. Once groups of UEs 115 are formed, the base station 105-*a* may assigned resources (e.g., sTTIs and frequency resources) to the various groups.

In some examples, the base station 105-*a* may form groups of UEs 115 for each transmission opportunity to randomize the possibility of collisions. For example, the base station 105-*a* may group a first UE 115 (e.g., UE 115-*a*) and a second UE 115 (not shown) together for a first transmission opportunity, but group UE 115-*a* with a third UE 115 for a subsequent transmission opportunity. Additionally or alternatively, instead of forming different groups of UEs 115 for each transmission opportunity, the base station 105-*a* may assign different sequences for each group (e.g., similar to CDMA-like approach). In some examples, a combination of these two approaches may be used.

The base station 105-*a* may further randomize the potential for uplink collisions by assigning UE-specific time domain variations. For example, the time domain variations may be pre-determined (e.g., based on RNTI of a UE 115-*a*) or the UE 115-*a* may choose a time domain variation randomly. In some examples, certain time resources within a group (e.g., a window of time) may be designated for random retransmission.

Figure 3:
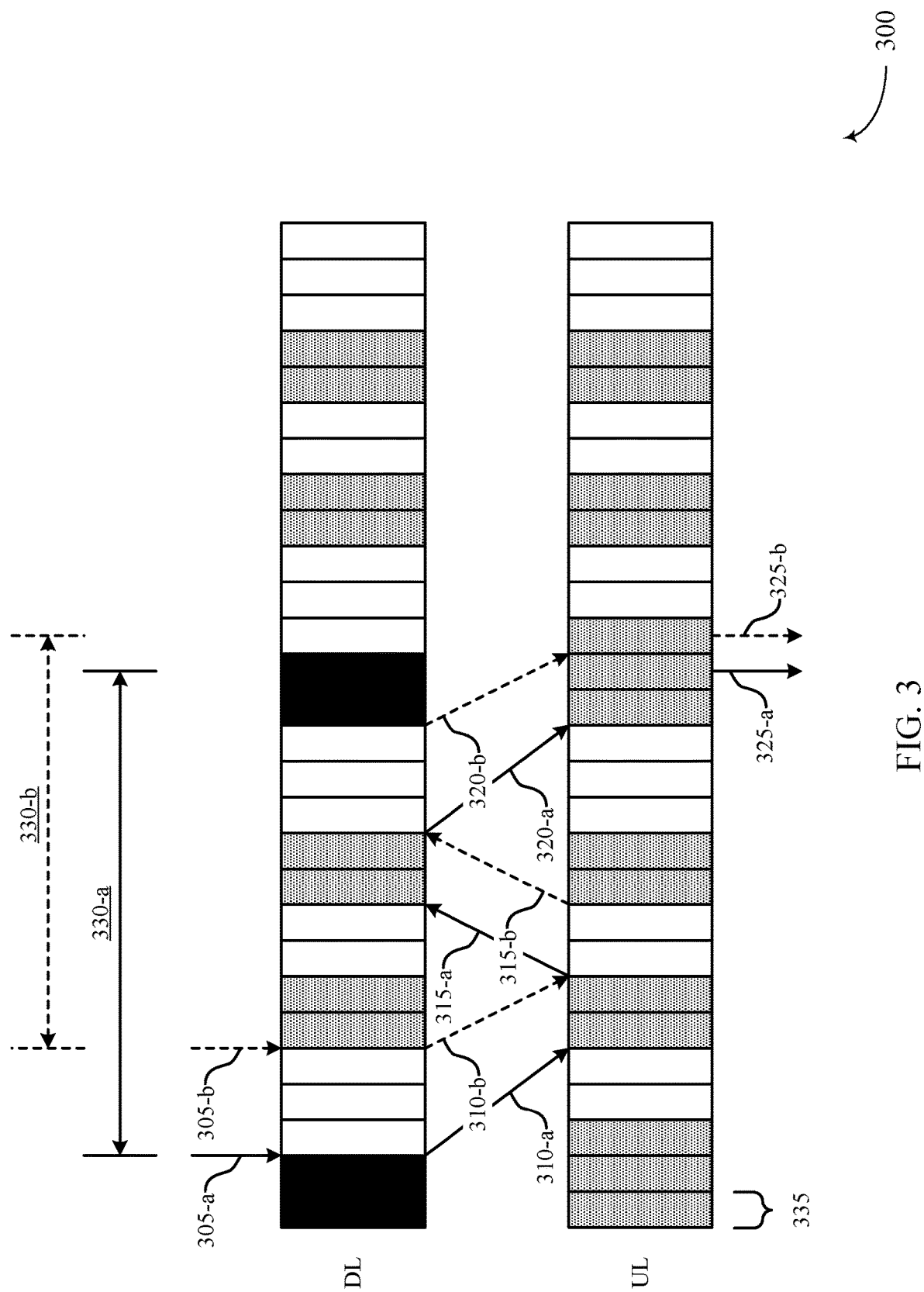
FIGS. 3-11 illustrate examples of transmission time interval (TTI) timing diagrams that support downlink and uplink transmissions for high reliability low latency communications systems in accordance with aspects of the present disclosure.

For downlink communications, the base station 105-*a* may serve multiple UEs 115-*a* over the same resources. In such examples, the base station 105-*a* may employ multi-user MIMO (MU-MIMO) techniques and/or multi-user superposition transmission (MUST) techniques. Alternatively, the base station 105-*a* may transmit downlink messages to multiple UEs 115 without any multi-user techniques or considerations FIG. 3 illustrates an example of a timing diagram 300 that supports downlink and uplink communications for high reliability, low latency wireless communications systems in accordance with various aspects of the present disclosure. The timing diagram 300 illustrates two subsequent downlink subframes and two subsequent uplink subframes for a total of 28 symbols 335 for the uplink and the downlink. The timing diagram 300 also illustrates two different downlink transmission processes that start at different times within the subframe depending on when the data was transferred from higher layers (e.g., at data transfer 305-*a* or at data transfer 305-*b*). The CFI for the two downlink subframes in this example is set to two, which corresponds to a layout of sTTIs with lengths [2,3,2,2,2,3] (i.e., the first sTTI has a duration of two symbols 335, the second sTTI has a duration of three symbols 335, etc.). As indicated above, an initial sTTI or portion of an initial sTTI of each subframe (e.g., the first two symbols 335) may be allocated for legacy control channel transmissions (e.g., legacy PDCCH transmissions). The corresponding two uplink subframes may have a fixed layout of sTTIs with lengths [3,2,2,2,2,3]. The timing diagram 300 may illustrate n+2 processing timing (e.g., a wireless device may allocate two symbols 335 for receiving, processing, and responding to a message).

The first downlink process may begin with a transmitter of a wireless device (e.g., a base station 105 as described with reference to FIGS. 1 and 2) receiving a data transfer 305-*a* from higher protocol layers (e.g., layers higher than the physical layer). The base station 105 may transmit a data packet in a first transmission 310-*a* during an sTTI (e.g., the three-symbol sTTI following the initial sTTI) based on the data transfer 305-*a*. A second wireless device (e.g., a UE 115 as described with reference to FIGS. 1 and 2) may not correctly receive the data packet, and may transmit a NAK in transmission 315-*a* in response to the first transmission 310-*a*. The base station 105 may receive the NAK, and may retransmit the data packet in retransmission 320-*a* to the UE 115. In this way, the retransmission 320-*a* may occur during the same subframe as the initial transmission 310-*a*. The UE 115 may successfully receive the data packet in retransmission 320-a, and may perform data transfer 325-a to send the data packet to higher protocol layers of the UE 115. The delay 330-a from the data transfer 305-a at the base station 105 to the data transfer 325-a at the UE 115 may be less than 1 ms. The UE 115 may receive the data packet with a predetermined reliability requirement (e.g., a reliability requirement of $10^{-5}$) based on the retransmission 320-a within a predetermined timing requirement (e.g., a timing requirement of 1 ms).

The second downlink process may begin with the transmitter of the base station 105 receiving a data transfer 305-b from higher protocol layers. The base station 105 may transmit the corresponding data packet in a first transmission 310-b to the UE 115. The UE 115 may not correctly receive the data packet, and may transmit a NAK in transmission 315-b in response to the first transmission 310-b. The base station 105 may receive the NAK and may retransmit the data packet. The base station 105 may retransmit the data packet in a next subframe based on the timing of the initial data transfer 305-b. However, as discussed above, in a legacy wireless service, the initial sTTI or a portion of an initial sTTI of a subframe may be reserved for control channel transmissions for the legacy wireless service (e.g., legacy PDCCH).

In some cases, retransmitting the data packet after the legacy control channel sTTI may result in a delay 330, from the data transfer 305-b at the base station 105 to the data transfer 325-b at the UE 115 to exceed a predetermined timing requirement (e.g., a timing requirement of 1 ms). To reduce latency, the base station 105 may instead transfer the data packet during the legacy control channel sTTI. For example, the base station 105 may transmit LTE or NR URLLC sPDSCH and/or sPDCCH (e.g., data and/or control) transmissions within the legacy control channel sTTI. The base station 105 may retransmit the data packet in retransmission 320-b to the UE 115. In some cases, upon reception, the UE 115 may perform data transfer 325-b to pass the data packet to higher protocol layers. The delay 330-b may be less than 1 ms based on transmitting retransmission 320-b during the legacy control channel sTTI, which may allow the base station 105 to meet the predetermined reliability and timing requirements.

Figure 4:
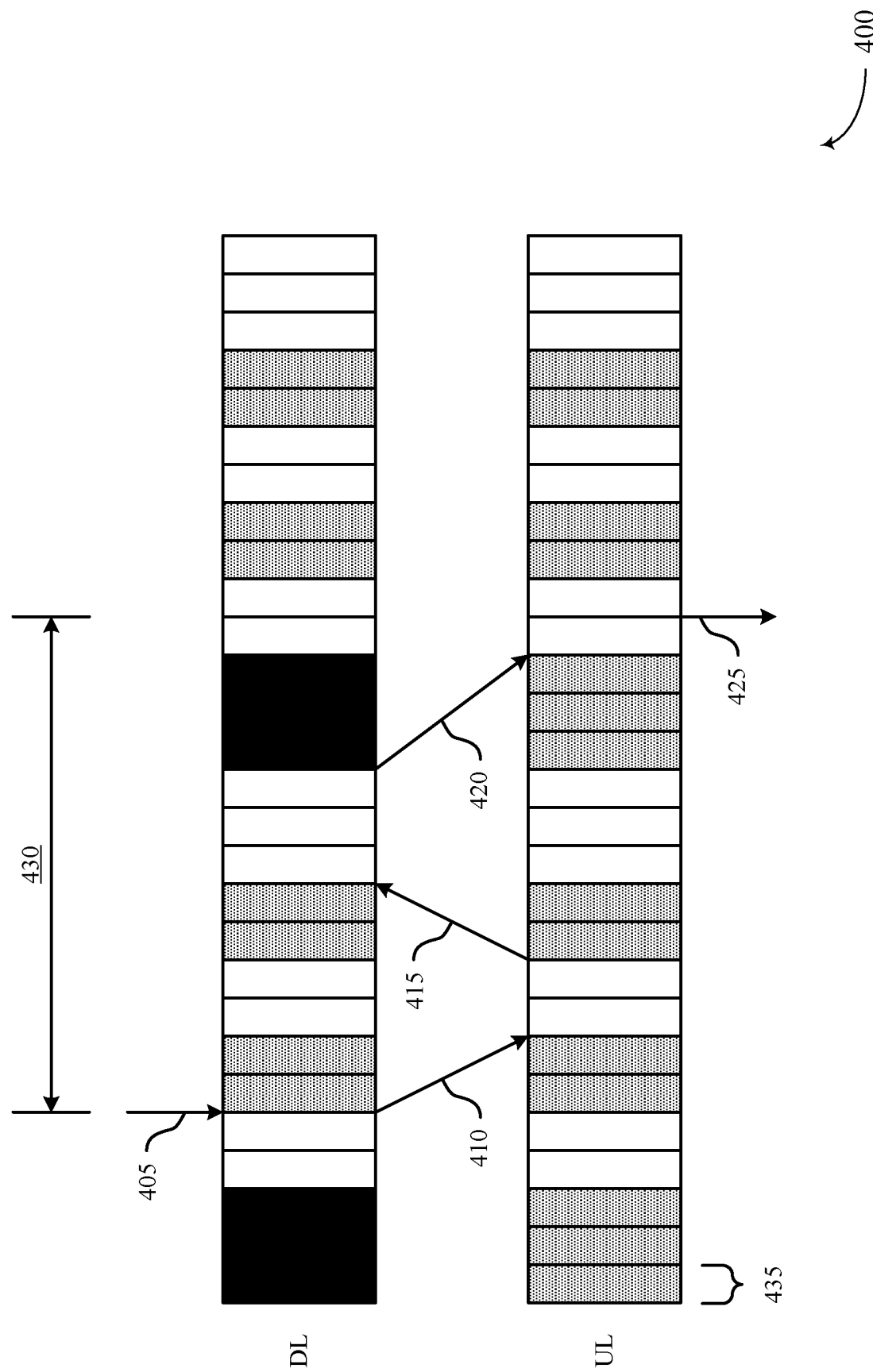

FIG. 4 illustrates an example of a timing diagram 400 that supports downlink and uplink communications for high reliability, low latency wireless communications systems in accordance with various aspects of the present disclosure. The timing diagram 400 illustrates two subsequent downlink subframes and two subsequent uplink subframes. The CFI for the two downlink subframes in this example is set to three, which corresponds to a layout of sTTIs with lengths [3,2,2,2,2,3] (i.e., the first sTTI has a duration of three symbols 435, the second sTTI has a duration of two symbols 435, etc.). As indicated above, an initial sTTI or portion of an initial sTTI of each subframe (e.g., the first three symbols 435) may be allocated for legacy control channel transmissions (e.g., legacy PDCCH transmissions). The corresponding two uplink subframes may have a fixed layout of sTTIs with lengths [3,2,2,2,2,3]. The timing diagram 400 for downlink retransmission may implement n+2 processing timing.

The base station 105 may receive a data transfer 405 from higher protocol layers. The base station 105 may transmit a data packet in a first transmission 410 during an sTTI (e.g., the second two-symbol sTTI) to a UE 115, as described with reference to FIGS. 1 and 2. The UE 115 may not correctly receive the data packet in the first transmission 410, and may transmit a NAK 415 in response to the first transmission 410. The base station 105 may retransmit the data packet in retransmission 420, which may be in a subsequent subframe. In order to achieve a predetermined timing requirement (e.g., a timing requirement of 1 ms), the base station 105 may transmit retransmission 420 during the initial legacy control channel sTTI of the subsequent subframe (e.g., using an LTE-URLLC sPDSCH/sPDCCH transmission). The UE 115 may correctly receive the data packet based on retransmission 420, and may perform a data transfer 425 to send the data packet to higher protocol layers. The delay 430 between the data transfer 405 and the data transfer 425 may be less than a predetermined timing requirement.

Figures 5A, 5B:
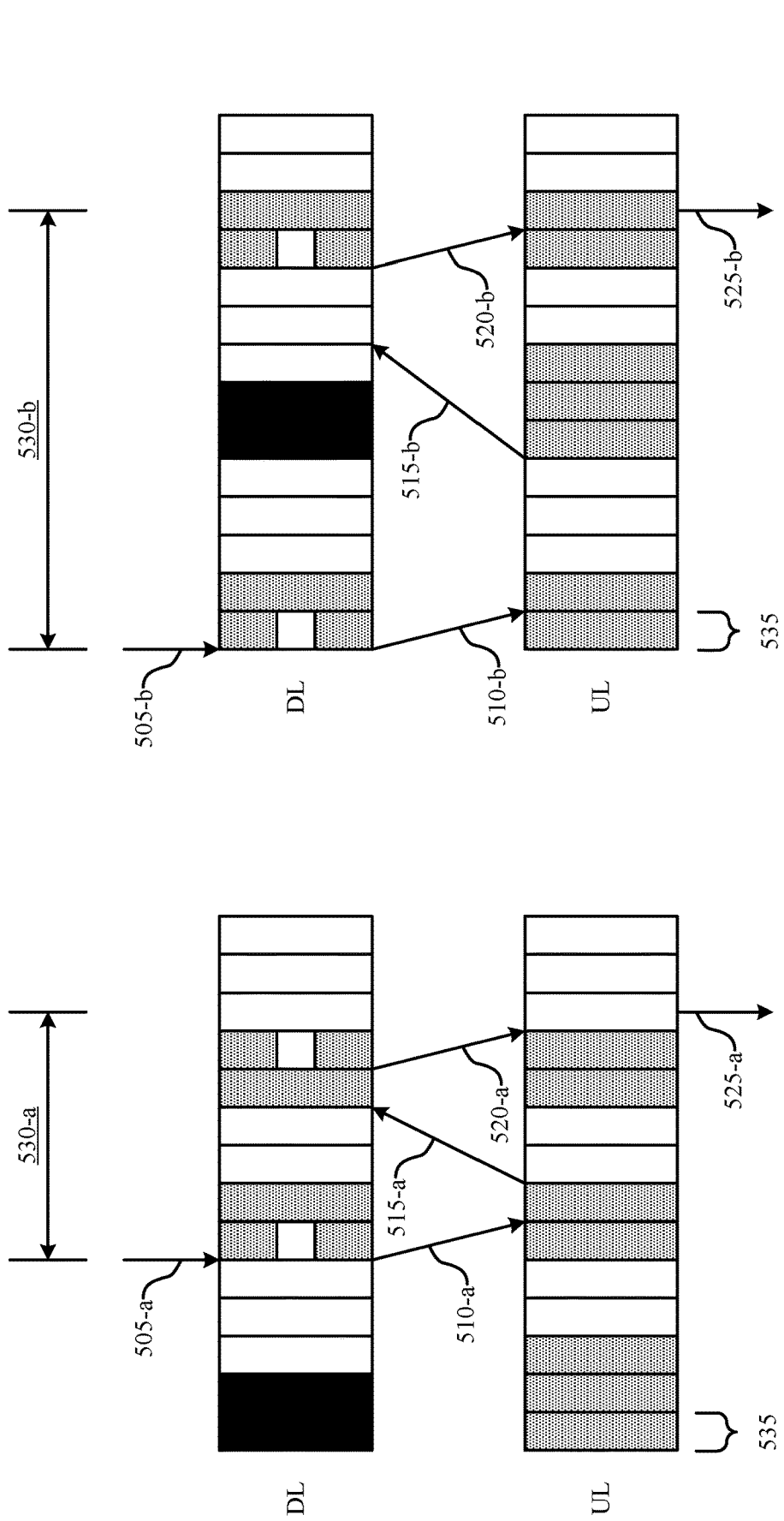

FIG. 5A illustrates an example of a timing diagram 500-a with the CFI set to two, and n+2 timing that supports downlink and uplink transmissions for high reliability, low latency wireless communications systems in accordance with various aspects of the present disclosure. In some cases, the timing diagram 500-a may implement partial sTTIs (e.g., one-symbol sTTIs) on the downlink and sTTIs (e.g., either two or three-symbol sTTIs) on the uplink. The processing timing may be based on the duration of the downlink partial sTTIs (e.g. one symbol duration).

A wireless device, such as a base station 105 as described with reference to FIGS. 1 and 2, may receive a data transfer 505-a from a higher protocol layer. The base station 105 may transmit a data packet corresponding to the data transfer 505-a in transmission 510-a. The base station 105 may send transmission 510-a in a partial downlink sTTI to a second wireless device, such as a UE 115. The UE 115 may not correctly receive the data packet in transmission 510-a, and may transmit a NAK 515-a in response. In some cases, the UE 115 may transmit the NAK 515-a in an uplink sTTI, which may be an example of a two-symbol or three-symbol sTTI.

The base station 105 may receive the NAK 515-a, and may retransmit the data packet in retransmission 520-a. Similar to transmission 510-a, the base station 105 may send retransmission 520-a in a partial downlink sTTI to the UE 115. The UE 115 may correctly receive the data packet based on retransmission 520-a, and may perform a data transfer 525-a to send the data packet to a higher protocol layer. The delay 530-a between the data transfer 505-a and the data transfer 525-a may be less than a predetermined timing requirement (e.g., a predetermined timing requirement of 1 ms). The base station 105 may also achieve a predetermined reliability requirement (e.g., a reliability requirement of $10^{-5}$) based on the retransmission 520-a. In some cases, the base station 105 may not allow sPDSCH/sPDCCH transmissions in an initial legacy control channel sTTI of a subframe. However, by using partial sTTIs for the downlink communications, the base station 105 may still achieve the predetermined timing and reliability requirements without transmitting URLLC data during the legacy control region.

FIG. 5B illustrates an example of a timing diagram 500-b with the CFI set to two, and n+3 timing that supports downlink and uplink transmissions for high reliability, low latency wireless communications systems in accordance with various aspects of the present disclosure. In some cases, the timing diagram 500-b for partial sTTI downlink retransmission may implement partial sTTIs (e.g., one-symbol sTTIs) on the downlink and sTTIs (e.g., either two or three-symbol sTTIs) on the uplink. The timing may be based on the downlink partial sTTIs and the n+3 processing timing may be relaxed as compared to the n+2 processing timing.

A base station 105, as described with reference to FIGS. 1 and 2, may receive a data transfer 505-b from a higher protocol layer. The base station 105 may transmit a data packet corresponding to the data transfer 505-b to a UE 115 in transmission 510-b. The base station 105 may send transmission 510-b in a partial downlink sTTI. The UE 115 may process the data packet, and may determine that it did not correctly receive the data packet in transmission 510-b. In some cases, due to the n+3 processing timing, the UE 115 may perform some of the processing of the data packet in the following sTTI, and may not transmit a NAK to the base station 105 until a later sTTI. For example, the UE 115 may incorrectly receive the data packet in a first sTTI, and may transmit a NAK 515-b to the base station 105 in a third sTTI of the subframe, where the UE 115 uses the second sTTI for data processing.

The base station 105 may receive the NAK 515-b, and may retransmit the data packet in retransmission 520-b. In some cases, the base station 105 may send retransmission 520-b in a partial downlink sTTI. The UE 115 may receive retransmission 520-b, and may perform a data transfer 525-b to send the data packet to a higher protocol layer. The delay 530-b between the data transfer 505-b and the data transfer 525-b, even with the more relaxed n+3 processing timing, may be less than a predetermined timing requirement (e.g., a predetermined timing requirement of 1 ms). The base station 105 may also achieve a predetermined reliability requirement (e.g., a reliability requirement of $10^{-5}$) based on the retransmission 520-b. In some cases, the base station 105 may not allow sPDSCH/sPDCCH transmissions in the initial legacy control channel sTTI. However, by using partial sTTIs for the downlink communications, the base station 105 may still achieve the predetermined timing and reliability requirements without transmitting URLLC data during the legacy control region.

Figure 6B:
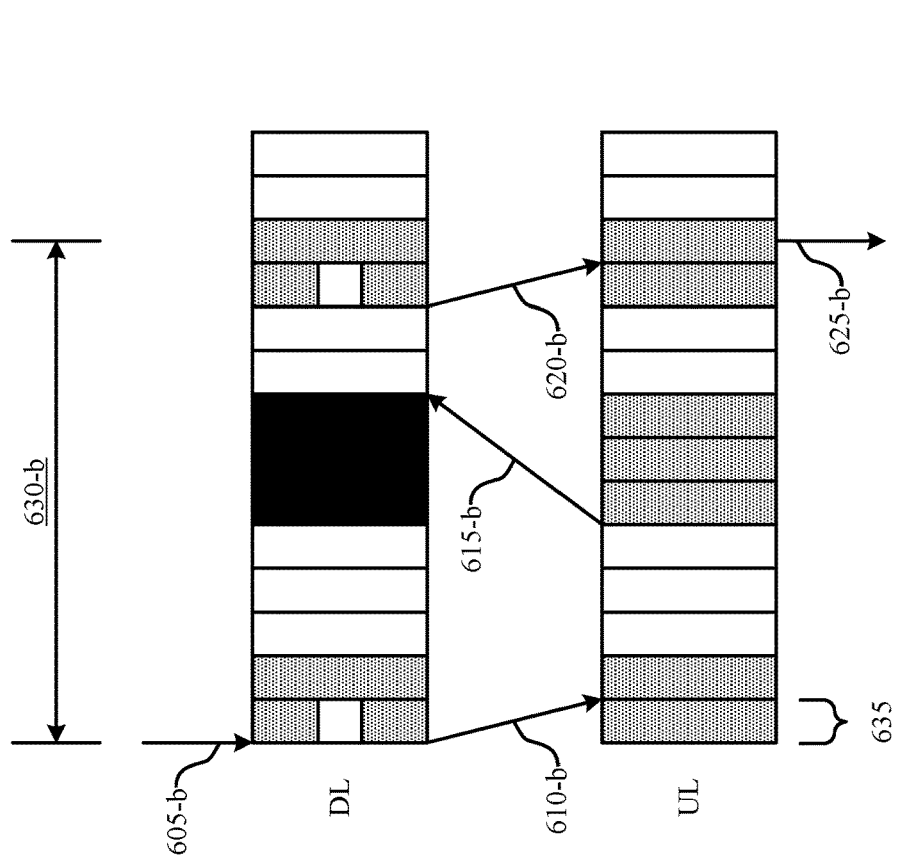
Figure 6A:
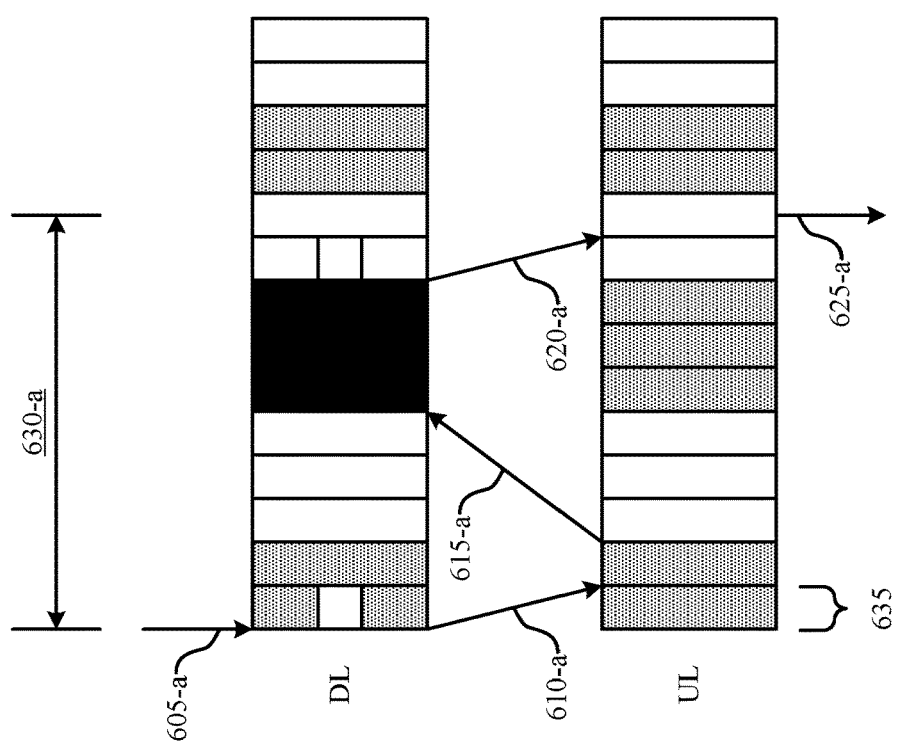

FIG. 6A illustrates an example of a timing diagram 600-a with the CFI set to three, and n+2 timing that supports downlink and uplink transmissions for high reliability, low latency wireless communications systems in accordance with various aspects of the present disclosure. In some cases, the timing diagram 600-a may implement partial sTTIs (e.g., one-symbol sTTIs) on the downlink and sTTIs (e.g., either two or three-symbol sTTIs) on the uplink. The timing may be based on the downlink partial sTTIs.

A wireless device, such as a base station 105, as described with reference to FIGS. 1 and 2, may receive a data transfer 605-a from higher protocol layers. The base station 105 may transmit a data packet corresponding to the data transfer 605-a in transmission 610-a. The base station 105 may send transmission 610-a in a partial downlink sTTI to a second wireless device, such as a UE 115. The UE 115 may not correctly receive the data packet in transmission 610-a, and may transmit a NAK 615-a in response. In some cases, the UE 115 may transmit the NAK 615-a in an uplink sTTI, which may be an example of a two-symbol or three-symbol sTTI. The base station 105 may receive the NAK 615-a. In some cases, the base station 105 may receive the NAK 615-a prior to a legacy control channel sTTI. The base station 105 may determine to retransmit the data packet based on the NAK 615-a, but may not retransmit the data packet during the legacy control channel sTTI. Instead, the base station 105 may retransmit the data packet in retransmission 620-a, which may be in a partial downlink sTTI following the legacy control channel sTTI. The UE 115 may correctly receive the data packet based on retransmission 620-a, and may perform a data transfer 625-a to send the data packet to higher protocol layers. The delay 630-a between the data transfer 605-a and the data transfer 625-a may be less than a predetermined timing requirement (e.g., a predetermined timing requirement of 1 ms). By using partial sTTIs for the downlink communications, the base station 105 may still achieve the predetermined timing and reliability requirements without transmitting URLLC data during the legacy control region.

FIG. 6B illustrates an example of a timing diagram 600-b with the CFI set to three, and n+3 timing that supports downlink and uplink transmissions for high reliability, low latency wireless communications systems in accordance with various aspects of the present disclosure. In some cases, the timing diagram 600-b may implement partial sTTIs (e.g., one-symbol sTTIs) on the downlink and sTTIs (e.g., either two or three-symbol sTTIs) on the uplink. The timing may be based on the downlink partial sTTIs.

A base station 105, as described with reference to FIGS. 1 and 2, may receive a data transfer 605-b from a higher protocol layer. The base station 105 may transmit a data packet corresponding to the data transfer 605-b to a UE 115 in transmission 610-b. The base station 105 may send transmission 610-b in a partial downlink sTTI. The UE 115 may process the data packet, and may determine that it did not correctly receive the data packet in transmission 610-b. In some cases, due to the n+3 processing timing, the UE 115 may perform some of the processing of the data packet in the following sTTI, and may not transmit a NAK to the base station 105 until a later sTTI. For example, the UE 115 may incorrectly receive the data packet in a first sTTI, process the data packet in a second sTTI, and transmit a NAK 615-b to the base station 105 in a third sTTI of the subframe.

The base station 105 may receive the NAK 615-b, and may retransmit the data packet in retransmission 620-b. In some cases, the base station 105 may send retransmission 620-b in a partial downlink sTTI. The UE 115 may receive retransmission 620-b, and may perform a data transfer 625-b to send the data packet to a higher protocol layer. The delay 630-b between the data transfer 605-b and the data transfer 625-b, even with the more relaxed n+3 processing timing, may be less than a predetermined timing requirement (e.g., a predetermined timing requirement of 1 ms). In some cases, the base station 105 may not allow sPDSCH/sPDCCH transmissions in the initial legacy control channel sTTI. However, by using partial sTTIs for the downlink communications, the base station 105 may still achieve the predetermined timing and reliability requirements without transmitting URLLC data during the legacy control region.

Figure 7:
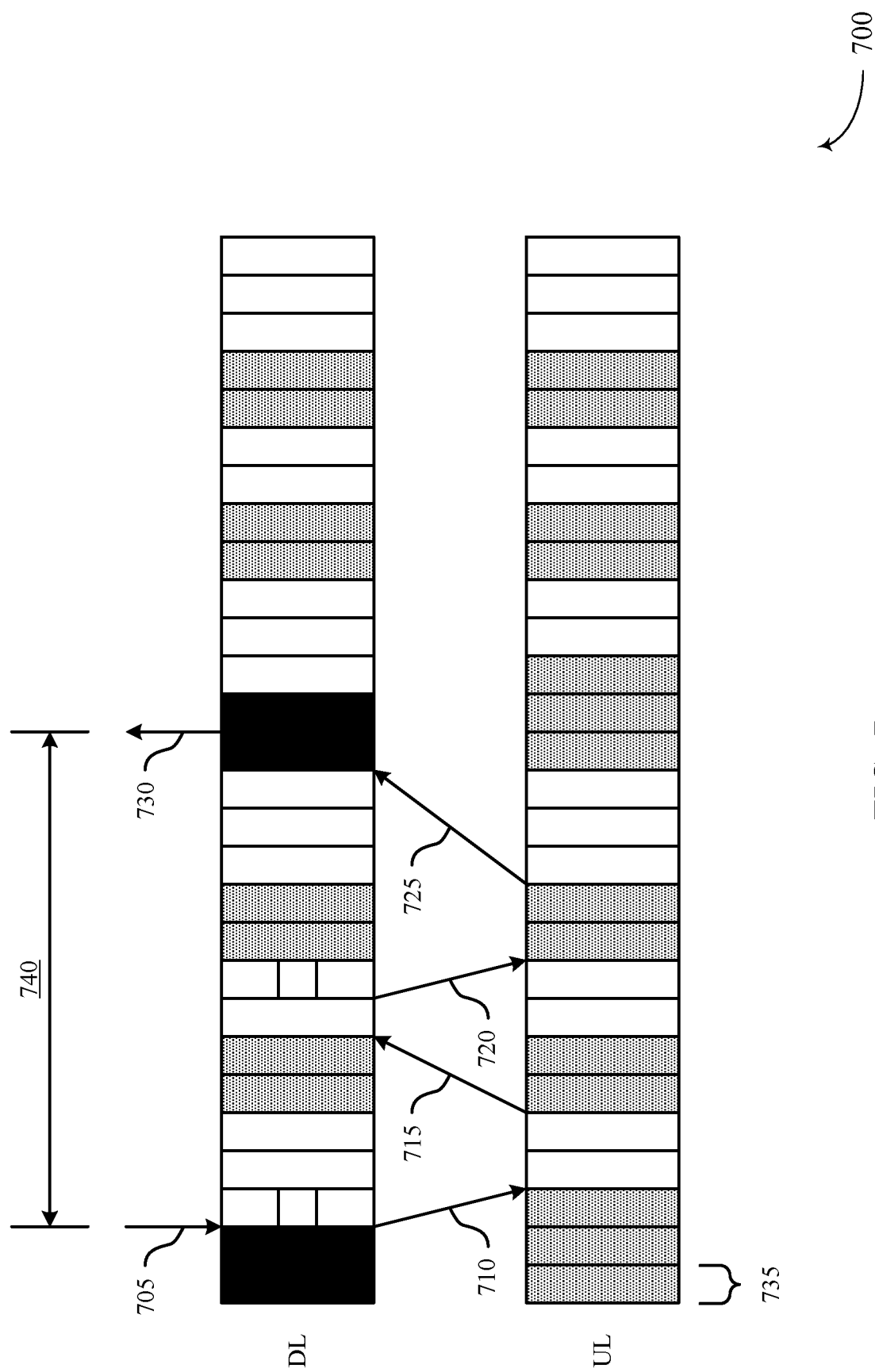

FIG. 7 illustrates an example of a timing diagram 700 with the CFI set to two, and n+2 timing that supports downlink and uplink transmissions for high reliability, low latency wireless communications systems in accordance with various aspects of the present disclosure. In some cases, the timing diagram 700 may implement partial sTTIs (e.g., one-symbol sTTIs) on the downlink and sTTIs (e.g., either two or three-symbol sTTIs) on the uplink. The timing may be based on the duration of the downlink partial sTTIs. In some cases, the wireless device may implement TBS scaling, timing advance (TA) reduction, or a combination of the two to meet the n+2 processing timing.

A wireless device, such as a base station 105, as described with reference to FIGS. 1 and 2, may receive an uplink grant 705 for a UE 115 from higher protocol layers. The base station 105 may indicate the uplink grant information to the UE 115 in transmission 710. In some cases, the base station 105 may send transmission 710 in a partial downlink sTTI. The UE 115 may transmit a data packet to the base station 105 on the resources designated by the uplink grant 705 in transmission 715. In some cases, the base station 105 may not correctly receive the data packet in transmission 715, and may transmit a NAK 720 in response to the transmission 710. For example, the base station 105 may transmit the NAK 720 in a partial downlink sTTI.

The UE 115 may receive the NAK 720, and may retransmit the data packet based on the NAK 720. For example, the UE 115 may retransmit the data packet to the base station 105 in retransmission 725. The base station 105 may correctly receive the data packet based on retransmission 725, and may perform a data transfer 730 to send the data packet to a higher protocol layer. The delay 740 between receiving the uplink grant information 705 and the data transfer 730 may be less than a predetermined timing requirement (e.g., a predetermined timing requirement of 1 ms). The base station 105 and UE 115 may also achieve a predetermined reliability requirement (e.g., a reliability requirement $10^{-5}$) based on the retransmission 725.

Figure 8:
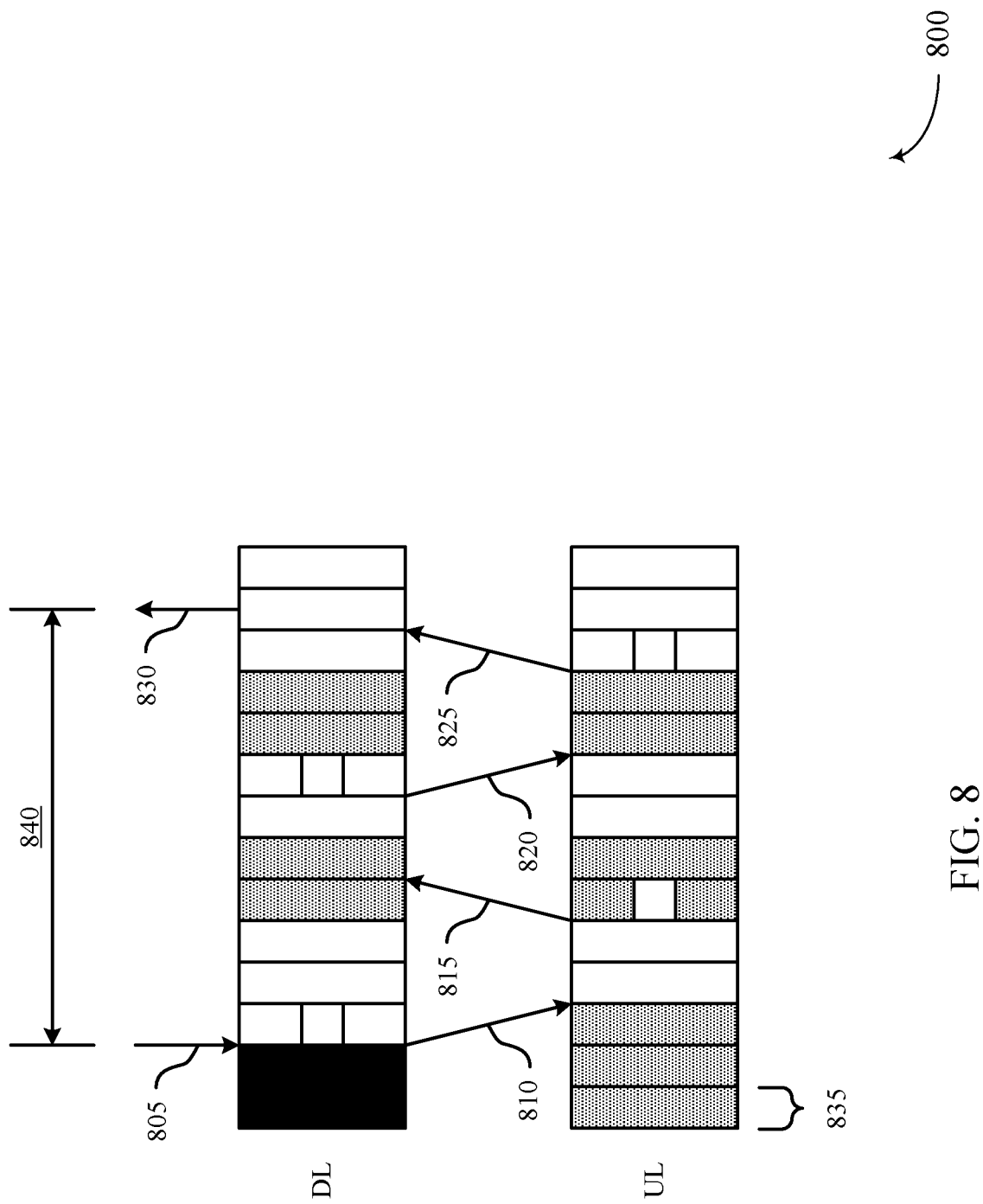

FIG. 8 illustrates an example of a timing diagram 800 with the CFI set to two, that supports downlink and uplink transmissions for high reliability, low latency wireless communications systems in accordance with various aspects of the present disclosure. In some cases, the timing diagram 800 may implement partial sTTIs (e.g., one-symbol sTTIs) on both the downlink and the uplink. The timing diagram 800 may also implement either n+2 or n+3 processing timing. For example, the timing diagram 800 as illustrated implements n+3 processing timing to allow a wireless device more time to process a received data packet.

A wireless device, such as a base station 105, as described with reference to FIGS. 1 and 2, may receive uplink grant 805 for a UE 115 from higher protocol layers. The base station 105 may transmit the uplink grant 805 in a partial downlink sTTI to the UE 115 in transmission 810. The uplink grant 805 may designate resources for the UE 115 to use for data transmission to the base station 105. For example, the uplink grant 805 may designate a one-symbol sPUSCH for an uplink data transmission. The UE 115 may transmit a data packet to the base station 105 on the designated resources in transmission 815. In some cases, the UE 115 may also transmit a SRS, which the base station 105 may use for improved channel estimation. In other cases, the UE 115 may transmit a one-symbol DMRS to the base station 105 with a shorter processing timeline than the data transmission (e.g., the data packet may have n+3 processing timing, while the DMRS may have n+2 processing timing). In some cases, the UE 115 may transmit the DMRS in the same sTTI as transmission 815. In other cases, the UE 115 may transmit the DMRS and transmission 815 in different sTTIs.

The base station 105 may not correctly receive the data packet in transmission 815, and may transmit a NAK 820 in response to the UE 115. For example, the base station 105 may transmit the NAK 820 in a partial downlink sTTI. The UE 115 may receive the NAK 820, and may retransmit the data packet based on the NAK 820. For example, the UE 115 may retransmit the data packet to the base station 105 in retransmission 825 using a one-symbol sPUSCH. The base station 105 may correctly receive the data packet based on retransmission 825, and may perform a data transfer 830 to send the data packet to a higher protocol layer. The delay 840 between receiving the uplink grant information 805 and the data transfer 830 may be less than a predetermined timing requirement (e.g., a predetermined timing requirement of 1 ms). In some cases, the base station 105 and UE 115 may achieve the predetermined timing requirement by using the fast SRS or one symbol 835 DMRS. The base station 105 and UE 115 may also achieve a predetermined reliability requirement (e.g., a reliability requirement of $10^{-5}$) based on the retransmission 825.

Figure 9:
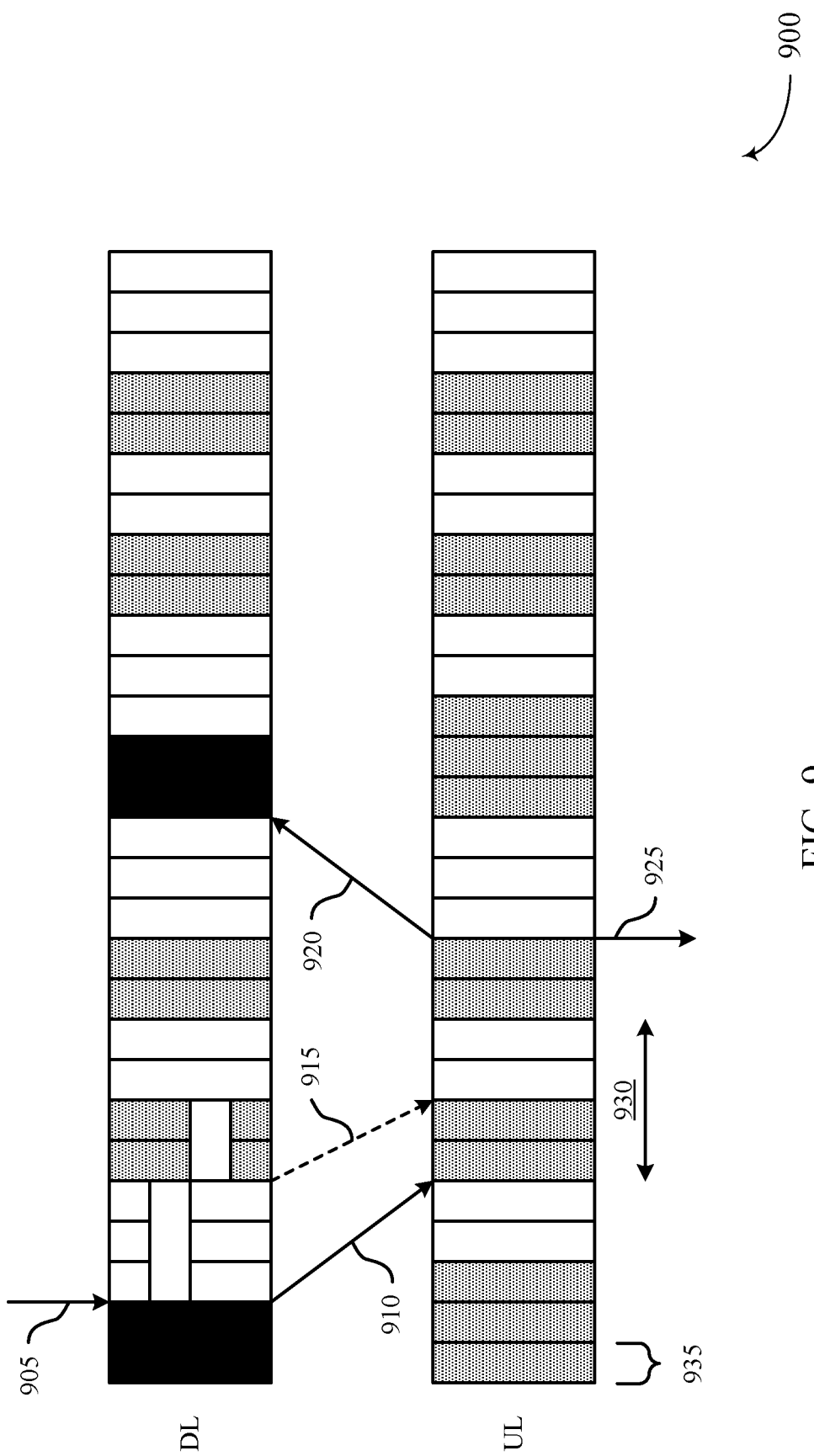

FIG. 9 illustrates an example of a timing diagram 900 for repetition-based downlink retransmission with the CFI set to two that supports downlink and uplink transmissions for high reliability, low latency wireless communications systems in accordance with various aspects of the present disclosure. The timing diagram 900 may support grant-based retransmissions of a data packet without first receiving a NAK. For example, a wireless device (e.g., a base station 105, as described with reference to FIGS. 1 and 2) may indicate resources for a transmission and one or more retransmissions in an sDCI.

The base station 105 may receive a data transfer 905 from higher protocol layers and may transmit a data packet corresponding to the data transfer 905 in transmission 910. The base station 105 may send transmission 910 in a first sTTI (e.g., a three-symbol sTTI). In some cases, the sDCI for transmission 910 may indicate that transmission 910 is a new transmission. The base station 105 may then retransmit the data packet to the UE 115 without waiting for a response (e.g., an ACK or NACK). For example, the base station 105 may transmit the data packet in retransmission 915 in a second sTTI (e.g., a two-symbol sTTI). In some cases, the sDCI for retransmission 915 may indicate that retransmission 915 is a retransmission (i.e., not a new transmission). The UE 115 may receive retransmission 915 and may not ignore the back-to-back transmission based on this indication. In some cases, the base station 105 may transmit additional retransmissions of the data packet to the UE 115. At 930, the UE 115 may combine the received signals from transmission 910 and retransmission 915 to determine the received data packet.

In some cases, the UE 115 may determine the data packet based on combining the transmission 910 and retransmission 915. In these cases, the UE 115 may transmit an ACK 920 to the base station 105, and may perform a data transfer 925 to send the data packet to a higher protocol layer. The base station 105 and UE 115 may transmit the ACK 920 within a predetermined timing requirement and may achieve a predetermined reliability requirement based on the grant-based retransmission 915. In other cases, the UE 115 may not determine the data packet based on combining the transmission 910 and retransmission 915, and may transmit a NAK to the base station 105. The base station 105 may transmit further retransmissions based on receiving the NAK.

Figure 10:
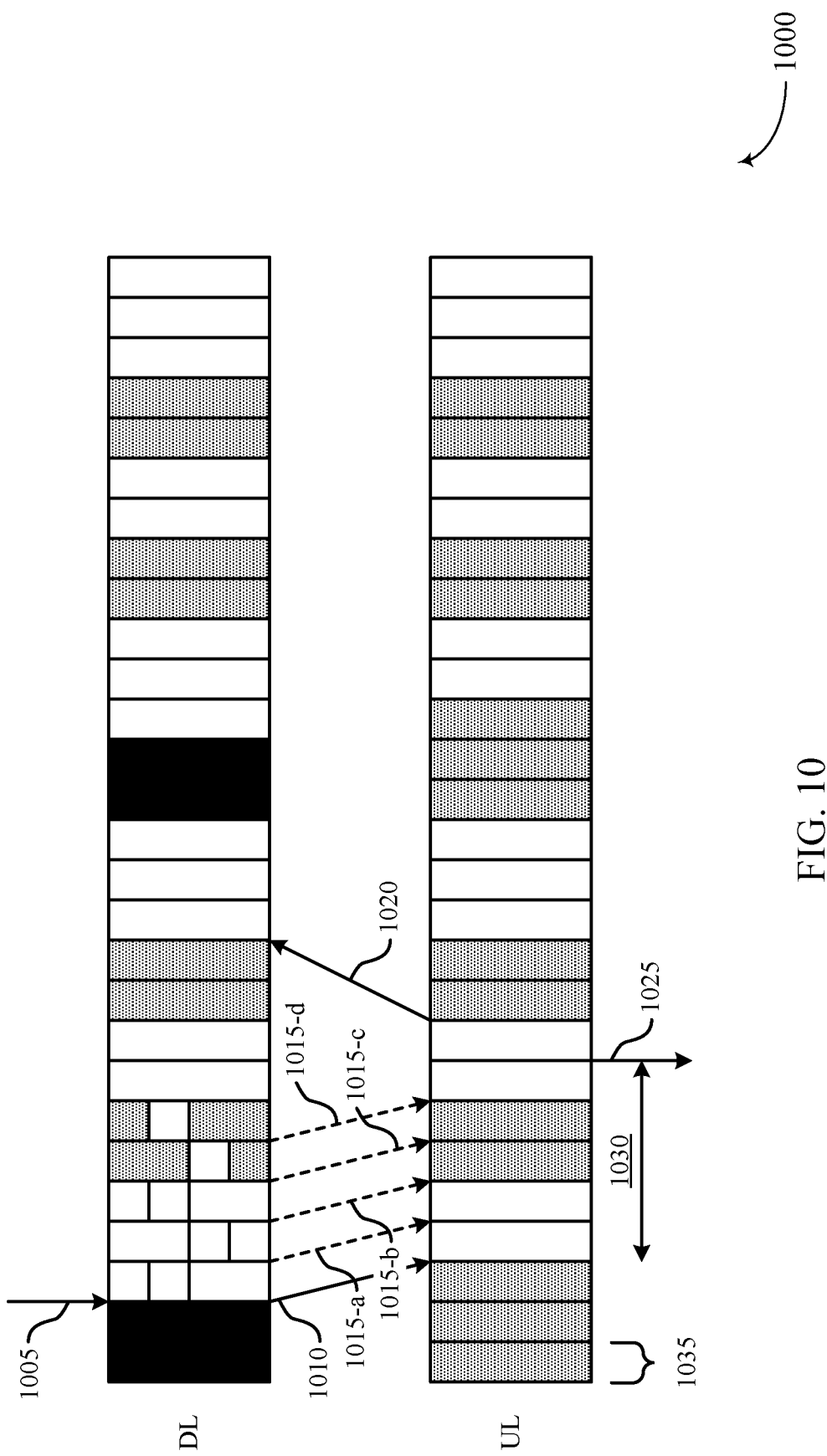

FIG. 10 illustrates an example of a timing diagram 1000 for repetition-based partial sTTI downlink transmission with the CFI set to two that supports downlink and uplink transmissions for high reliability, low latency wireless communications systems in accordance with various aspects of the present disclosure. The timing diagram 1000 may support grant-based retransmissions of a data packet without the receiving a NAK. For example, a wireless device (e.g., a base station 105, as described with reference to FIGS. 1 and 2) may indicate resources for a transmission and one or more retransmissions in sDCI. The timing diagram 1000 for repetition-based downlink retransmission may implement partial sTTIs (e.g., one-symbol sTTIs) on the downlink and either regular or partial sTTIs on the uplink.

The base station 105 may receive a data transfer 1005 from higher protocol layers and may transmit a data packet corresponding to the data transfer 1005 in transmission 1010. The base station 105 may send transmission 1010 in a first partial sTTI (e.g., a one-symbol sTTI). In some cases, the sDCI for transmission 1010 may indicate that transmission 1010 is a new transmission. The base station 105 may then retransmit the data packet to the UE 115 without waiting for a response (e.g., an ACK or NAK). For example, the base station 105 may transmit the data packet in multiple subsequent sTTIs in retransmissions 1015-a, 1015-b, 1015-c, and 1015-d. In some cases, the RRC signaling may indicate the repetition duration (i.e., the number of times a data packet is transmitted and/or a time window within which retransmissions may be sent). The sDCI for each retransmission 1015 may indicate that the retransmission 1015 is a retransmission of transmission 1010. The UE 115 may receive transmission 1010 and each of its retransmissions 1015 and may combine the received signals at 1030 to determine the received data packet.

In some cases, the UE 115 may determine the data packet based on combining the transmission 1010 with the multiple retransmissions 1015. In such cases, the UE 115 may transmit an ACK 1020 to the base station 105, and may perform a data transfer 1025 to send the data packet to a higher protocol layer. The base station 105 and UE 115 may transmit the ACK 1020 within a predetermined timing requirement and may achieve a predetermined reliability requirement based on the multiple grant-based retransmissions 1015. In some other cases, the UE 115 may not determine the data packet based on combining the transmission 1010 and retransmission 1015, and may transmit a NAK to the base station 105. The base station 105 may transmit further retransmissions based on receiving the NAK.

Figure 11:
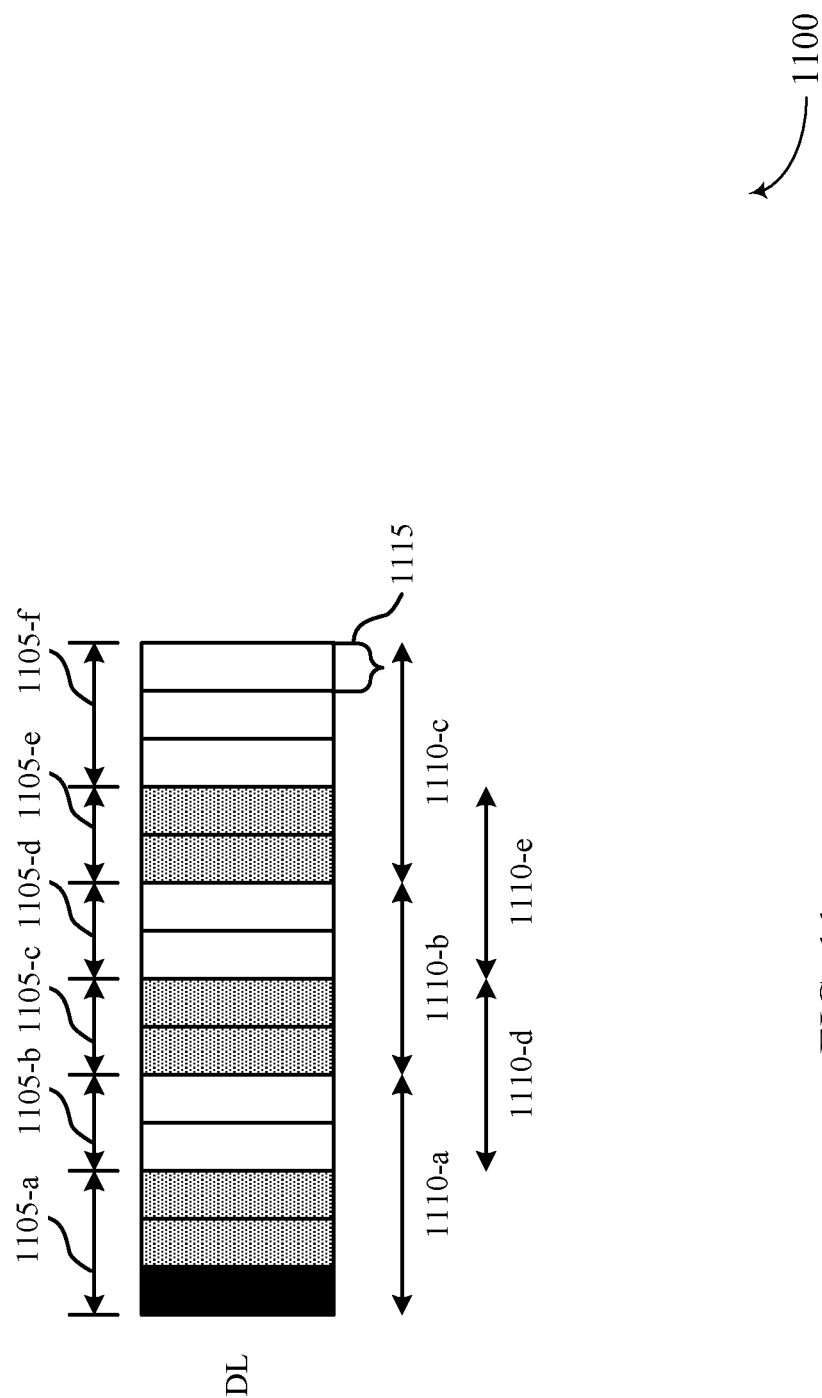

FIG. 11 illustrates an example of an activation-free downlink subframe 1100 with the CFI set to one that supports downlink and uplink transmission for high reliability, low latency wireless communications systems in accordance with various aspects of the present disclosure. In some cases, the same activation-free downlink subframe 1100 scheme may be used with the CFI set to two or three. Additionally, in some cases, the downlink sTTIs 1105 may be examples of partial downlink sTTIs (e.g., one-symbol sTTIs). In some other cases, the downlink sTTIs 1105 may be examples of regular downlink sTTIs (e.g., two or three-symbol sTTIs).

In some cases, a base station 105, which may be an example of a base station 105 as described with reference to FIGS. 1 and 2, may transmit activation-free downlink subframe 1100. In some cases, the base station 105 may refrain from transmitting any control signaling explicitly indicating the retransmissions in activation-free downlink subframe 1100. The base station 105 may transmit multiple TBs in activation-free downlink subframe 1100, where each TB is transmitted in a bundle group of sTTIs 1105. For example, for bundles of size two, bundle 1110-a may include sTTIs 1105-a and 1105-b, bundle 1110-b may include sTTIs 1105-c and 1105-d, bundle 1110-c may include sTTIs 1105-e and 1105-f, bundle 1110-d may include sTTIs 1105-b and 1105-c, and bundle 1110-e may include sTTIs 1105-d and 1105-e. In some cases, the base station 105 may implement other bundle 1110 patterns (e.g., non-overlapping consecutive bundles 1110 of a predetermined bundle size). In some cases, the base station 105 may transmit a TB using different resources, multiple times in a bundle 1110. Additionally, the base station 105 may indicate a HARQ process ID for a bundle 1110 in the first sTTI 1105 of the bundle (e.g., based on the index of the first sTTI 1105). For example, the base station 105 may indicate the HARQ process ID for bundle 1110-a based on the index of sTTI 1105-a.

In some cases, a UE 115 may receive the activation-free downlink subframe 1100, and may test multiple hypotheses to determine the decoded data and the HARQ process ID. For example, if the UE 115 decodes the first sTTI 1105-a, the UE 115 may determine that the decoded data is the first transmission of the bundle 1110-a. The UE 115 may also determine the HARQ process ID based on a decoding process. In some cases, the decoding process may include decoding based on multiple hypotheses, where each hypothesis is associated with a TBS. If the UE 115 does not decode the first sTTI 1105-a, the UE 115 may perform a decoding process on sTTI 1105-b based on two hypotheses. A first hypothesis assumes that sTTI 1105-b is a retransmission within bundle 1110-a. The UE 115 may combine the soft information for sTTI 1105-b with sTTI 1105-a for decoding. If decoding passes, the UE 115 may also determine the HARQ process ID implicitly from the decoding process. A second hypothesis assumes that sTTI 1105-b is a first transmission of a new bundle (e.g., bundle 1110-b). The UE 115 may perform a decoding process on sTTI 1105-b without any combining. Further, if decoding passes, the UE 115 may not decode the HARQ process ID since the UE 115 may not use the HARQ process ID when there is no combining.

Figure 12:
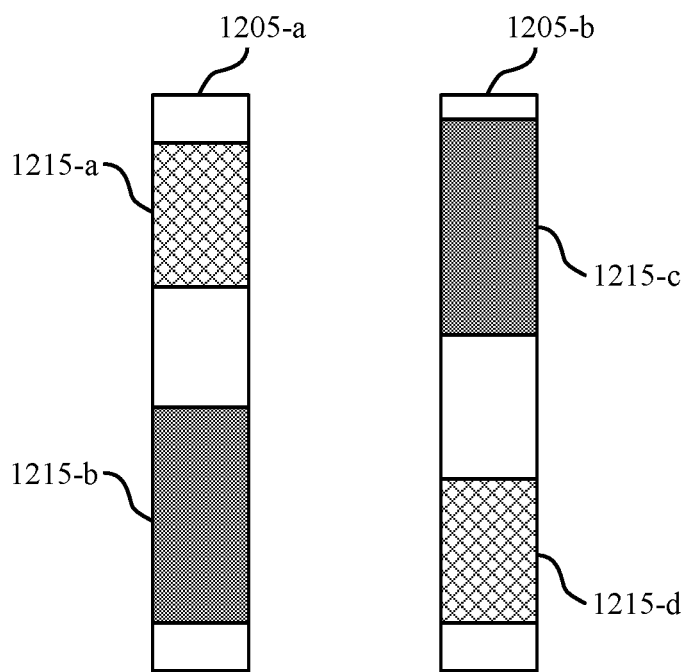
FIG. 12 illustrates an example of a resource and user equipment (UE) allocation configuration that supports downlink and uplink transmissions for high reliability low latency communications systems in accordance with aspects of the present disclosure.
Figure 12:
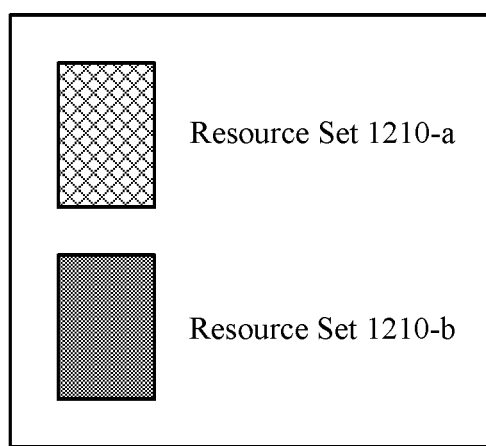

FIG. 12 illustrates an example of UE bundle schemes 1200 that support downlink and uplink transmission for high reliability, low latency wireless communications systems in accordance with various aspects of the present disclosure. A wireless device, such as a base station 105 as described with reference to FIGS. 1 and 2, may allocate the sTTI and frequency resources in the UE bundle schemes 1200 (e.g., based on one or more CSI reports). The base station 105 may randomize collisions by grouping UEs 115 on a per transmission opportunity (TxOP) basis. For example, the base station 105 may use UE grouping 1205-a for a first TxOP and UE grouping 1205-b for a second TxOP.

The base station 105 may assign a first resource set 1210-a to a group of cell-center users. In some cases, grouping cell-center users together may result in a larger rate region than grouping cell-edge users together. The group of cell-center users may be further divided into smaller groups of UEs 115, where each group of UEs 115 is assigned specific resources within resource set 1210-a. The base station 105 may also assign a second resource set 1210-b to a group of cell-edge users. The base station 105 may assign a specific set of resources within resource set 1210-b to each UE 115 of the group of cell-edge users.

In one example, the base station 105 may serve two cell-center users (e.g., a first and second UE 115) and two cell-edge users (e.g., a third and fourth UE 115). In a first transmission, the base station 105 may implement UE grouping 1205-a. The base station 105 may allocate resources 1215-a to the two cell-center users, and may allocate half of the resources 1215-b to one cell-edge user (e.g., the third UE 115) and the other half of the resources 1215-b to the other cell-edge user (e.g., the fourth UE 115). In some cases, one of the users may not be active. The base station 105 may avoid persistent collisions across transmissions based on an inactive user by changing the user groups and allocated resources between TxOPs. For example, the base station 105 may identify a different set of users as cell-center users (e.g., the first and third UE 115) and as cell-edge users (e.g., the second and fourth UE 115) for a second transmission with UE grouping 1205-b. The base station 105 may allocate resources 1215-d to the two cell-center users, and may allocate half of the resources 1215-c to one cell-edge user (e.g., the second UE 115) and the other half of the resources 1215-c to the other cell-edge user (e.g., the fourth UE 115)

Figure 13:
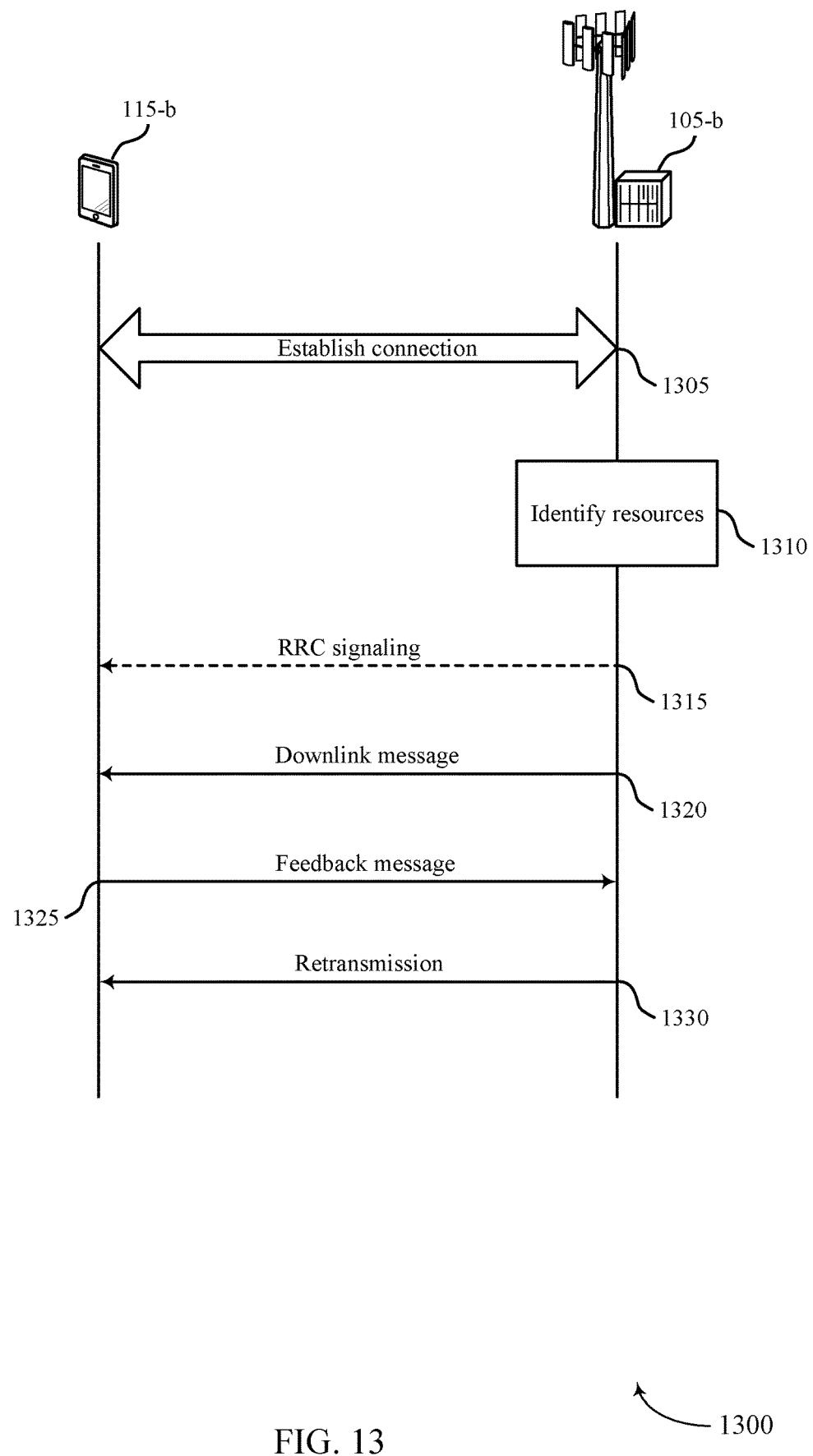
FIGS. 13-16 illustrate examples of process flows that support downlink and uplink transmissions for high reliability low latency communications systems in accordance with aspects of the present disclosure.

FIG. 13 illustrates an example of a process flow 1300 that supports downlink and uplink transmissions for high reliability low latency communications systems in accordance with various aspects of the present disclosure. Process flow 1300 includes UE 115-b and base station 105-b, each of which may be an example of the corresponding device described with reference to FIGS. 1 and 2. Further, UE 115-b and/or base station 105-b may operate in mmW spectrum. In some cases, process flow 1300 may implement aspects of wireless communication systems 100 and/or 200.

At 1305, base station 105-b may establish a connection with UE 115-b. The connection established at 1305 may be an example of the communication link 125 or communication link 205 described with reference to FIGS. 1 and 2. In some cases, the wireless communications system within which UE 115-b and base station 105-b establish the connection at 1305 may support multiple wireless services (e.g., legacy wireless services and enhanced wireless services). In some examples, a first wireless service may have target latency and reliability values that differ from those of a second wireless service.

At 1310, the base station 105-b may identify a first set of TTIs for a first wireless service and a second set of TTIs for the first wireless service, where an initial TTI of each of the sets of TTIs comprises a portion of a control region for a second wireless service. In some examples, the UE 115-b may identify the corresponding resources. The first wireless service may be an example of an URLLC service, and the second wireless service may be an example of a legacy wireless service. In some examples, the control region for the second wireless service comprises PDCCH for the second wireless service.

The TTIs may be examples of sTTIs as described with reference to FIG. 2. In some examples, an initial TTI of each of the sets of TTIs comprises at least two symbols (e.g., a two-symbol sTTI or a three-symbol sTTI as described with reference to FIG. 2). The first set of TTIs and the second set of TTIs may each comprise 14 symbols.

At 1315, the base station 105-b may transmit RRC signaling to the UE 115-b.

At 1320, the base station 105-b may transmit a downlink message for the first wireless service during a TTI of the first set of TTIs. The downlink message may comprises data and/or control for the first wireless service. In some examples, the downlink message may be transmitted during the control region of the first set of TTIs (e.g., during a legacy PDCCH region).

At 1325, the UE 115-b may transmit and the base station 105-b may receive a negative acknowledgement (e.g., a NAK) for the downlink message during a subsequent TTI of the first set of TTIs.

At 1330, the base station 105-b may retransmit the downlink message during the control region of the second set of TTIs (e.g., during a legacy PDCCH region). In some examples, the downlink message may be retransmitted within 1 ms of transmitting the downlink message.

Figure 14:
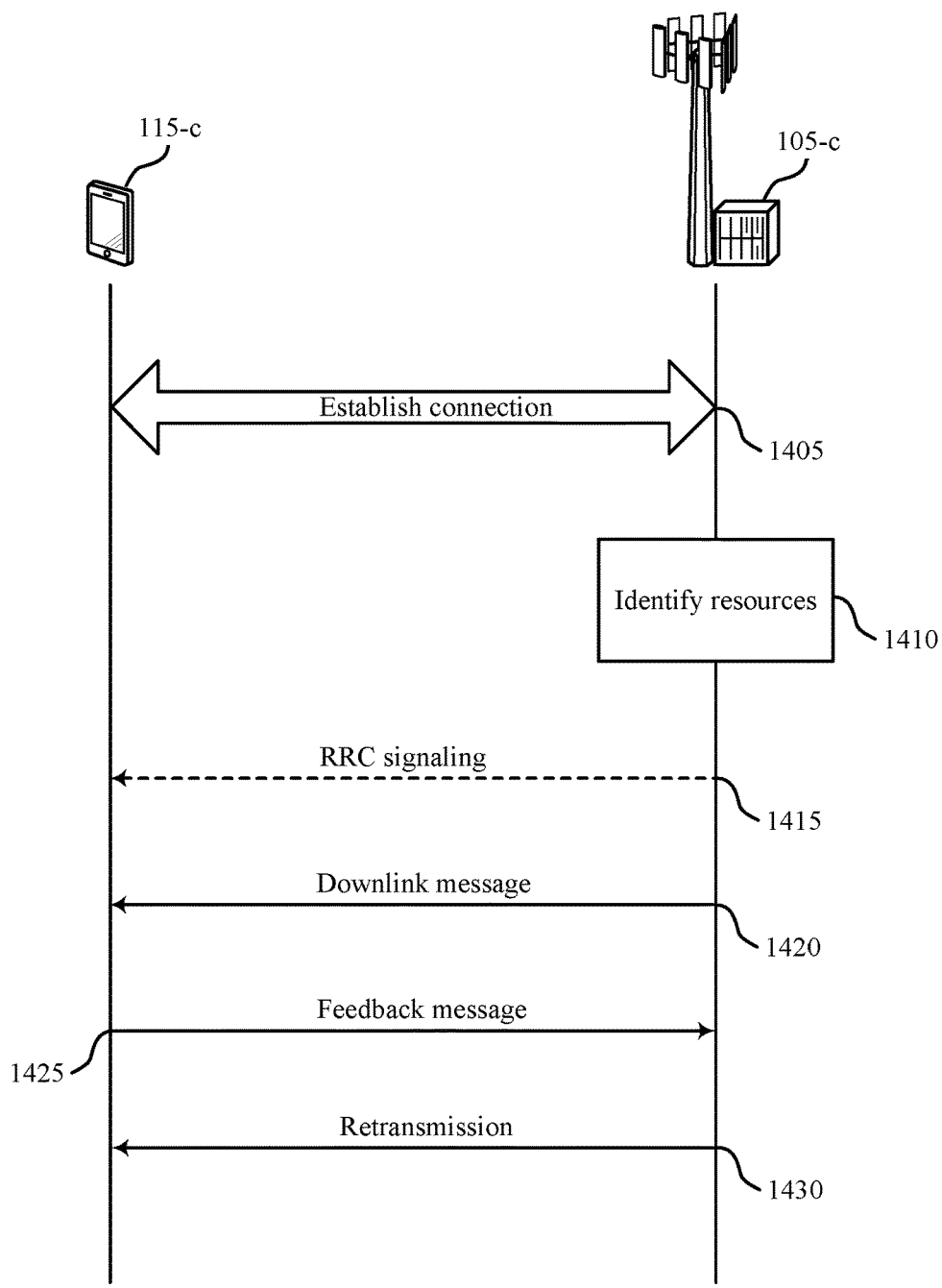

FIG. 14 illustrates an example of a process flow 1400 that supports downlink and uplink transmissions for high reliability low latency communications systems in accordance with various aspects of the present disclosure. Process flow 1400 includes UE 115-c and base station 105-c, each of which may be an example of the corresponding device described with reference to FIGS. 1, 2, and/or 13.

At 1405, base station 105-c may establish a connection with UE 115-c. The connection established at 1405 may be an example of the communication link 125 or communication link 205 described with reference to FIGS. 1 and 2. In some cases, the wireless communications system within which UE 115-c and base station 105-c establish the connection, at 1405, may support multiple wireless services (e.g., legacy wireless services and enhanced wireless services). In some examples, a first wireless service may have target latency and reliability values that differ from those of a second wireless service.

At 1410, the base station 105-c may identify a set of TTIs for a first wireless service, where the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration, and comprising a portion of a control region for a second wireless service. In some examples, the UE 115-c may identify the resources. In some examples, the third duration is less than or equal to one half of the second duration. The TTIs may be examples of sTTIs as described with reference to FIG. 2. For example, the first duration may comprise three symbols, the second duration may comprise two symbols, and the third duration may comprise one symbol. The first wireless service may be an example of an URLLC service, and the second wireless service may be an example of a legacy wireless service. In some examples, the control region for the second wireless service comprises PDCCH for the second wireless service.

At 1415, the base station 105-c may transmit RRC signaling to the UE 115-c.

At 1420, the base station 105-c may transmit a downlink message for the first wireless service during a first TTI of the third subset of TTIs. In some examples, the base station 105-c may transmit the downlink message during a partial sTTI as described with reference to FIG. 2.

At 1425, the UE 115-c may transmit a NAK for the downlink message during a subsequent TTI of the set of TTIs. In some examples, the subsequent TTI may be a TTI of the third subset of TTIs. For example, the UE 115-c may transmit the acknowledgement during a partial sTTI as described with reference to FIG. 2. In some examples, the UE 115-c may transmit CSI with the NAK.

At 1430, the base station 105-c may retransmit the downlink message during a second TTI of the third subset of TTIs. In some examples, the base station 105-c may retransmit the downlink message during a partial sTTI as described with reference to FIG. 2. The base station 105-c may retransmit the downlink message within 1 ms of transmitting the downlink message. In some examples, a timing gap between transmitting the downlink message and receiving the negative acknowledgement for the downlink message is based at least in part on the third duration.

Figure 15:
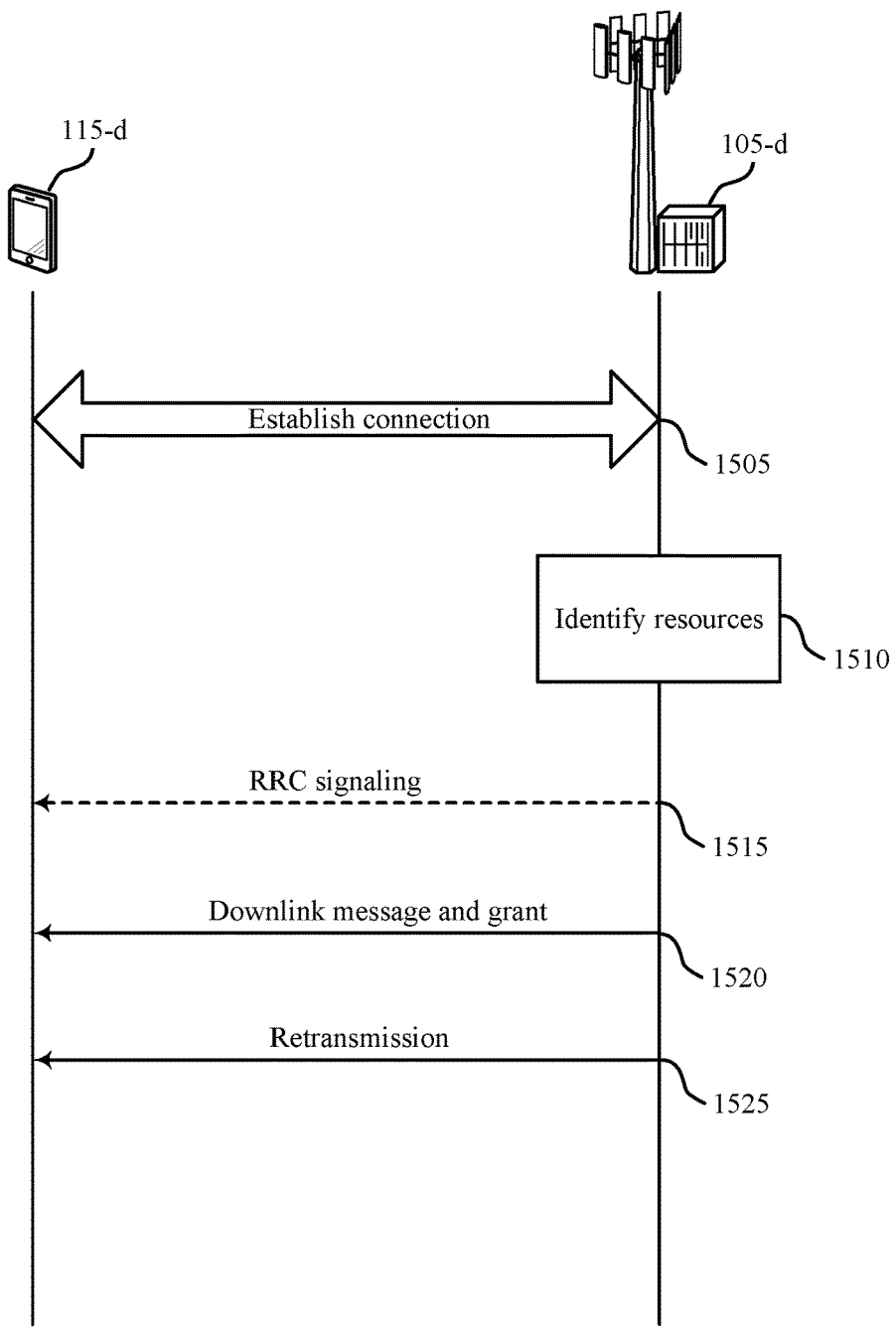

FIG. 15 illustrates an example of a process flow 1500 that supports downlink and uplink transmissions for high reliability low latency communications systems in accordance with various aspects of the present disclosure. Process flow 1500 includes UE 115-d and base station 105-d, each of which may be an example of the corresponding device described with reference to FIGS. 1 and 2.

At 1505, base station 105-d may establish a connection with UE 115-d. The connection established at 1505 may be an example of the communication link 125 or communication link 205 described with reference to FIGS. 1 and 2. In some cases, the wireless communications system within which UE 115-d and base station 105-d establish the connection at 1505 may support multiple wireless services (e.g., legacy wireless services and enhanced wireless services). In some examples, a first wireless service may have target latency and reliability values that differ from those of a second wireless service.

At 1510, the base station 105-*d* may identify a set of TTIs for a first wireless service, where an initial TTI of the set of TTIs comprises a portion of a control region for a second wireless service. In some examples, the UE 115-*d* may identify the resources. The first wireless service may be an example of an URLLC service, and the second wireless service may be an example of a legacy wireless service. In some examples, the control region for the second wireless service comprises PDCCH for the second wireless service.

At 1515, the base station 105-*d* may transmit RRC signaling to the UE 115-*d*.

At 1520, the base station 105-*d* may transmit a downlink message for the first wireless service during a TTI of the set of TTIs, where the downlink message comprises an assignment of resources for at least the downlink message. In some examples, the assignment of resources for at least the downlink message may be referred to as a grant for the downlink message. In some cases, the assignment of resources may comprise DCI.

At 1525, the base station 105-*d* may retransmit at least a portion of the downlink message, during a subsequent TTI of the set of TTIs, within a threshold time from transmitting the downlink message. In some examples, the subsequent TTI comprises a next TTI after the TTI. The assignment of resources for at least the downlink message may comprise an assignment of resources for retransmitting at least the portion of the downlink message. Additionally or alternatively, the base station 105-*d* may transmit an assignment of resources for the retransmission of at least the portion of the downlink message along with the retransmission. In some examples, the downlink message and the retransmission of at least the portion of the downlink message are transmitted over different frequency resources, over different ports, over different beams, using different modulation and coding schemes (MCS), using different redundancy versions (RV), using different precoders, or a combination thereof.

The threshold time may be 1 ms in some examples, and may be indicated through the RRC signaling transmitted at 1515.

Figure 16:
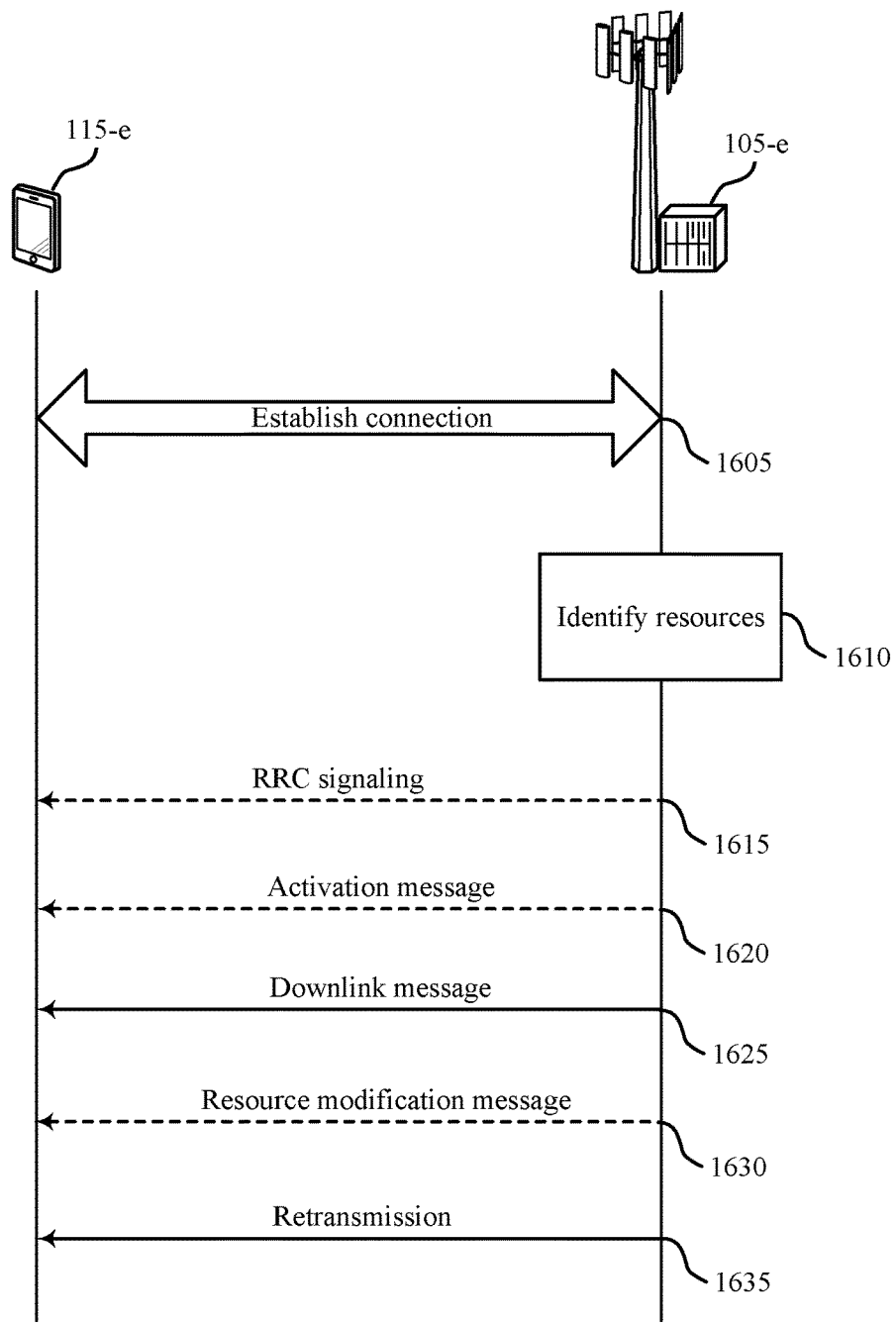

FIG. 16 illustrates an example of a process flow 1600 that supports downlink and uplink transmissions for high reliability low latency communications systems in accordance with various aspects of the present disclosure. Process flow 1600 includes UE 115-*e* and base station 105-*e*, each of which may be an example of the corresponding device described with reference to FIG. 1.

At 1605, base station 105-*e* may establish a connection with UE 115-*e*. The connection established at 1605 may be an example of the communication link 125 or communication link 205 described with reference to FIGS. 1 and 2. In some cases, the wireless communications system within which UE 115-*e* and base station 105-*e* establish the connection at 1605 may support multiple wireless services (e.g., legacy wireless services and enhanced wireless services). In some examples, a first wireless service may have target latency and reliability values that differ from those of a second wireless service.

At 1610, the base station 105-*e* may identify a set of TTIs for a first wireless service, where an initial TTI of the set of TTIs comprises a portion of a control region for a second wireless service. In some examples, the UE 115-*e* may identify the resources. The first wireless service may be an example of an URLLC service, and the second wireless service may be an example of a legacy wireless service. In some examples, the control region for the second wireless service comprises PDCCH for the second wireless service.

At 1615, the base station 105-*e* may transmit RRC signaling to the UE 115-*e*.

At 1620, the base station 105-*e* may transmit an activation message that indicates resources associated with at least a TTI of the set of TTIs. The activation message may activate resources for a downlink message and/or a retransmission of a downlink message, as described in more detail below. In some examples, the UE 115-*e* may determine resources associated with TTIs of the set of TTIs based at least in part on the activation message.

At 1625, the base station 105-*e* may transmit a downlink message for the first wireless service during a TTI of the set of TTIs. The resources available for the downlink message may have been indicated to the UE 115-*e* during RRC signaling.

At 1630, the base station 105-*e* may transmit a control message indicating a modification of the resources associated with a TTI associated with a retransmission of the downlink message, as described in more detail below. The UE 115-*e* may determine that the control message comprises control information based at least in part on a flag in the control message or based at least in part on decoding the control message using a predetermined CRC configuration. In some examples, the control message is transmitted over an indicator channel that is reserved for configuring and/or reconfiguring resources associated with the downlink message and/or a retransmission of the downlink message.

At 1635, the base station may transmit a retransmission of at least a portion of the downlink message during a subsequent TTI of the set of TTIs within a threshold time from transmitting the downlink message. In some examples, the base station 105-*e* may transmit signaling (e.g., RRC signaling at 1615) to the UE 115-*e* indicating resources available for receive the retransmission of at least the portion of the downlink message. The UE 115-*e* may determine resources associated with the subsequent TTI based at least in part on the signaling. Additionally or alternatively, the UE 115-*a* may determine resources associated with the retransmission (e.g., the subsequent TTI) based at least in part on the resources associated with the downlink message (e.g., the TTI). Additionally or alternatively, the UE 115-*a* may monitor for the retransmission of at least the portion of the downlink message based at least in part on signaling (e.g., RRC signaling).

In some examples, the UE 115-*e* or the base station 105-*e* may identify a plurality of TBS based at least in part on the signaling, and decode at least the downlink message over at least the TTI of the set of TTIs using a plurality of hypotheses associated with the plurality of TBSs.

In some examples, the UE 115-*e* or the base station 105-*e* may derive a HARQ process identification based at least in part on an index of at least the TTI of the set of TTIs. In some examples, a feedback configuration associated with at least the downlink message is based at least in part on an on-off keying configuration.

In some examples, the base station 105-*e* may assign at least a subset of the set of TTIs to a group of UEs based at least in part on a channel condition associated with the group of UEs. Additionally or alternatively, the base station 105-*e* may form at least the group of UEs for a first transmission opportunity and form at least a second group of UEs that is different than the group of UEs for a second transmission opportunity.

Figure 17:
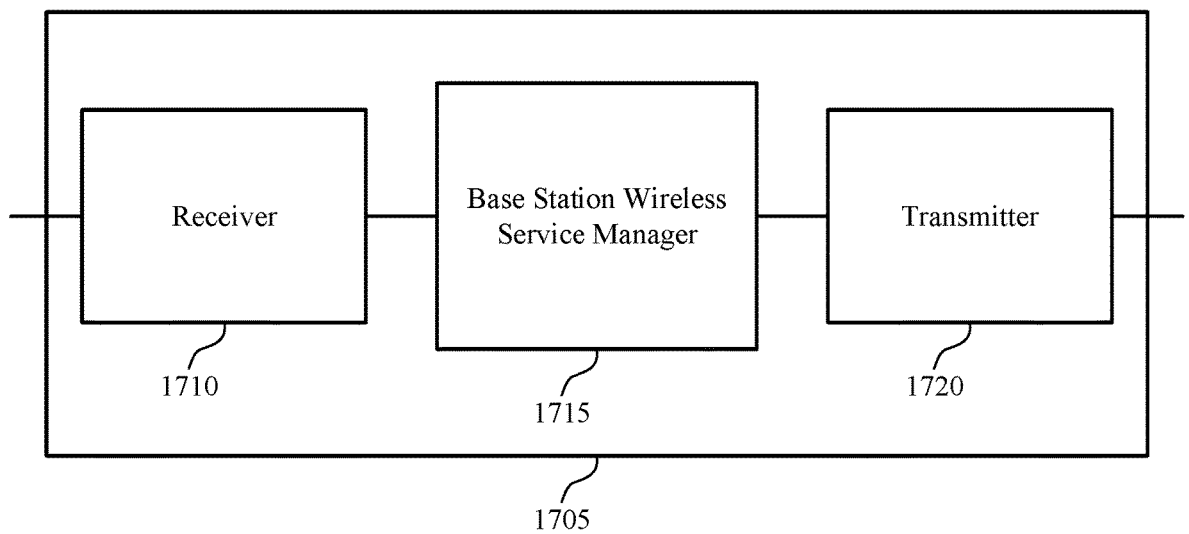
FIGS. 17 through 19 show block diagrams of a device that supports downlink and uplink transmissions for high reliability low latency communications systems in accordance with aspects of the present disclosure.

FIG. 17 shows a block diagram 1700 of a wireless device 1705 that supports downlink and uplink transmissions for high reliability low latency communications systems in accordance with aspects of the present disclosure. Wireless device 1705 may be an example of aspects of a base station 105 as described with reference to FIG. 1. Wireless device 1705 may include receiver 1710, base station wireless service manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to downlink and uplink transmissions for high reliability low latency communications systems, etc.). Information may be passed on to other components of the device. The receiver 1710 may be an example of aspects of the transceiver 2035 described with reference to FIG. 20. The receiver 1710 may utilize a single antenna or a set of antennas.

Base station wireless service manager 1715 may be an example of aspects of the base station wireless service manager 2015 described with reference to FIG. 20.

Base station wireless service manager 1715 and/or at least some of its various sub-components may be implemented in hardware, software executed by a processor, firmware, or any combination thereof. If implemented in software executed by a processor, the functions of the base station wireless service manager 1715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station wireless service manager 1715 and/or at least some of its various sub-components may be physically located at various positions, including being distributed such that portions of functions are implemented at different physical locations by one or more physical devices. In some examples, base station wireless service manager 1715 and/or at least some of its various sub-components may be a separate and distinct component in accordance with various aspects of the present disclosure. In other examples, base station wireless service manager 1715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station wireless service manager 1715 may identify a first set TTIs for a first wireless service and a second set of TTIs for the first wireless service, where an initial TTI of each of the sets of TTIs includes a portion of a control region for a second wireless service, transmit a downlink message for the first wireless service during a TTI of the first set of TTIs, receive a negative acknowledgement for the downlink message during a subsequent TTI of the first set of TTIs, and retransmit the downlink message during the control region of the second set of TTIs. The base station wireless service manager 1715 may also identify a set of TTIs for a first wireless service, where the set of TTIs includes a first subset of TTIs each having a first duration, a second subset of TTIs each having a second duration that is less than the first duration, a third subset of TTIs each having a third duration that is less than the second duration, and an initial TTI having a duration equal to the first or the second duration and including a portion of a control region for a second wireless service, transmit a downlink message for the first wireless service during a first TTI of the third subset of TTIs, receive a negative acknowledgement for the downlink message during a subsequent TTI of the set of TTIs, and retransmit the downlink message during a second TTI of the third subset of TTIs.

The base station wireless service manager 1715 may also identify a set of TTIs for a first wireless service, where an initial TTI of the set of TTIs includes a portion of a control region for a second wireless service, transmit a downlink message for the first wireless service during a TTI of the set of TTIs, where the downlink message includes an assignment of resources for at least the downlink message, and retransmit at least a portion of the downlink message during a subsequent TTI of the set of TTIs within a threshold time from transmitting the downlink message. The base station wireless service manager 1715 may also identify a set of TTIs for a first wireless service, where an initial TTI of the set of TTIs includes a portion of a control region for a second wireless service, transmit a downlink message for the first wireless service during a TTI of the set of TTIs, and retransmit at least a portion of the downlink message during a subsequent TTI of the set of TTIs within a threshold time from transmitting the downlink message.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2035 described with reference to FIG. 20. The transmitter 1720 may utilize a single antenna or a set of antennas.

Figure 18:
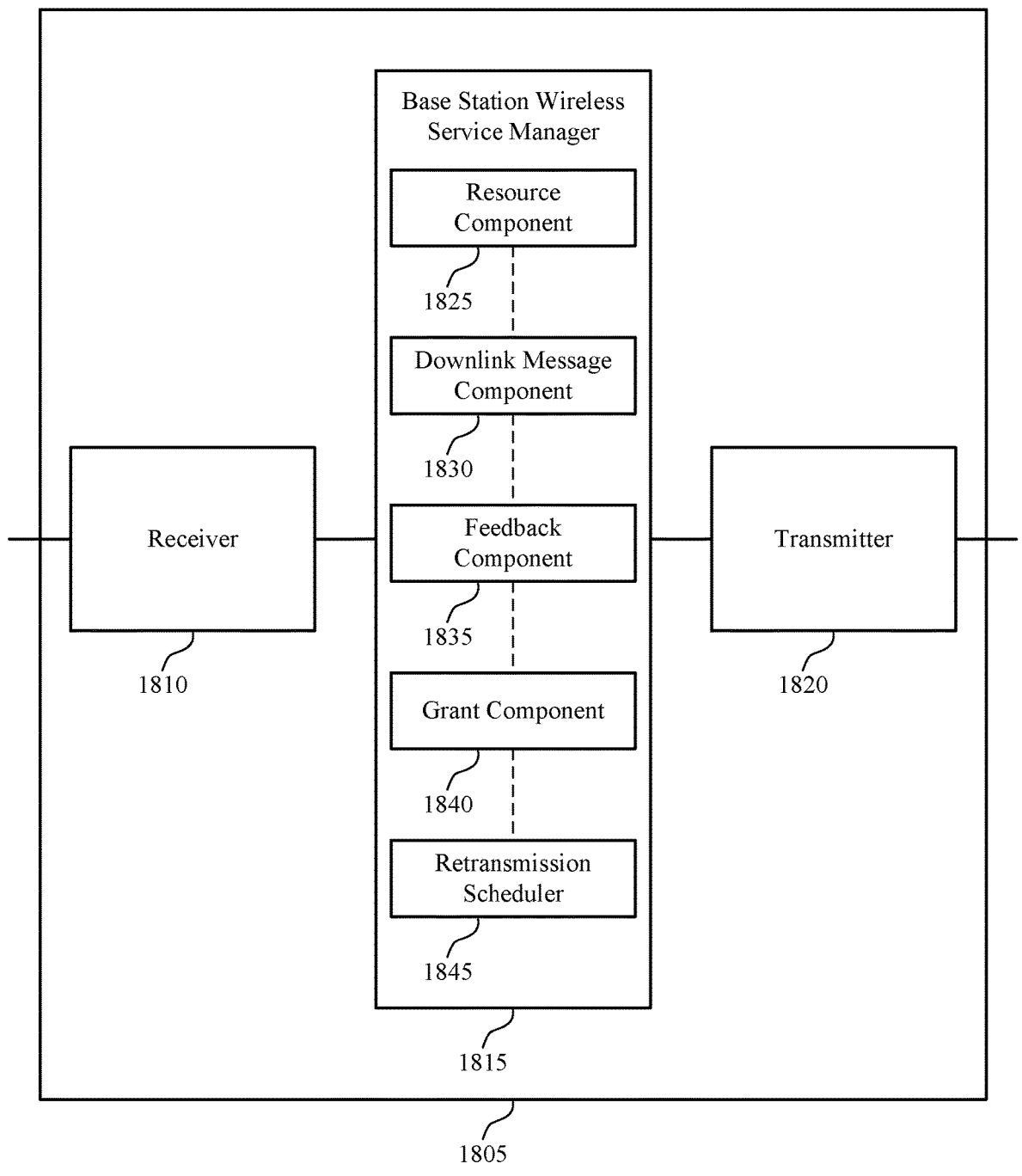

FIG. 18 shows a block diagram 1800 of a wireless device 1805 that supports downlink and uplink transmissions for high reliability low latency communications systems in accordance with aspects of the present disclosure. Wireless device 1805 may be an example of aspects of a wireless device 1705 or a base station 105 as described with reference to FIGS. 1, 2, and 17. Wireless device 1805 may include receiver 1810, base station wireless service manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to downlink and uplink transmissions for high reliability low latency communications systems, etc.). Information may be passed on to other components of the device. The receiver 1810 may be an example of aspects of the transceiver 2035 described with reference to FIG. 20. The receiver 1810 may utilize a single antenna or a set of antennas.

Base station wireless service manager 1815 may be an example of aspects of the base station wireless service manager 2015 described with reference to FIG. 20.

Base station wireless service manager 1815 may also include resource component 1825, downlink message component 1830, feedback component 1835, grant component 1840, and retransmission scheduler 1845.

Resource component 1825 may identify a first set of TTIs for a first wireless service and a second set of TTIs for the first wireless service, where an initial TTI of each of the sets of TTIs includes a portion of a control region for a second wireless service, identify a set of TTIs for a first wireless service, where the set of TTIs includes a first subset of TTIs each having a first duration, a second subset of TTIs each having a second duration that is less than the first duration, a third subset of TTIs each having a third duration that is less than the second duration, and an initial TTI having a duration equal to the first or the second duration and including a portion of a control region for a second wireless service, identify a set of TTIs for a first wireless service, where an initial TTI of the set of TTIs includes a portion of a control region for a second wireless service, derive a HARQ process identification based on an index of at least the TTI of the set of TTIs, and identify a set of TBs, where a coding scheme associated with the set of TBs is based on a size of at least a TB of the set of TBs.

In some cases, the coding scheme includes TBCC for TBs having a first size and turbo coding for TBs having a second size, where the first size is smaller than the second size. In some cases, the initial TTI of each of the sets of TTIs includes at least two symbols. In some cases, the first set of TTIs and the second set of TTIs each includes fourteen symbols. In some cases, the first wireless service may comprise an URLLC service. In some cases, the third duration is less than or equal to one half of the second duration. In some cases, the subsequent TTI is a TTI of the third subset of TTIs. In some cases, the control region includes a PDCCH for the second wireless service. In some cases, the control region includes a PDCCH for the second wireless service. In some cases, a timing gap between transmitting the downlink message and receiving the negative acknowledgement for the downlink message is based on the third duration. In some cases, the first duration includes three symbols, the second duration includes two symbols, and the third duration includes one symbol.

Downlink message component 1830 may transmit a downlink message for the first wireless service during a TTI of the first set of TTIs, retransmit the downlink message during the control region of the second set of TTIs, transmit a downlink message for the first wireless service during a first TTI of the third subset of TTIs, retransmit the downlink message during a second TTI of the third subset of TTIs, retransmit at least a portion of the downlink message during a subsequent TTI of the set of TTIs within a threshold time from transmitting the downlink message, transmit a downlink message for the first wireless service during a TTI of the set of TTIs, and transmit an indication of the threshold time. In some cases, retransmitting the downlink message includes retransmitting the downlink message within 1 ms of transmitting the downlink message. In some cases, transmitting the downlink message includes transmitting the downlink message during the control region of the first set of TTIs. In some cases, the downlink message includes data for the first wireless service. In some cases, the downlink message and the retransmission of at least the portion of the downlink message are transmitted over different frequency resources, over different ports, over different beams, using different MCS, using different RV, using different precoders, or a combination thereof.

In some cases, the threshold time is 1 ms. In some cases, the subsequent TTI includes a next TTI after the TTI. In some cases, retransmitting the downlink message includes retransmitting the downlink message within 1 ms of transmitting the downlink message.

Feedback component 1835 may receive a negative acknowledgement for the downlink message during a subsequent TTI of the first set of TTIs and receive a negative acknowledgement for the downlink message during a subsequent TTI of the set of TTIs.

Grant component 1840 may transmit a downlink message for the first wireless service during a TTI of the set of TTIs, where the downlink message includes an assignment of resources for at least the downlink message and transmit an assignment of resources for the retransmission of at least the portion of the downlink message. In some cases, the assignment of resources for at least the downlink message includes an assignment of resources for retransmitting at least the portion of the downlink message. In some cases, the assignment of resources includes DCI.

Retransmission scheduler 1845 may retransmit at least a portion of the downlink message during a subsequent TTI of the set of TTIs within a threshold time from transmitting the downlink message.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2035 described with reference to FIG. 20. The transmitter 1820 may utilize a single antenna or a set of antennas.

Figure 19:
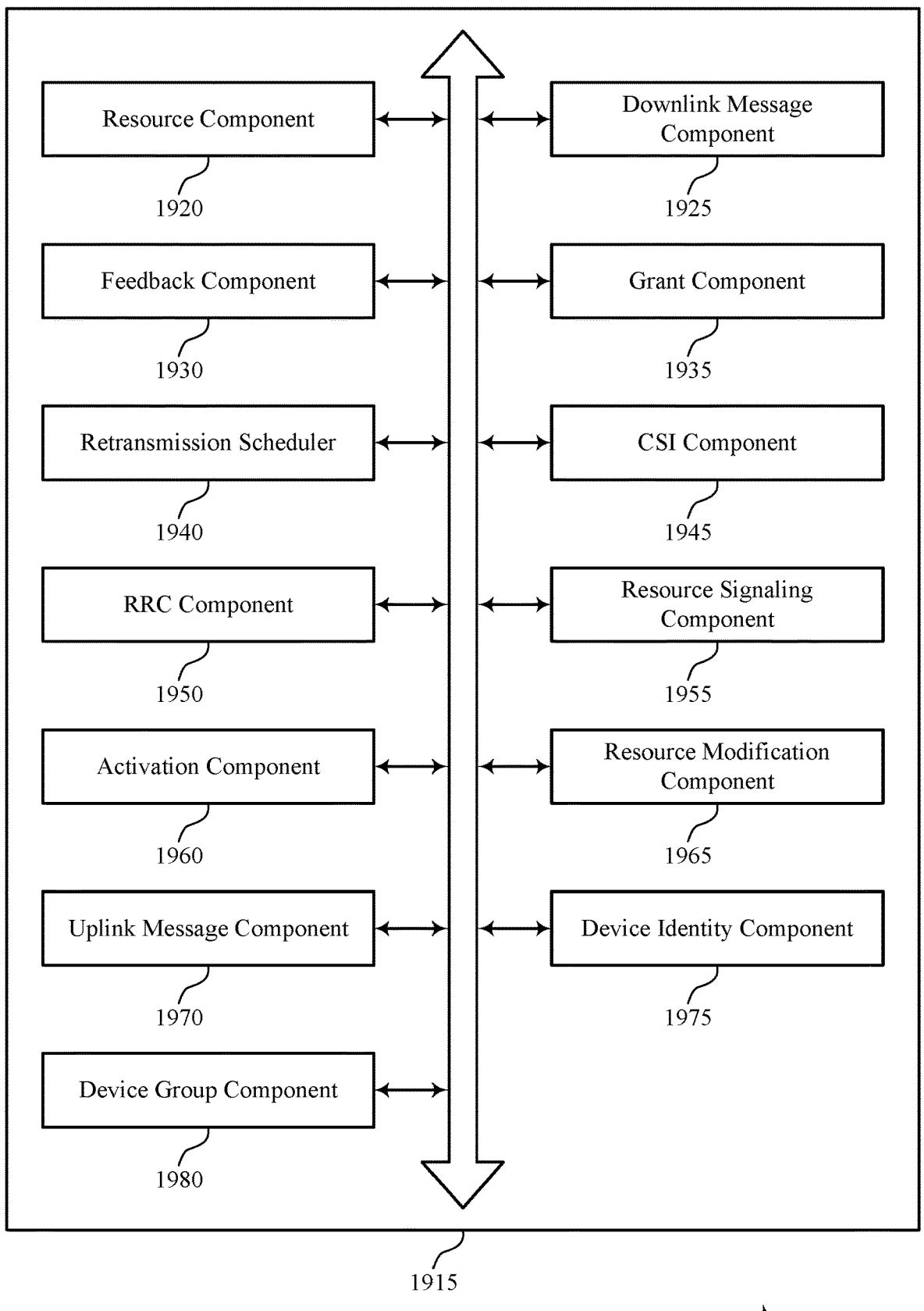

FIG. 19 shows a block diagram 1900 of a base station wireless service manager 1915 that supports downlink and uplink transmissions for high reliability low latency communications systems in accordance with aspects of the present disclosure. The base station wireless service manager 1915 may be an example of aspects of a base station wireless service manager 1715, a base station wireless service manager 1815, or a base station wireless service manager 2015, as described with reference to FIGS. 17, 18, and 20. The base station wireless service manager 1915 may include resource component 1920, downlink message component 1925, feedback component 1930, grant component 1935, retransmission scheduler 1940, CSI component 1945, RRC component 1950, resource signaling component 1955, activation component 1960, resource modification component 1965, uplink message component 1970, device identity component 1975, and device group component 1980. Each of these modules may communicate, directly or indirectly, with one another (e.g., via one or more buses).

Resource component 1920 may identify a first set of TTIs for a first wireless service and a second set of TTIs for the first wireless service, where an initial TTI of each of the sets of TTIs includes a portion of a control region for a second wireless service, identify a set of TTIs for a first wireless service, where the set of TTIs includes a first subset of TTIs each having a first duration, a second subset of TTIs each having a second duration that is less than the first duration, a third subset of TTIs each having a third duration that is less than the second duration, and an initial TTI having a duration equal to the first or the second duration and including a portion of a control region for a second wireless service, identify a set of TTIs for a first wireless service, where an initial TTI of the set of TTIs includes a portion of a control region for a second wireless service, derive a HARQ process identification based on an index of at least the TTI of the set of TTIs, and identify a set of TBs, where a coding scheme associated with the set of TBs is based on a size of at least a TB of the set of TBs.

In some cases, the coding scheme includes TBCC for TBs having a first size and turbo coding for TBs having a second size, where the first size is smaller than the second size. In some cases, the initial TTI of each of the sets of TTIs includes at least two symbols. In some cases, the first set of TTIs and the second set of TTIs each includes fourteen symbols. In some cases, the first wireless service includes an URLLC service. In some cases, the third duration is less than or equal to one half of the second duration. In some cases, the subsequent TTI is a TTI of the third subset of TTIs. In some cases, the control region includes a PDCCH for the second wireless service. In some cases, the control region includes a PDCCH for the second wireless service. In some cases, a timing gap between transmitting the downlink message and receiving the negative acknowledgement for the downlink message is based on the third duration. In some cases, the first duration includes three symbols, the second duration includes two symbols, and the third duration includes one symbol.

Downlink message component 1925 may transmit a downlink message for the first wireless service during a TTI of the first set of TTIs, retransmit the downlink message during the control region of the second set of TTIs, transmit a downlink message for the first wireless service during a first TTI of the third subset of TTIs, retransmit the downlink message during a second TTI of the third subset of TTIs, retransmit at least a portion of the downlink message during a subsequent TTI of the set of TTIs within a threshold time from transmitting the downlink message, transmit a downlink message for the first wireless service during a TTI of the set of TTIs, and transmit an indication of the threshold time.

In some cases, retransmitting the downlink message includes retransmitting the downlink message within 1 ms of transmitting the downlink message. In some cases, transmitting the downlink message includes transmitting the downlink message during the control region of the first set of TTIs. In some cases, the downlink message includes data for the first wireless service. In some cases, the downlink message and the retransmission of at least the portion of the downlink message are transmitted over different frequency resources, over different ports, over different beams, using different MCS, using different RV, using different precoders, or a combination thereof. In some cases, the threshold time is 1 ms. In some cases, the subsequent TTI includes a next TTI after the TTI. In some cases, retransmitting the downlink message includes retransmitting the downlink message within 1 ms of transmitting the downlink message.

Feedback component 1930 may receive a negative acknowledgement for the downlink message during a subsequent TTI of the first set of TTIs and receive a negative acknowledgement for the downlink message during a subsequent TTI of the set of TTIs.

Grant component 1935 may transmit a downlink message for the first wireless service during a TTI of the set of TTIs, where the downlink message includes an assignment of resources for at least the downlink message and transmit an assignment of resources for the retransmission of at least the portion of the downlink message. In some cases, the assignment of resources for at least the downlink message includes an assignment of resources for retransmitting at least the portion of the downlink message. In some cases, the assignment of resources includes DCI.

Retransmission scheduler 1940 may retransmit at least a portion of the downlink message during a subsequent TTI of the set of TTIs within a threshold time from transmitting the downlink message.

CSI component 1945 may receive CSI with the negative acknowledgement.

RRC component 1950 may transmit an indication via RRC signaling.

Resource signaling component 1955 may transmit signaling that indicates resources available for receiving the retransmission of at least the portion of the downlink message. In some cases, the signaling includes an indication of the subsequent TTI. In some cases, the signaling includes an indication of the threshold time. In some cases, the signaling includes RRC signaling. In some cases, a feedback configuration associated with at least the downlink message is based on an on-off keying configuration.

Activation component 1960 may transmit an activation message that indicates resources associated with the TTI and transmit an activation message that indicates resources associated with the TTI and the subsequent TTI.

Resource modification component 1965 may transmit a subsequent control message indicating a modification to the resources associated with the subsequent TTI.

Uplink message component 1970 may receive an uplink message from a device of a group of devices.

Device identity component 1975 may determine an identity of the device based on a DMRS sequence associated with the device, determine an identity of the device based on a C-RNTI associated with the device, and determine an identity of the device based on a MAC PDU associated with the device.

Device group component 1980 may assign at least a subset of the set of TTIs to a group of UEs based on a channel condition associated with the group of UEs, form a group comprising at least the group of UEs for a first transmission opportunity, form at least a second group of UEs that is different than the group of UEs, for a second transmission opportunity, assign a first sequence to the group of UEs, and assign a second sequence that is different than the first sequence to a second group of UEs.

Figure 20:
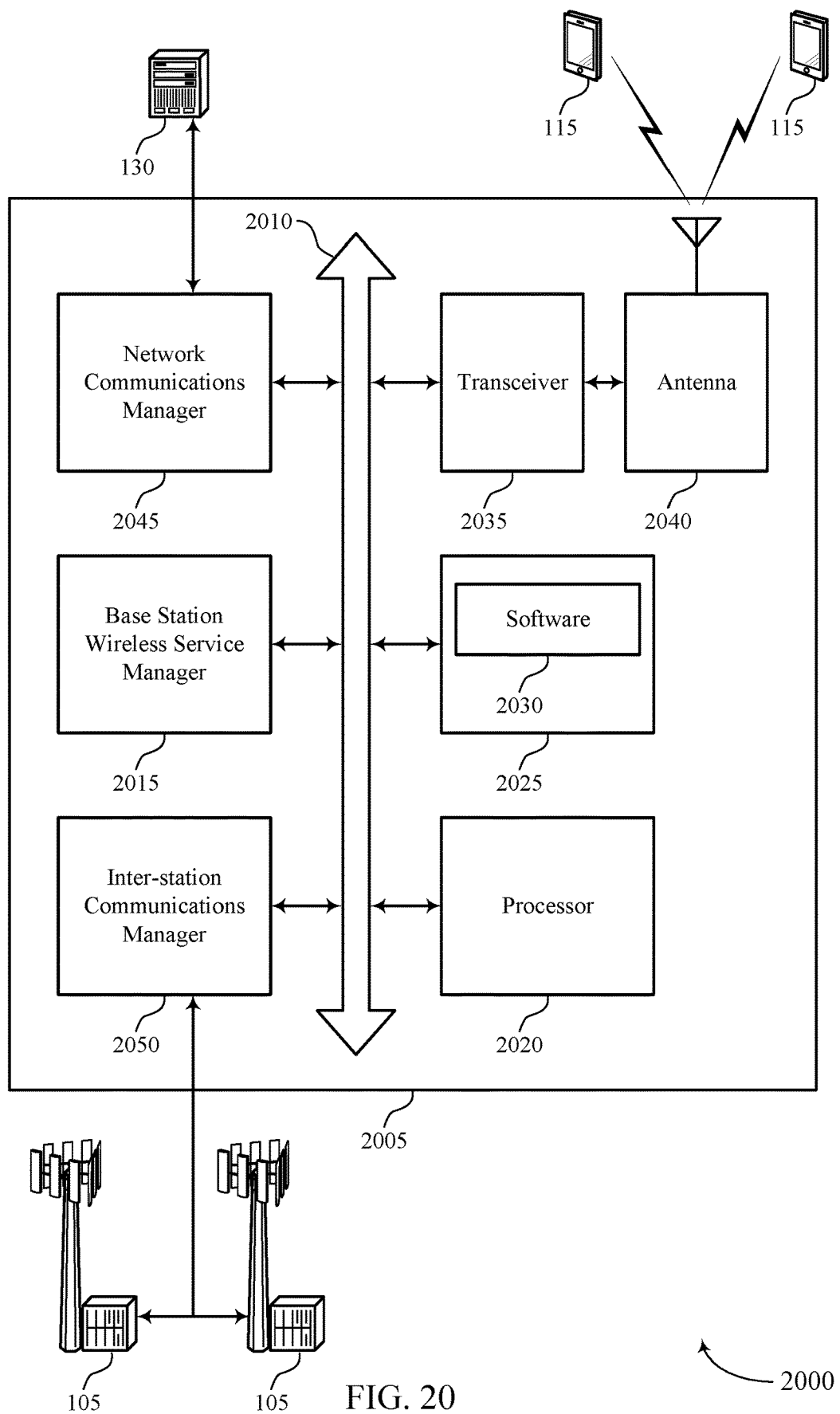
FIG. 20 illustrates a block diagram of a system including a base station that supports downlink and uplink transmissions for high reliability low latency communications systems in accordance with aspects of the present disclosure.

FIG. 20 shows a diagram of a system 2000 including a device 2005 that supports downlink and uplink transmissions for high reliability low latency communications systems in accordance with aspects of the present disclosure. Device 2005 may be an example of or include the components of wireless device 1705, wireless device 1805, or a base station 105 as described above, e.g., with reference to FIGS. 1, 17 and 18. Device 2005 may include components for bi-directional voice and data communications including components for transmitting and receiving communications, including base station wireless service manager 2015, processor 2020, memory 2025, software 2030, transceiver 2035, antenna 2040, network communications manager 2045, and inter-station communications manager 2050. These components may be in electronic communication via one or more busses (e.g., bus 2010). Device 2005 may communicate wirelessly with one or more UEs 115.

Processor 2020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in memory to perform various functions (e.g., functions or tasks supporting downlink and uplink transmissions for high reliability low latency communications systems).

Memory 2025 may include random access memory (RAM) and read only memory (ROM). The memory 2025 may store computer-readable, computer-executable software 2030 including instructions that, when executed, cause the processor to perform various functions described herein. In some cases, the memory 2025 may contain, among other things, a basic input/output system (BIOS) which may control basic hardware and/or software operation such as the interaction with peripheral components or devices.

Software 2030 may include code to implement aspects of the present disclosure, including code to support downlink and uplink transmissions for high reliability low latency communications systems. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases, the device may have more than one antenna 2040, which may be capable of concurrently transmitting or receiving multiple wireless transmissions.

Network communications manager 2045 may manage communications with the core network (e.g., via one or more wired backhaul links). For example, the network communications manager 2045 may manage the transfer of data communications for client devices, such as one or more UEs 115.

Inter-station communications manager 2050 may manage communications with other base stations 105, and may include a controller or scheduler for controlling communications with UEs 115 in cooperation with other base stations 105. For example, the inter-station communications manager 2050 may coordinate scheduling for transmissions to UEs 115 for various interference mitigation techniques such as beamforming or joint transmission. In some examples, inter-station communications manager 2050 may provide an X2 interface within a Long Term Evolution (LTE)/LTE-A wireless communication network to provide communication between base stations 105.

Figure 21:
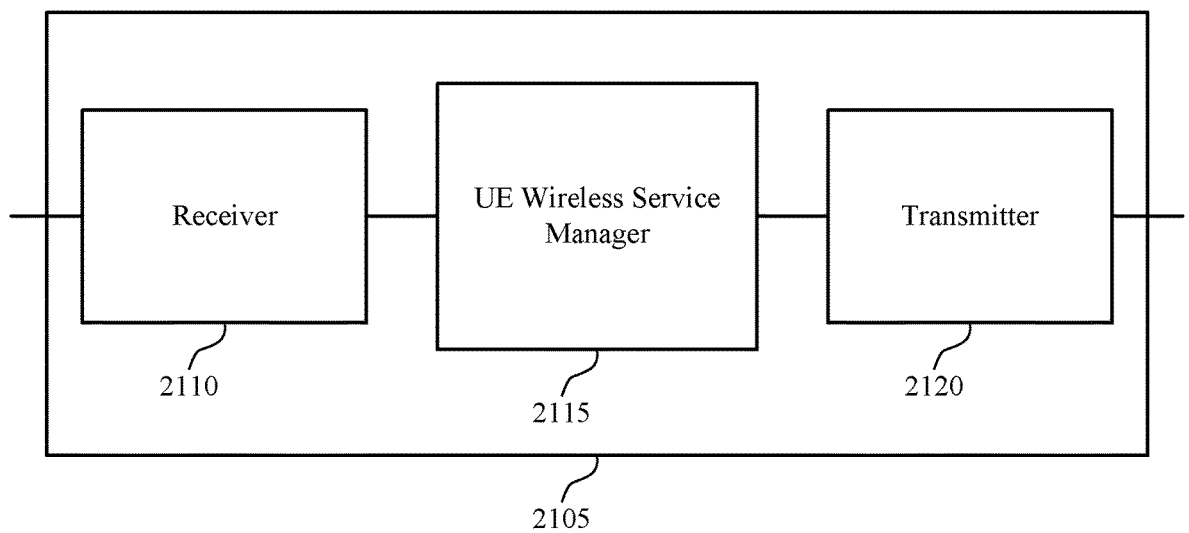
FIGS. 21 through 23 show block diagrams of a device (e.g., a UE) that supports downlink and uplink transmissions for high reliability low latency communications systems in accordance with aspects of the present disclosure.

FIG. 21 shows a block diagram 2100 of a wireless device 2105 that supports downlink and uplink transmissions for high reliability low latency communications systems in accordance with aspects of the present disclosure. Wireless device 2105 may be an example of aspects of a UE 115 as described with reference to FIGS. 1 and 2. Wireless device 2105 may include receiver 2110, UE wireless service manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to downlink and uplink transmissions for high reliability low latency communications systems, etc.). Information may be passed on to other components of the device. The receiver 2110 may be an example of aspects of the transceiver 2435 described with reference to FIG. 24. The receiver 2110 may utilize a single antenna or a set of antennas.

UE wireless service manager 2115 may be an example of aspects of the UE wireless service manager 2415 described with reference to FIG. 24.

UE wireless service manager 2115 and/or at least some of its various sub-components may be implemented in hardware, software executed by a processor, firmware, or any combination thereof. If implemented in software executed by a processor, the functions of the UE wireless service manager 2115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE wireless service manager 2115 and/or at least some of its various sub-components may be physically located at various positions, including being distributed such that portions of functions are implemented at different physical locations by one or more physical devices. In some examples, UE wireless service manager 2115 and/or at least some of its various sub-components may be a separate and distinct component in accordance with various aspects of the present disclosure. In other examples, UE wireless service manager 2115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE wireless service manager 2115 may identify a first set of TTIs for a first wireless service and a second set of TTIs for the first wireless service, where an initial TTI of each of the sets of TTIs includes a portion of a control region for a second wireless service, receive a downlink message for the first wireless service during a TTI of the first set of TTIs, transmit a negative acknowledgement for the downlink message during a subsequent TTI of the first set of TTIs, and receive a retransmission of the downlink message during the control region of the second set of TTIs.

The UE wireless service manager 2115 may also identify a set of TTIs for a first wireless service, where the set of TTIs includes a first subset of TTIs each having a first duration, a second subset of TTIs each having a second duration that is less than the first duration, a third subset of TTIs each having a third duration that is less than the second duration, and an initial TTI having a duration equal to the first or the second duration and including a portion of a control region for a second wireless service, receive a downlink message for the first wireless service during a first TTI of the third subset of TTIs, transmit a negative acknowledgement for the downlink message during a subsequent TTI of the set of TTIs, and receive a retransmission of the downlink message during a second TTI of the third subset of TTIs.

The UE wireless service manager 2115 may also identify a set of TTIs for a first wireless service, where an initial TTI of the set of TTIs includes a portion of a control region for a second wireless service, receive a downlink message for the first wireless service during a TTI of the set of TTIs, where the downlink message includes an assignment of resources for at least the downlink message, and receive a retransmission of at least a portion of the downlink message during a subsequent TTI of the set of TTIs within a threshold time from receiving the downlink message.

The UE wireless service manager 2115 may also identify a set of TTIs for a first wireless service, where an initial TTI of the set of TTIs includes a portion of a control region for a second wireless service, receive a downlink message for the first wireless service during a TTI of the set of TTIs, and receive a retransmission of at least a portion of the downlink message during a subsequent TTI of the set of TTIs within a threshold time from transmitting the downlink message.

Transmitter 2120 may transmit signals generated by other components of the device. In some examples, the transmitter 2120 may be collocated with a receiver 2110 in a transceiver module. For example, the transmitter 2120 may be an example of aspects of the transceiver 2435 described with reference to FIG. 24. The transmitter 2120 may utilize a single antenna or a set of antennas.

Figure 22:
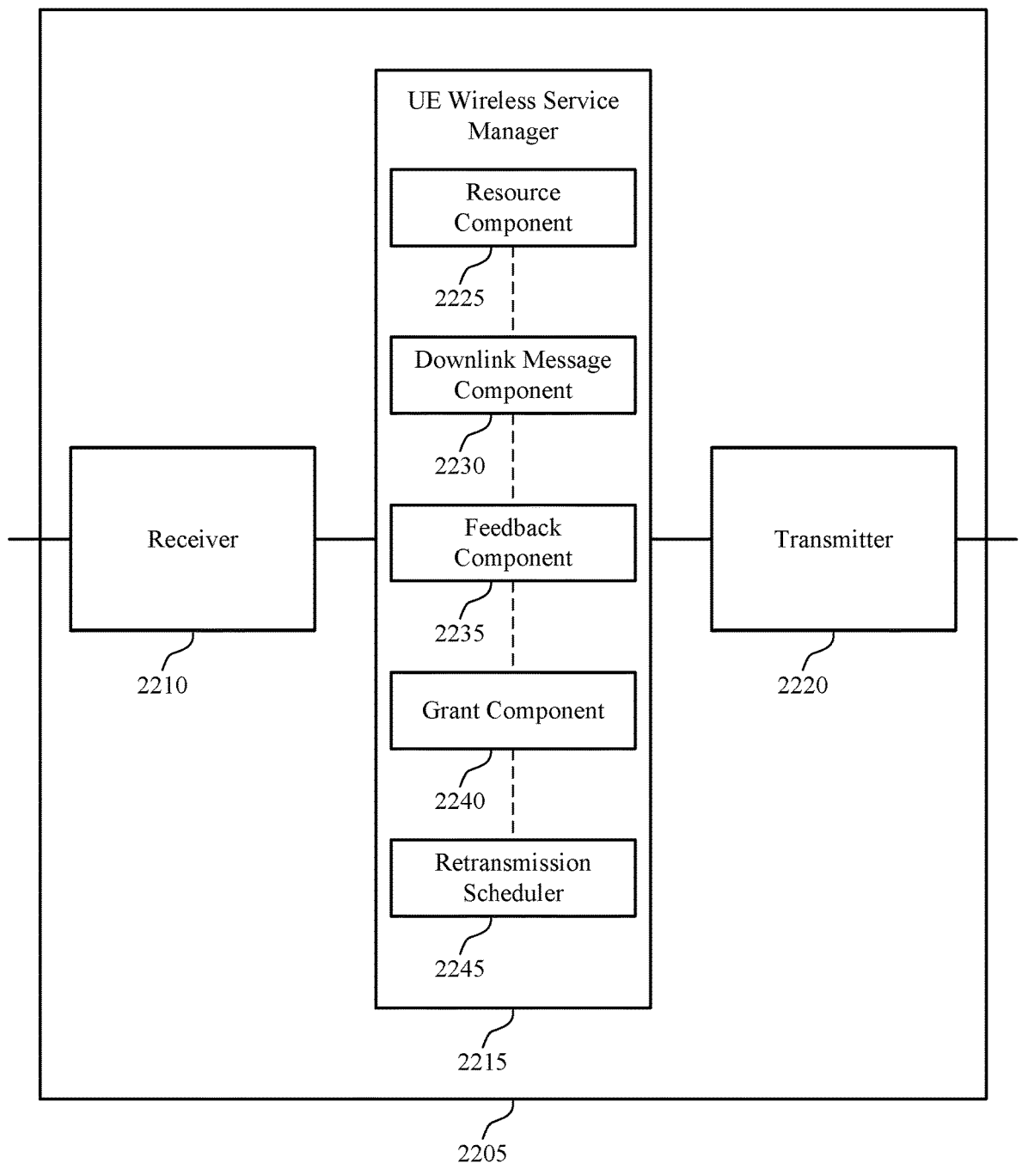

FIG. 22 shows a block diagram 2200 of a wireless device 2205 that supports downlink and uplink transmissions for high reliability low latency communications systems in accordance with aspects of the present disclosure. Wireless device 2205 may be an example of aspects of a wireless device 2105 or a UE 115 as described with reference to FIGS. 1 and 21. Wireless device 2205 may include receiver 2210, UE wireless service manager 2215, and transmitter 2220. Wireless device 2205 may also include a processor. Each of these components may be in communication with one another (e.g., via one or more buses).

Receiver 2210 may receive information such as packets, user data, or control information associated with various information channels (e.g., control channels, data channels, and information related to downlink and uplink transmissions for high reliability low latency communications systems, etc.). Information may be passed on to other components of the device. The receiver 2210 may be an example of aspects of the transceiver 2435 described with reference to FIG. 24. The receiver 2210 may utilize a single antenna or a set of antennas.

UE wireless service manager 2215 may be an example of aspects of the UE wireless service manager 2415 described with reference to FIG. 24.

UE wireless service manager 2215 may also include resource component 2225, downlink message component 2230, feedback component 2235, grant component 2240, and retransmission scheduler 2245.

Resource component 2225 may identify a first set of TTIs for a first wireless service and a second set of TTIs for the first wireless service, where an initial TTI of each of the sets of TTIs includes a portion of a control region for a second wireless service, identify a set of TTIs for a first wireless service, where the set of TTIs includes a first subset of TTIs each having a first duration, a second subset of TTIs each having a second duration that is less than the first duration, a third subset of TTIs each having a third duration that is less than the second duration, and an initial TTI having a duration equal to the first or the second duration and including a portion of a control region for a second wireless service. In some cases, resource component 2225 may identify a set of TTIs for a first wireless service, where an initial TTI of the set of TTIs includes a portion of a control region for a second wireless service, derive a HARQ process identification based on an index of at least the TTI of the set of TTIs, determine resources associated with the subsequent TTI based on resources associated with the TTI, and identify a set of TBs, where a coding scheme associated with the set of TBs is based on a size of at least a TB of the set of TBs.

In some cases, the coding scheme includes TBCC for TBs having a first size and turbo coding for TBs having a second size, where the first size is smaller than the second size. In some cases, the initial TTI of each of the sets of TTIs includes at least two symbols. In some cases, the first set of TTIs and the second set of TTIs each includes fourteen symbols. In some cases, the first wireless service includes an URLLC service. In some cases, the third duration is less than or equal to one half of the second duration. In some cases, the subsequent TTI is a TTI of the third subset of TTIs. In some cases, the first duration includes three symbols, the second duration includes two symbols, and the third duration includes one symbol. In some cases, the control region includes a PDCCH for the second wireless service. In some cases, a timing gap between receiving the downlink message and transmitting the negative acknowledgement for the downlink message is based on the third duration. In some cases, a feedback configuration associated with at least the downlink message is based on an on-off keying configuration. In some cases, the control region includes a PDCCH for the second wireless service.

Downlink message component 2230 may receive a downlink message for the first wireless service during a TTI of the first set of TTIs, receive a retransmission of the downlink message during the control region of the second set of TTIs, receive a downlink message for the first wireless service during a first TTI of the third subset of TTIs, receive a retransmission of the downlink message during a second TTI of the third subset of TTIs, receive a retransmission of at least a portion of the downlink message during a subsequent TTI of the set of TTIs within a threshold time from receiving the downlink message, receive a downlink message for the first wireless service during a TTI of the set of TTIs, and receive an indication of the threshold time.

In some cases, receiving the retransmission includes receiving the retransmission of the downlink message within 1 ms of receiving the downlink message. In some cases, transmitting the downlink message includes transmitting the downlink message during the control region of the first set of TTIs. In some cases, the downlink message includes data for the first wireless service. In some cases, the downlink message and the retransmission of at least the portion of the downlink message are received over different frequency resources, over different ports, over different beams, using different MCS, using different RV, using different precoders, or a combination thereof. In some cases, the threshold time is 1 ms. In some cases, the subsequent TTI includes a next TTI after the TTI. In some cases, receiving the retransmission includes receiving the retransmission of the downlink message within 1 ms of receiving the downlink message.

Feedback component 2235 may transmit a negative acknowledgement for the downlink message during a subsequent TTI of the first set of TTIs and transmit a negative acknowledgement for the downlink message during a subsequent TTI of the set of TTIs.

Grant component 2240 may receive a downlink message for the first wireless service during a TTI of the set of TTIs, where the downlink message includes an assignment of resources for at least the downlink message and receive an assignment of resources for the retransmission of at least the portion of the downlink message. In some cases, the assignment of resources for at least the downlink message includes an assignment of resources for retransmitting at least the portion of the downlink message. In some cases, the assignment of resources includes DCI.

Retransmission scheduler 2245 may receive a retransmission of at least a portion of the downlink message during a subsequent TTI of the set of TTIs within a threshold time from transmitting the downlink message.

Transmitter 2220 may transmit signals generated by other components of the device. In some examples, the transmitter 2220 may be collocated with a receiver 2210 in a transceiver module. For example, the transmitter 2220 may be an example of aspects of the transceiver 2435 described with reference to FIG. 24. The transmitter 2220 may utilize a single antenna or a set of antennas.

Figure 23:
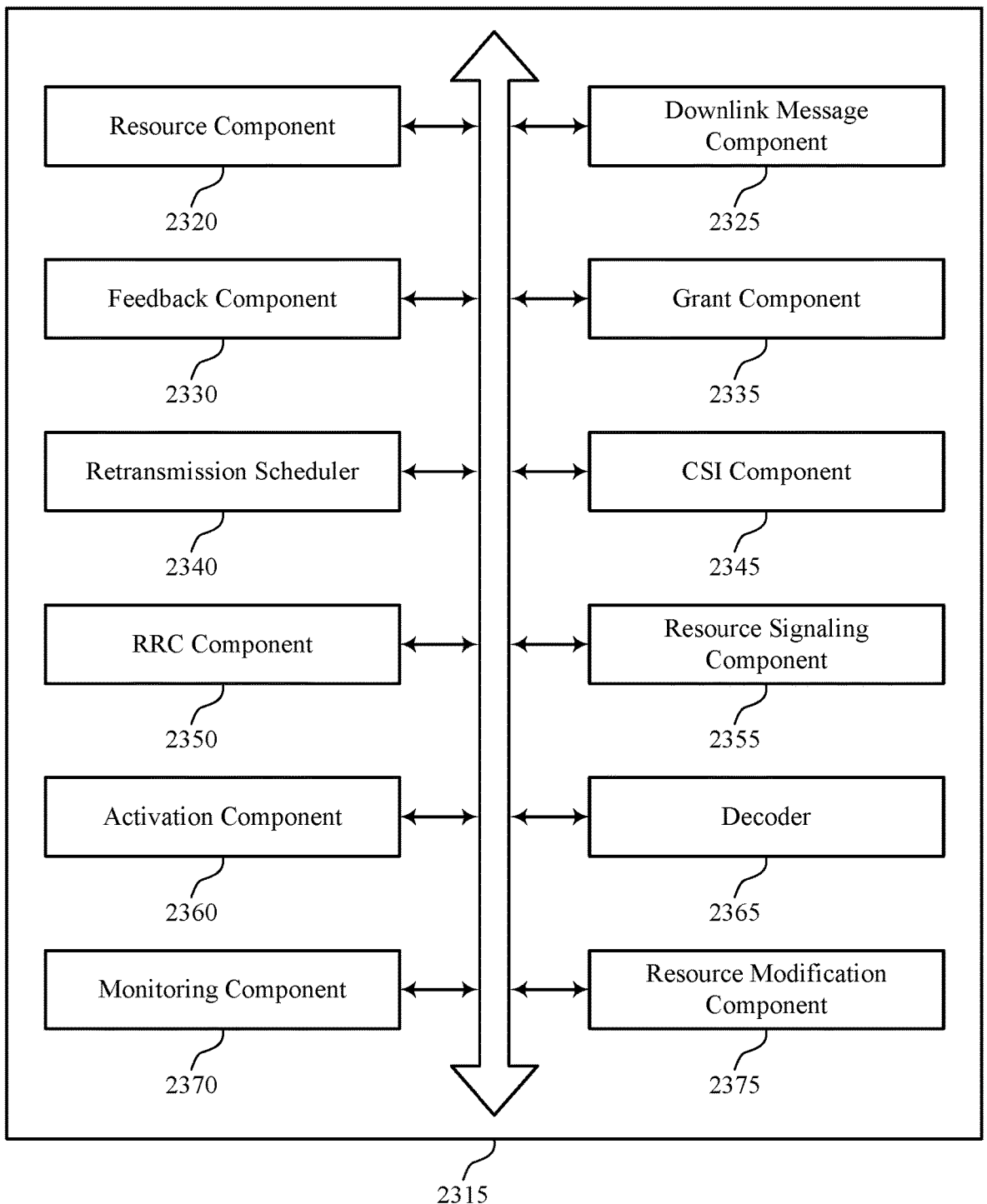

FIG. 23 shows a block diagram 2300 of a UE wireless service manager 2315 that supports downlink and uplink transmissions for high reliability low latency communications systems in accordance with aspects of the present disclosure. The UE wireless service manager 2315 may be an example of aspects of a UE wireless service manager 2415 described with reference to FIGS. 21, 22, and 24. The UE wireless service manager 2315 may include resource component 2320, downlink message component 2325, feedback component 2330, grant component 2335, retransmission scheduler 2340, CSI component 2345, RRC component 2350, resource signaling component 2355, activation component 2360, decoder 2365, monitoring component 2370, and resource modification component 2375. Each of these modules may communicate, directly or indirectly, with one another (e.g., via one or more buses).

Resource component 2320 may identify a first set of TTIs for a first wireless service and a second set of TTIs for the first wireless service, where an initial TTI of each of the sets of TTIs includes a portion of a control region for a second wireless service, identify a set of TTIs for a first wireless service, where the set of TTIs includes a first subset of TTIs each having a first duration, a second subset of TTIs each having a second duration that is less than the first duration, a third subset of TTIs each having a third duration that is less than the second duration, and an initial TTI having a duration equal to the first or the second duration and including a portion of a control region for a second wireless service. In some cases, resource component 2320 may identify a set of TTIs for a first wireless service, where an initial TTI of the set of TTIs includes a portion of a control region for a second wireless service, derive a HARQ process identification based on an index of at least the TTI of the set of TTIs, determine resources associated with the subsequent TTI based on resources associated with the TTI, and identify a set of TBs, where a coding scheme associated with the set of TBs is based on a size of at least a TB of the set of TBs.

In some cases, the coding scheme includes TBCC for TBs having a first size and turbo coding for TBs having a second size, where the first size is smaller than the second size. In some cases, the initial TTI of each of the sets of TTIs includes at least two symbols. In some cases, the first set of TTIs and the second set of TTIs each includes fourteen symbols. In some cases, the first wireless service includes an URLLC service. In some cases, the third duration is less than or equal to one half of the second duration. In some cases, the subsequent TTI is a TTI of the third subset of TTIs. In some cases, the first duration includes three symbols, the second duration includes two symbols, and the third duration includes one symbol. In some cases, the control region includes a PDCCH for the second wireless service. In some cases, a timing gap between receiving the downlink message and transmitting the negative acknowledgement for the downlink message is based on the third duration. In some cases, a feedback configuration associated with at least the downlink message is based on an on-off keying configuration. In some cases, the control region includes a PDCCH for the second wireless service.

Downlink message component 2325 may receive a downlink message for the first wireless service during a TTI of the first set of TTIs, receive a retransmission of the downlink message during the control region of the second set of TTIs, receive a downlink message for the first wireless service during a first TTI of the third subset of TTIs, and receive a retransmission of the downlink message during a second TTI of the third subset of TTIs. In some cases, downlink message component 2325 may receive a retransmission of at least a portion of the downlink message during a subsequent TTI of the set of TTIs within a threshold time from receiving the downlink message, receive a downlink message for the first wireless service during a TTI of the set of TTIs, and receive an indication of the threshold time.

In some cases, receiving the retransmission includes receiving the retransmission of the downlink message within one millisecond of receiving the downlink message. In some cases, transmitting the downlink message includes transmitting the downlink message during the control region of the first set of TTIs. In some cases, the downlink message includes data for the first wireless service. In some cases, the downlink message and the retransmission of at least the portion of the downlink message are received over different frequency resources, over different ports, over different beams, using different MCS, using different redundancy RV, using different precoders, or a combination thereof. In some cases, the threshold time is 1 ms. In some cases, the subsequent TTI includes a next TTI after the TTI. In some cases, receiving the retransmission includes receiving the retransmission of the downlink message within 1 ms of receiving the downlink message.

Feedback component 2330 may transmit a negative acknowledgement for the downlink message during a subsequent TTI of the first set of TTIs and transmit a negative acknowledgement for the downlink message during a subsequent TTI of the set of TTIs.

Grant component 2335 may receive a downlink message for the first wireless service during a TTI of the set of TTIs, where the downlink message includes an assignment of resources for at least the downlink message and receive an assignment of resources for the retransmission of at least the portion of the downlink message. In some cases, the assignment of resources for at least the downlink message includes an assignment of resources for retransmitting at least the portion of the downlink message. In some cases, the assignment of resources includes DCI.

Retransmission scheduler 2340 may receive a retransmission of at least a portion of the downlink message, during a subsequent TTI of the set of TTIs, within a threshold time from transmitting the downlink message.

CSI component 2345 may transmit CSI with the negative acknowledgement. RRC component 2350 may transmit an indication via RRC signaling. Resource signaling component 2355 may receive signaling that indicates resources available for receiving the retransmission of at least the portion of the downlink message, determine resources associated with the subsequent TTI based on the signaling, determine resources associated with the subsequent TTI based on the activation message, and identify a set of TBSs based on the signaling. In some cases, the signaling includes RRC signaling.

Activation component 2360 may receive an activation message that indicates resources associated with the TTI and receive an activation message that indicates resources associated with the TTI and the subsequent TTI.

Decoder 2365 may decode at least the downlink message over at least the TTI of the set of TTIs using a set of hypotheses associated with the set of TBSs.

Monitoring component 2370 may monitor for the retransmission of at least the portion of the downlink message based on the signaling.

Resource modification component 2375 may receive a subsequent control message indicating a modification to the resources associated with the subsequent TTI, determine the subsequent control message includes control information based on a flag in the subsequent control message, and determine the subsequent control message includes control information based on decoding the subsequent control message using a predetermined CRC configuration. In some cases, the subsequent control message is received on an indicator channel reserved for configuring resources associated with the downlink message.

Figure 24:
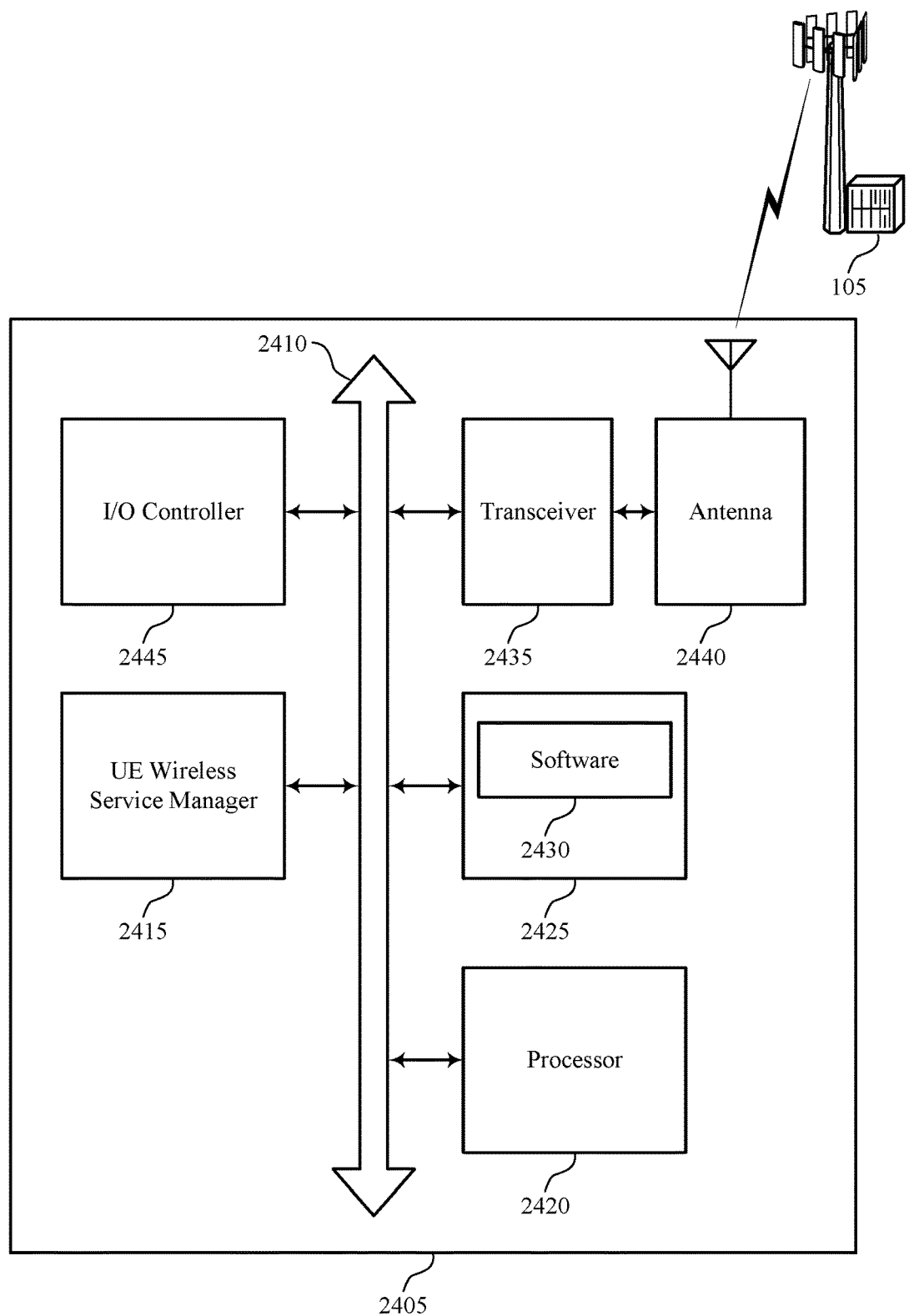
FIG. 24 illustrates a block diagram of a system including a UE that supports downlink and uplink transmissions for high reliability low latency communications systems in accordance with aspects of the present disclosure.

FIG. 24 shows a diagram of a system 2400 including a device 2405 that supports downlink and uplink transmissions for high reliability low latency communications systems in accordance with aspects of the present disclosure. Device 2405 may be an example of or include the components of UE 115 as described above, e.g., with reference to FIGS. 1 and 2. Device 2405 may include components for bi-directional voice and data communications including components for transmitting and receiving communications, including UE wireless service manager 2415, processor 2420, memory 2425, software 2430, transceiver 2435, antenna 2440, and I/O controller 2445. These components may be in electronic communication via one or more busses (e.g., bus 2410). Device 2405 may communicate wirelessly with one or more base stations 105.

Processor 2420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2420 may be configured to operate a memory array using a memory controller. In other cases, a memory controller may be integrated into processor 2420. Processor 2420 may be configured to execute computer-readable instructions stored in memory to perform various functions (e.g., functions or tasks supporting downlink and uplink transmissions for high reliability low latency communications systems).

Memory 2425 may include RAM and ROM. The memory 2425 may store computer-readable, computer-executable software 2430 including instructions that, when executed, cause the processor to perform various functions described herein. In some cases, the memory 2425 may contain, among other things, a BIOS which may control basic hardware and/or software operation such as the interaction with peripheral components or devices.

Software 2430 may include code to implement aspects of the present disclosure, including code to support downlink and uplink transmissions for high reliability low latency communications systems. Software 2430 may be stored in a non-transitory computer-readable medium such as system memory or other memory. In some cases, the software 2430 may not be directly executable by the processor but may cause a computer (e.g., when compiled and executed) to perform functions described herein.

Transceiver 2435 may communicate bi-directionally, via one or more antennas, wired, or wireless links as described above. For example, the transceiver 2435 may represent a wireless transceiver and may communicate bi-directionally with another wireless transceiver. The transceiver 2435 may also include a modem to modulate the packets and provide the modulated packets to the antennas for transmission, and to demodulate packets received from the antennas.

In some cases, the wireless device may include a single antenna 2440. However, in some cases the device may have more than one antenna 2440, which may be capable of concurrently transmitting or receiving multiple wireless transmissions.

I/O controller 2445 may manage input and output signals for device 2405. I/O controller 2445 may also manage peripherals not integrated into device 2405. In some cases, I/O controller 2445 may represent a physical connection or port to an external peripheral. In some cases, I/O controller 2445 may utilize an operating system such as iOS®, ANDROID®, MS-DOS®, MS-WINDOWS®, OS/2®, UNIX®, LINUX®, or another known operating system. In other cases, I/O controller 2445 may represent or interact with a modem, a keyboard, a mouse, a touchscreen, or a similar device. In some cases, I/O controller 2445 may be implemented as part of a processor. In some cases, a user may interact with device 2405 via I/O controller 2445 or via hardware components controlled by I/O controller 2445.

Figure 25:
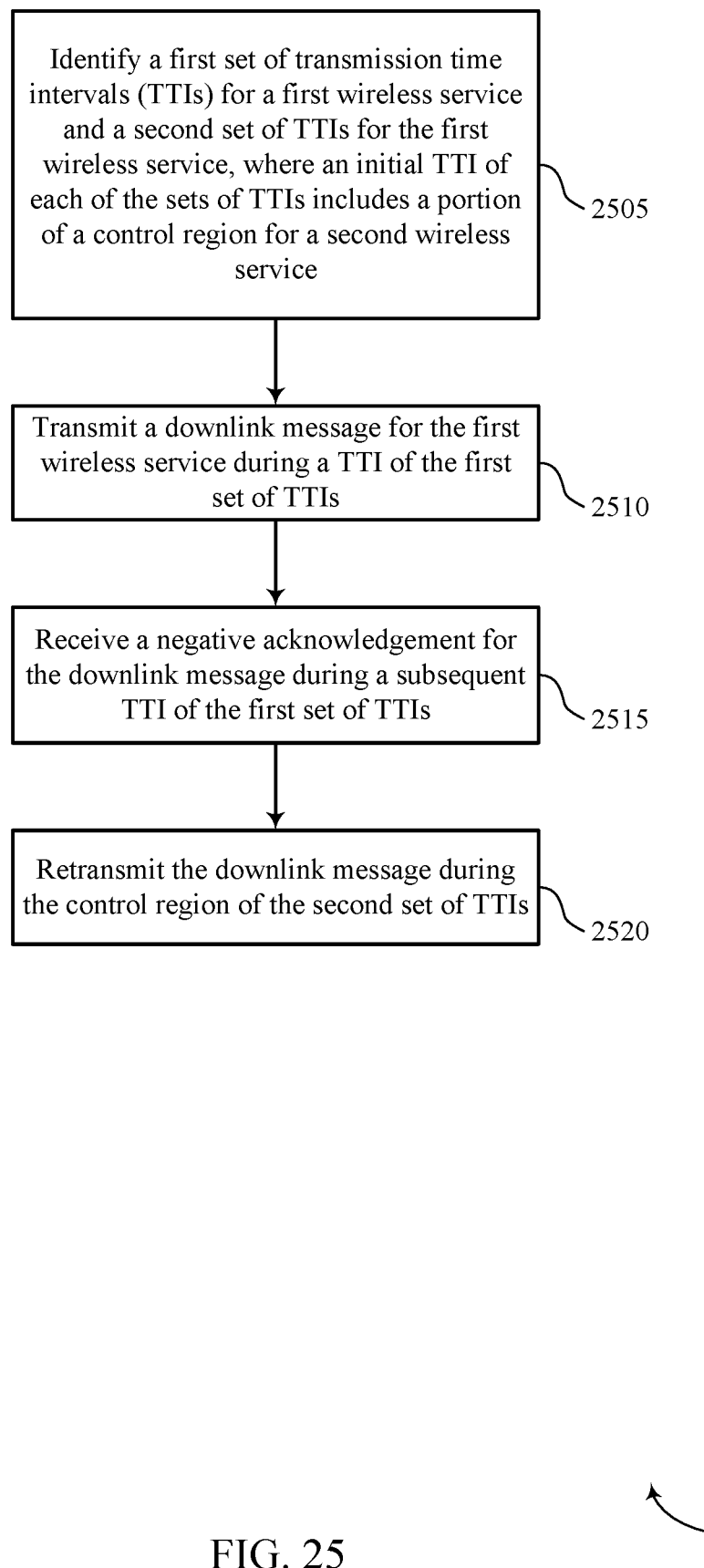
FIGS. 25 through 32 illustrate methods for downlink and uplink transmissions for high reliability low latency communications systems in accordance with aspects of the present disclosure.

FIG. 25 shows a flowchart illustrating a method 2500 for downlink and uplink transmissions for high reliability low latency communications systems in accordance with aspects of the present disclosure. The operations of method 2500 may be implemented by a base station 105 or its components as described herein. For example, the operations of method 2500 may be performed by a base station wireless service manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At 2505, the base station 105 may identify a first set of TTIs for a first wireless service and a second set of TTIs for the first wireless service, where an initial TTI of each of the sets of TTIs comprises a portion of a control region for a second wireless service. The operations at 2505 may be performed according to the methods described with reference to FIGS. 1 through 16. In certain examples, aspects of the operations at 2505 may be performed by a resource component as described with reference to FIGS. 17 through 20.

At 2510, the base station 105 may transmit a downlink message for the first wireless service during a TTI of the first set of TTIs. The operations at 2510 may be performed according to the methods described with reference to FIGS. 1 through 16. In certain examples, aspects of the operations at 2510 may be performed by a downlink message component as described with reference to FIGS. 17 through 20.

At 2515, the base station 105 may receive a negative acknowledgement for the downlink message during a subsequent TTI of the first set of TTIs. The operations at 2515 may be performed according to the methods described with reference to FIGS. 1 through 16. In certain examples, aspects of the operations at 2515 may be performed by a feedback component as described with reference to FIGS. 17 through 20.

At 2520, the base station 105 may retransmit the downlink message during the control region of the second set of TTIs. The operations at 2520 may be performed according to the methods described with reference to FIGS. 1 through 16. In certain examples, aspects of the operations at 2520 may be performed by a downlink message component as described with reference to FIGS. 17 through 20.

Figure 26:
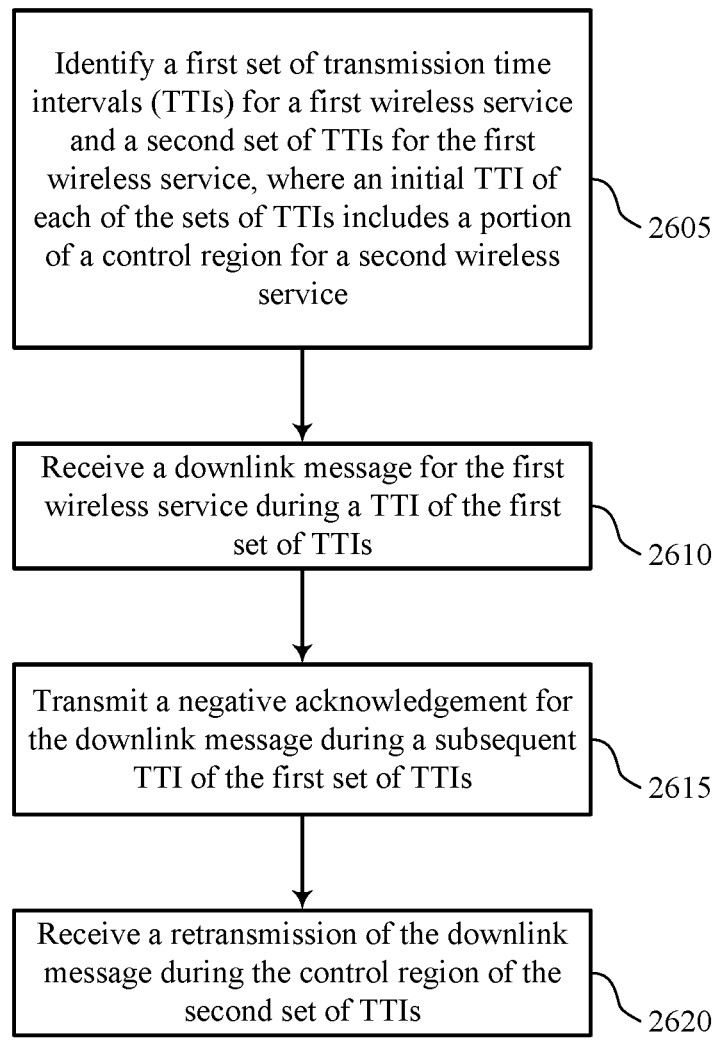

FIG. 26 shows a flowchart illustrating a method 2600 for downlink and uplink transmissions for high reliability low latency communications systems in accordance with aspects of the present disclosure. The operations of method 2600 may be implemented by a UE 115 or its components as described herein. For example, the operations of method 2600 may be performed by a UE wireless service manager as described with reference to FIGS. 21 through 24. In some examples, a UE 115 may execute a set of codes to control the functional elements of the device to perform the functions described below. Additionally or alternatively, the UE 115 may perform aspects of the functions described below using special-purpose hardware.

At 2605, the UE 115 may identify a first set of TTIs for a first wireless service and a second set of TTIs for the first wireless service, wherein an initial TTI of each of the sets of TTIs comprises a portion of a control region for a second wireless service. The operations at 2605 may be performed according to the methods described with reference to FIGS. 1 through 16. In certain examples, aspects of the operations at 2605 may be performed by a resource component as described with reference to FIGS. 21 through 24.

At 2610, the UE 115 may receive a downlink message for the first wireless service during a TTI of the first set of TTIs. The operations of block 2610 may be performed according to the methods described with reference to FIGS. 1 through 16. In certain examples, aspects of the operations at 2610 may be performed by a downlink message component as described with reference to FIGS. 21 through 24.

At 2615, the UE 115 may transmit a negative acknowledgement for the downlink message during a subsequent TTI of the first set of TTIs. The operations at 2615 may be performed according to the methods described with reference to FIGS. 1 through 16. In certain examples, aspects of the operations at 2615 may be performed by a feedback component as described with reference to FIGS. 21 through 24.

At 2620, the UE 115 may receive a retransmission of the downlink message during the control region of the second set of TTIs. The operations at 2620 may be performed according to the methods described with reference to FIGS. 1 through 16. In certain examples, aspects of the operations at 2620 may be performed by a downlink message component as described with reference to FIGS. 21 through 24.

Figure 27:
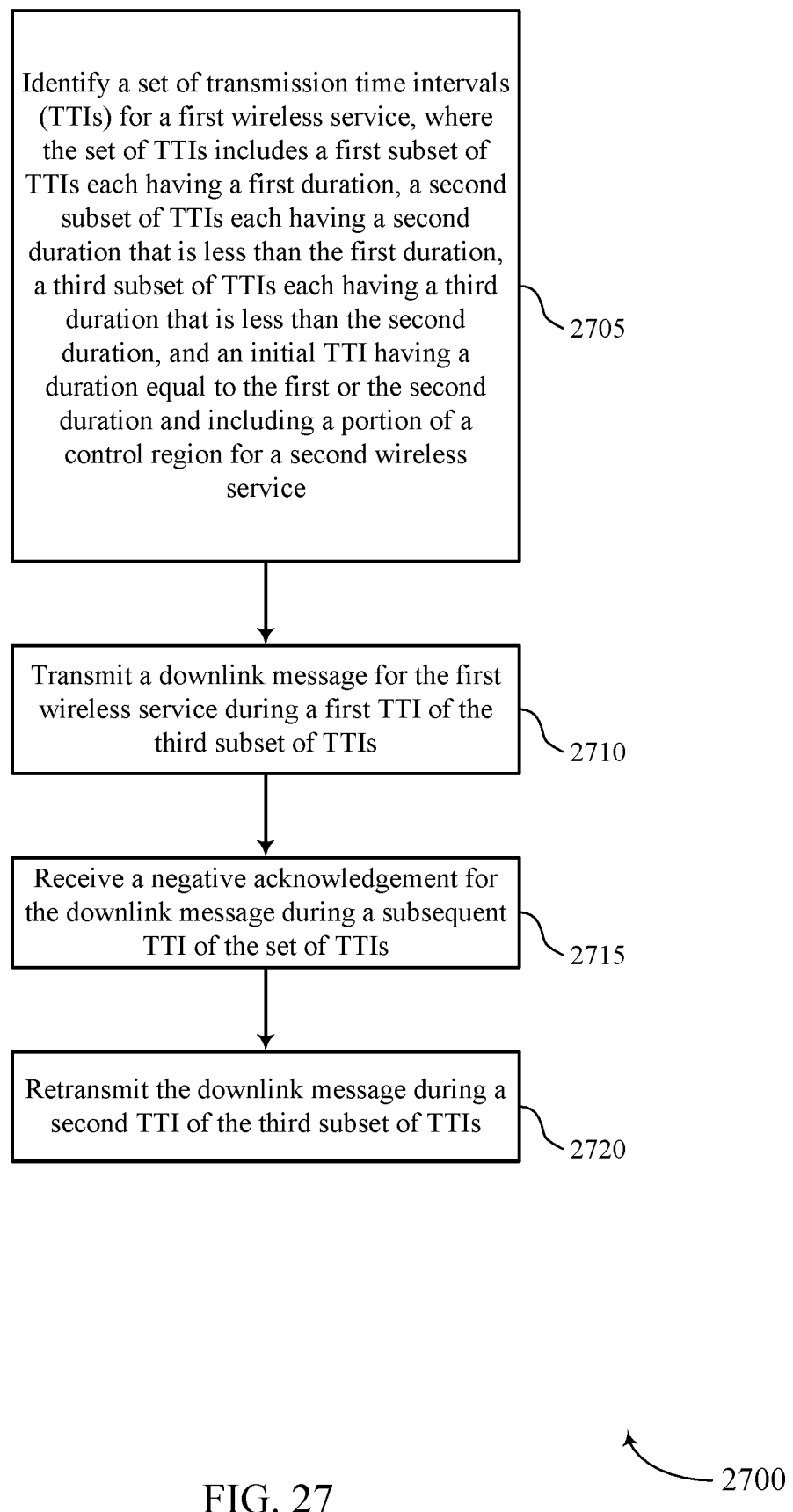

FIG. 27 shows a flowchart illustrating a method 2700 for downlink and uplink transmissions for high reliability low latency communications systems in accordance with aspects of the present disclosure. The operations of method 2700 may be implemented by a base station 105 or its components as described herein. For example, the operations of method 2700 may be performed by a base station wireless service manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At 2705, the base station 105 may identify a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service. The operations at 2705 may be performed according to the methods described with reference to FIGS. 1 through 16. In certain examples, aspects of the operations at 2705 may be performed by a resource component as described with reference to FIGS. 17 through 20.

At 2710, the base station 105 may transmit a downlink message for the first wireless service during a first TTI of the third subset of TTIs. The operations at 2710 may be performed according to the methods described with reference to FIGS. 1 through 16. In certain examples, aspects of the operations at 2710 may be performed by a downlink message component as described with reference to FIGS. 17 through 20.

At 2715, the base station 105 may receive a negative acknowledgement for the downlink message during a subsequent TTI of the set of TTIs. The operations at 2715 may be performed according to the methods described with reference to FIGS. 1 through 16. In certain examples, aspects of the operations at 2715 may be performed by a feedback component as described with reference to FIGS. 17 through 20.

At 2720, the base station 105 may retransmit the downlink message during a second TTI of the third subset of TTIs. The operations at 2720 may be performed according to the methods described with reference to FIGS. 1 through 16. In certain examples, aspects of the operations at 2720 may be performed by a downlink message component as described with reference to FIGS. 17 through 20.

Figure 28:
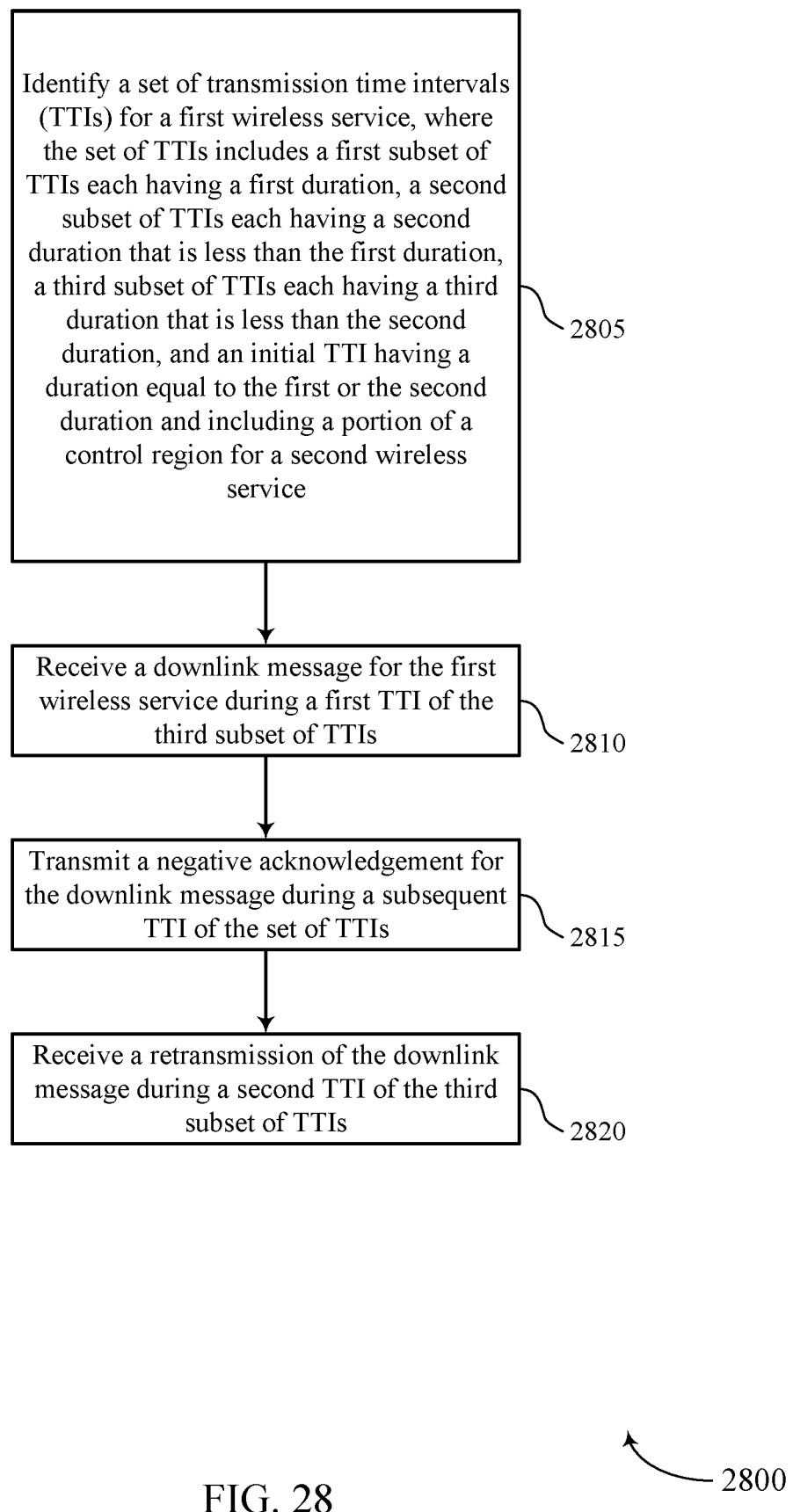

FIG. 28 shows a flowchart illustrating a method 2800 for downlink and uplink transmissions for high reliability low latency communications systems in accordance with aspects of the present disclosure. The operations of method 2800 may be implemented by a UE 115 or its components as described herein. For example, the operations of method 2800 may be performed by a UE wireless service manager as described with reference to FIGS. 21 through 24. In some examples, a UE 115 may execute a set of codes to control the functional elements of the device to perform the functions described below. Additionally or alternatively, the UE 115 may perform aspects of the functions described below using special-purpose hardware.

At 2805, the UE 115 may identify a set of TTIs for a first wireless service, wherein the set of TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion of a control region for a second wireless service. The operations at 2805 may be performed according to the methods described with reference to FIGS. 1 through 16. In certain examples, aspects of the operations at 2805 may be performed by a resource component as described with reference to FIGS. 21 through 24.

At 2810, the UE 115 may receive a downlink message for the first wireless service during a first TTI of the third subset of TTIs. The operations at 2810 may be performed according to the methods described with reference to FIGS. 1 through 16. In certain examples, aspects of the operations at 2810 may be performed by a downlink message component as described with reference to FIGS. 21 through 24.

At 2815, the UE 115 may transmit a negative acknowledgement for the downlink message during a subsequent TTI of the set of TTIs. The operations of block 2815 may be performed according to the methods described with reference to FIGS. 1 through 16. In certain examples, aspects of the operations at 2815 may be performed by a feedback component as described with reference to FIGS. 21 through 24.

At 2820, the UE 115 may receive a retransmission of the downlink message during a second TTI of the third subset of TTIs. The operations at 2820 may be performed according to the methods described with reference to FIGS. 1 through 16. In certain examples, aspects of the operations at 2820 may be performed by a downlink message component as described with reference to FIGS. 21 through 24.

Figure 29:
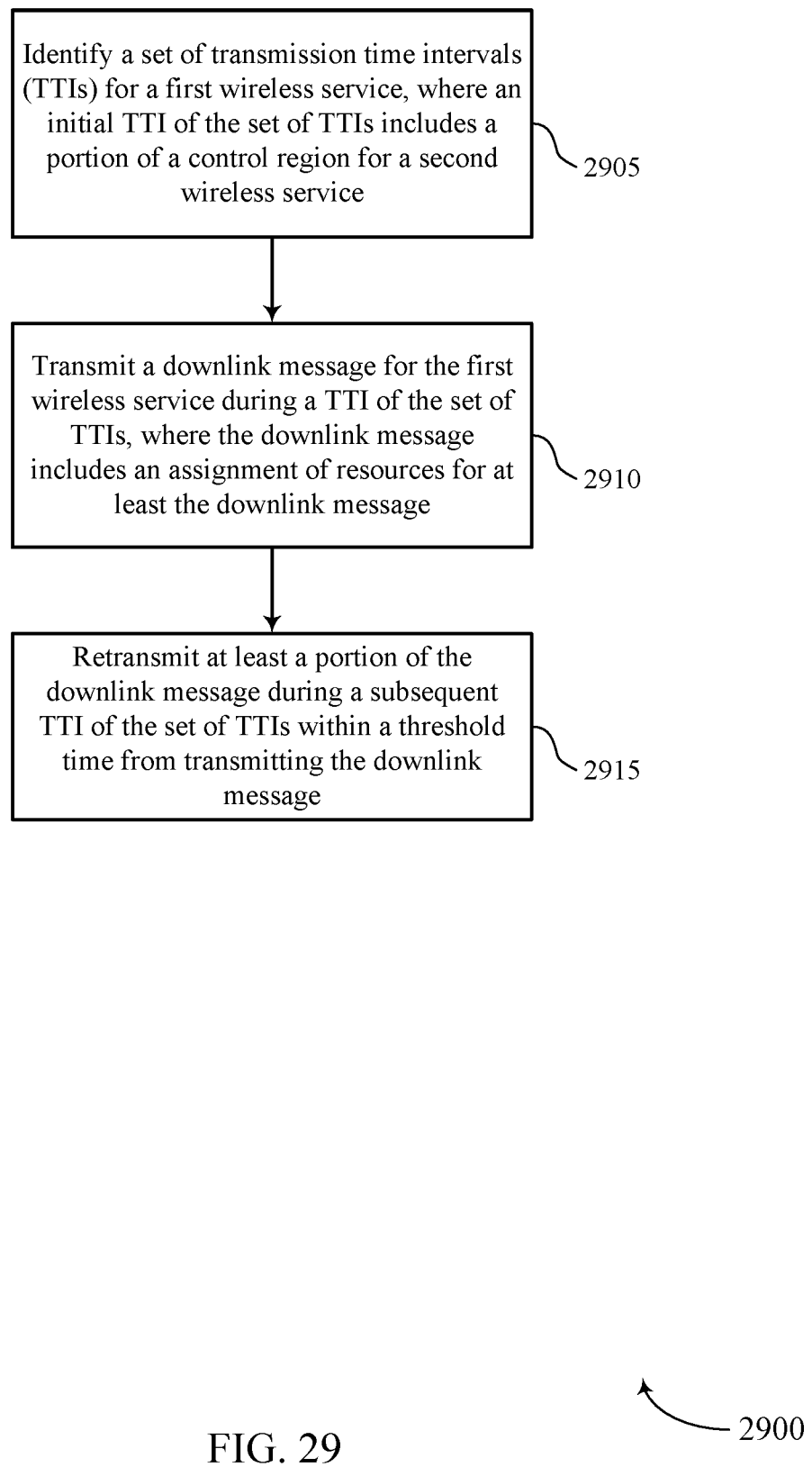

FIG. 29 shows a flowchart illustrating a method 2900 for downlink and uplink transmissions for high reliability low latency communications systems in accordance with aspects of the present disclosure. The operations of method 2900 may be implemented by a base station 105 or its components as described herein. For example, the operations of method 2900 may be performed by a base station wireless service manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At 2905, the base station 105 may identify a set of TTIs for a first wireless service, wherein an initial TTI of the set of TTIs comprises a portion of a control region for a second wireless service. The operations at 2905 may be performed according to the methods described with reference to FIGS. 1 through 16. In certain examples, aspects of the operations at 2905 may be performed by a resource component as described with reference to FIGS. 17 through 20.

At 2910, the base station 105 may transmit a downlink message for the first wireless service during a TTI of the set of TTIs, wherein the downlink message comprises an assignment of resources for at least the downlink message. The operations at 2910 may be performed according to the methods described with reference to FIGS. 1 through 16. In certain examples, aspects of the operations at 2910 may be performed by a grant component as described with reference to FIGS. 17 through 20.

At 2915, the base station 105 may retransmit at least a portion of the downlink message during a subsequent TTI of the set of TTIs within a threshold time from transmitting the downlink message. The operations at 2915 may be performed according to the methods described with reference to FIGS. 1 through 16. In certain examples, aspects of the operations at 2915 may be performed by a downlink message component as described with reference to FIGS. 17 through 20.

Figure 30:
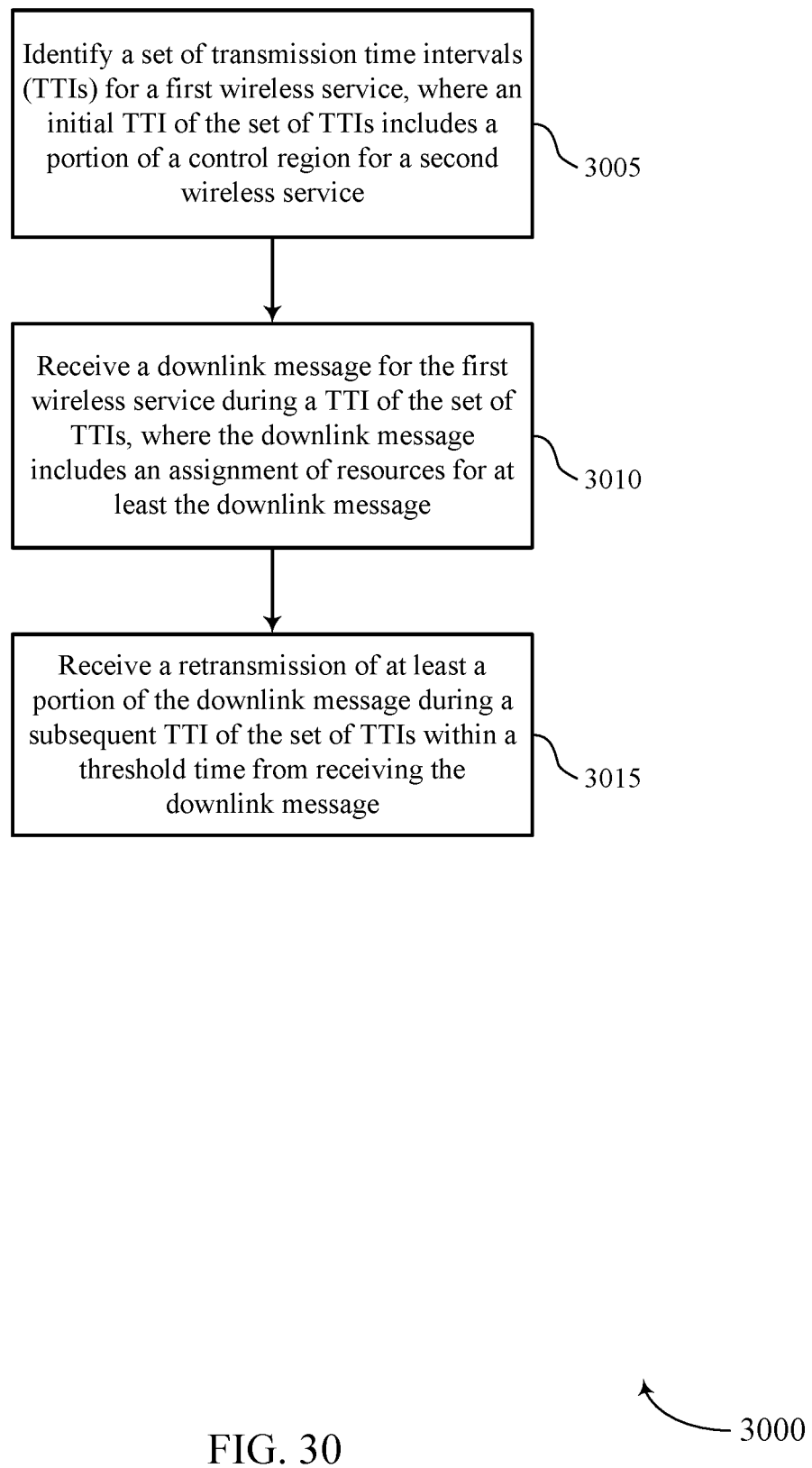

FIG. 30 shows a flowchart illustrating a method 3000 for downlink and uplink transmissions for high reliability low latency communications systems in accordance with aspects of the present disclosure. The operations of method 3000 may be implemented by a UE 115 or its components as described herein. For example, the operations of method 3000 may be performed by a UE wireless service manager as described with reference to FIGS. 21 through 24. In some examples, a UE 115 may execute a set of codes to control the functional elements of the device to perform the functions described below. Additionally or alternatively, the UE 115 may perform aspects of the functions described below using special-purpose hardware.

At 3005, the UE 115 may identify a set of TTIs for a first wireless service, wherein an initial TTI of the set of TTIs comprises a portion of a control region for a second wireless service. The operations at 3005 may be performed according to the methods described with reference to FIGS. 1 through 16. In certain examples, aspects of the operations at 3005 may be performed by a resource component as described with reference to FIGS. 21 through 24.

At 3010, the UE 115 may receive a downlink message for the first wireless service during a TTI of the set of TTIs, wherein the downlink message comprises an assignment of resources for at least the downlink message. The operations at 3010 may be performed according to the methods described with reference to FIGS. 1 through 16. In certain examples, aspects of the operations at 3010 may be performed by a grant component as described with reference to FIGS. 21 through 24.

At 3015, the UE 115 may receive a retransmission of at least a portion of the downlink message during a subsequent TTI of the set of TTIs within a threshold time from receiving the downlink message. The operations at 3015 may be performed according to the methods described with reference to FIGS. 1 through 16. In certain examples, aspects of the operations at 3015 may be performed by a downlink message component as described with reference to FIGS. 21 through 24.

Figure 31:
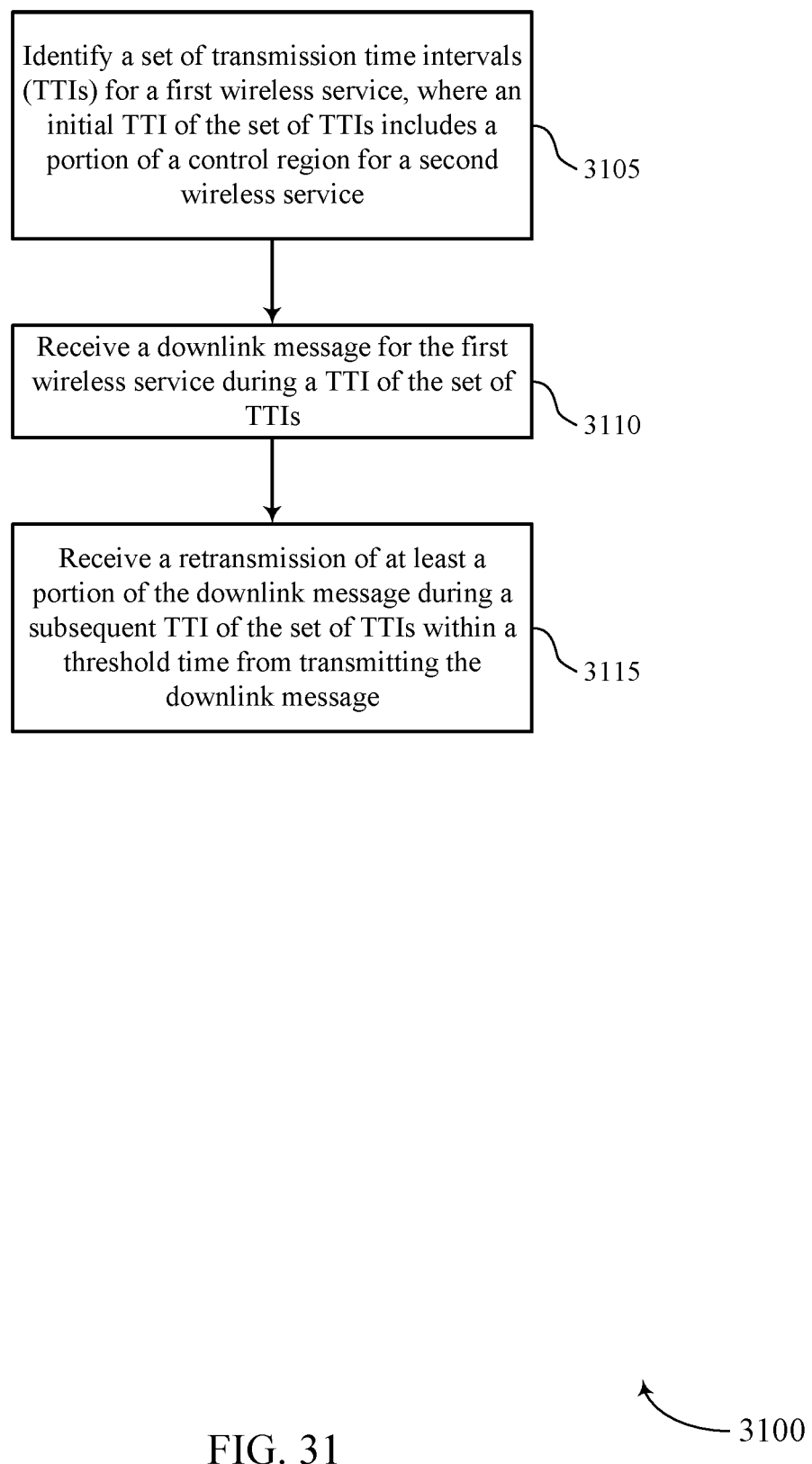

FIG. 31 shows a flowchart illustrating a method 3100 for downlink and uplink transmissions for high reliability low latency communications systems in accordance with aspects of the present disclosure. The operations of method 3100 may be implemented by a UE 115 or its components as described herein. For example, the operations of method 3100 may be performed by a UE wireless service manager as described with reference to FIGS. 21 through 24. In some examples, a UE 115 may execute a set of codes to control the functional elements of the device to perform the functions described below. Additionally or alternatively, the UE 115 may perform aspects of the functions described below using special-purpose hardware.

At 3105, the UE 115 may identify a set of TTIs for a first wireless service, wherein an initial TTI of the set of TTIs comprises a portion of a control region for a second wireless service. The operations at 3105 may be performed according to the methods described with reference to FIGS. 1 through 16. In certain examples, aspects of the operations at 3105 may be performed by a resource component as described with reference to FIGS. 21 through 24.

At 3110, the UE 115 may receive a downlink message for the first wireless service during a TTI of the set of TTIs. The operations at 3110 may be performed according to the methods described with reference to FIGS. 1 through 16. In certain examples, aspects of the operations at 3110 may be performed by a downlink message component as described with reference to FIGS. 21 through 24.

At 3115, the UE 115 may receive a retransmission of at least a portion of the downlink message during a subsequent TTI of the set of TTIs within a threshold time from transmitting the downlink message. The operations at 3115 may be performed according to the methods described with reference to FIGS. 1 through 16. In certain examples, aspects of the operations at 3115 may be performed by a retransmission scheduler as described with reference to FIGS. 21 through 24.

Figure 32:
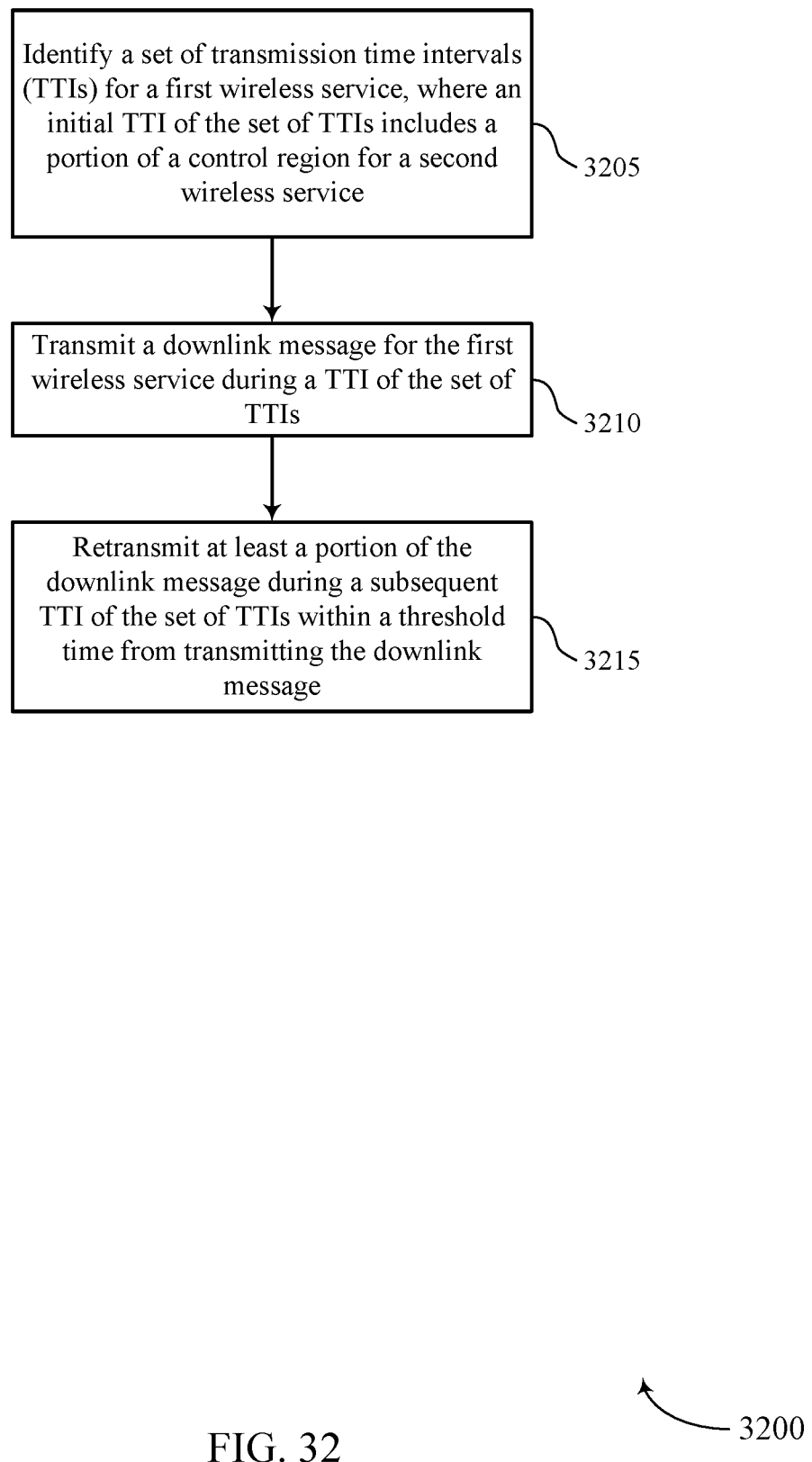

FIG. 32 shows a flowchart illustrating a method 3200 for downlink and uplink transmissions for high reliability low latency communications systems in accordance with aspects of the present disclosure. The operations of method 3200 may be implemented by a base station 105 or its components as described herein. For example, the operations of method 3200 may be performed by a base station wireless service manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At 3205, the base station 105 may identify a set of TTIs for a first wireless service, wherein an initial TTI of the set of TTIs comprises a portion of a control region for a second wireless service. The operations at 3205 may be performed according to the methods described with reference to FIGS. 1 through 16. In certain examples, aspects of the operations at 3205 may be performed by a resource component as described with reference to FIGS. 17 through 20.

At 3210, the base station 105 may transmit a downlink message for the first wireless service during a TTI of the set of TTIs. The operations at 3210 may be performed according to the methods described with reference to FIGS. 1 through 16. In certain examples, aspects of the operations at 3210 may be performed by a downlink message component as described with reference to FIGS. 17 through 20.

At 3215, the base station 105 may retransmit at least a portion of the downlink message during a subsequent TTI of the set of TTIs within a threshold time from transmitting the downlink message. The operations at 3215 may be performed according to the methods described with reference to FIGS. 1 through 16. In certain examples, aspects of the operations at 3215 may be performed by a retransmission scheduler as described with reference to FIGS. 17 through 20.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first set of downlink transmission time intervals (TTIs) for a first wireless service that is associated with a first latency and a second set of downlink TTIs for the first wireless service, wherein an initial TTI of each of the sets of downlink TTIs comprises a portion of a control region for a second wireless service that is associated with a second latency different than the first latency;
   transmitting a downlink message for the first wireless service during a TTI of the first set of downlink TTIs;
   receiving a negative acknowledgement for the downlink message during a subsequent TTI of the first set of downlink TTIs; and
   retransmitting the downlink message in the initial TTI of the second set of downlink TTIs comprising the portion of the control region.

2. The method of claim 1, wherein retransmitting the downlink message comprises:
   retransmitting the downlink message within one millisecond of transmitting the downlink message.

3. The method of claim 1, wherein transmitting the downlink message comprises:
   transmitting the downlink message during the control region of the first set of downlink TTIs.

4. The method of claim 1, wherein the control region comprises a physical downlink control channel (PDCCH) for the second wireless service.

5. The method of claim 1, wherein the initial TTI of each of the sets of downlink TTIs comprises at least two symbols.

6. The method of claim 1, wherein the first set of downlink TTIs and the second set of downlink TTIs each comprises fourteen symbols.

7. The method of claim 1, wherein the downlink message comprises data for the first wireless service.

8. The method of claim 1, wherein the first wireless service comprises an ultra-reliable, low-latency communication (URLLC) service.

9. A method for wireless communication, comprising:
identifying a first set of downlink transmission time intervals (TTIs) for a first wireless service that is associated with a first latency and a second set of downlink TTIs for the first wireless service, wherein an initial TTI of each of the sets of downlink TTIs comprises a portion of a control region for a second wireless service that is associated with a second latency different than the first latency;
receiving a downlink message for the first wireless service during a TTI of the first set of downlink TTIs;
transmitting a negative acknowledgement for the downlink message during a subsequent TTI of the first set of downlink TTIs; and
receiving a retransmission of the downlink message during the initial TTI of the second set of downlink TTIs comprising the portion of the control region.

10. The method of claim 9, wherein receiving the retransmission comprises:
receiving the retransmission of the downlink message within one millisecond of receiving the downlink message.

11. The method of claim 9, wherein receiving the downlink message comprises:
receiving the downlink message during the control region of the first set of downlink TTIs.

12. The method of claim 9, wherein the initial TTI of each of the sets of downlink TTIs comprises at least two symbols.

13. The method of claim 9, wherein the first set of downlink TTIs and the second set of downlink TTIs each comprises fourteen symbols.

14. The method of claim 9, wherein the downlink message comprises data for the first wireless service.

15. The method of claim 9, wherein the first wireless service comprises an ultra-reliable, low-latency communication (URLLC) service.

16. A method for wireless communication, comprising:
identifying a set of downlink transmission time intervals (TTIs) for a first wireless service that is associated with a first latency, wherein the set of downlink TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion associated with a second wireless service that is associated with a second latency different than the first latency;
transmitting a downlink message for the first wireless service during a first TTI of the third subset of TTIs;
receiving a negative acknowledgement for the downlink message during a subsequent TTI of the set of TTIs; and
retransmitting the downlink message during a second TTI of the third subset of TTIs.

17. The method of claim 16, wherein retransmitting the downlink message comprises:
retransmitting the downlink message within one millisecond of transmitting the downlink message.

18. The method of claim 16, further comprising:
receiving channel state information (CSI) with the negative acknowledgement.

19. The method of claim 16, wherein the third duration is less than or equal to one half of the second duration.

20. The method of claim 16, wherein the subsequent TTI is a TTI of the third subset of TTIs.

21. The method of claim 16, wherein the first duration comprises three symbols, the second duration comprises two symbols, and the third duration comprises one symbol.

22. The method of claim 16, wherein the portion associated with the second wireless service is a control region, wherein the control region comprises a physical downlink control channel (PDCCH) for the second wireless service.

23. The method of claim 16, wherein a timing gap between transmitting the downlink message and receiving the negative acknowledgement for the downlink message is based at least in part on the third duration.

24. A method for wireless communication, comprising:
identifying a set of downlink transmission time intervals (TTIs) for a first wireless service that is associated with a first latency, wherein the set of downlink TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion associated with a second wireless service that is associated with a second latency different than the first latency;
receiving a downlink message for the first wireless service during a first TTI of the third subset of TTIs;
transmitting a negative acknowledgement for the downlink message during a subsequent TTI of the set of TTIs; and
receiving a retransmission of the downlink message during a second TTI of the third subset of TTIs.

25. The method of claim 24, wherein receiving the retransmission comprises:
receiving the retransmission of the downlink message within one millisecond of receiving the downlink message.

26. The method of claim 24, further comprising:
transmitting channel state information (CSI) with the negative acknowledgement.

27. The method of claim 24, wherein the third duration is less than or equal to one half of the second duration.

28. The method of claim 24, wherein the subsequent TTI is a TTI of the third subset of TTIs.

29. The method of claim 24, wherein the first duration comprises three symbols, the second duration comprises two symbols, and the third duration comprises one symbol.

30. The method of claim 24, wherein the portion associated with the second wireless service is a control region, wherein the control region comprises a physical downlink control channel (PDCCH) for the second wireless service.

31. An apparatus for wireless communications, comprising:
a processor,
memory coupled with the processor; and
instructions stored in the memory and executable by the processor to cause the apparatus to:
identify a first set of downlink transmission time intervals (TTIs) for a first wireless service that is associated with a first latency and a second set of downlink TTIs for the first wireless service, wherein an initial TTI of each of the sets of downlink TTIs comprises a portion of a control region for a second wireless service that is associated with a second latency different than the first latency;

transmit a downlink message for the first wireless service during a TTI of the first set of downlink TTIs;

receive a negative acknowledgement for the downlink message during a subsequent TTI of the first set of downlink TTIs; and retransmit the downlink message in the initial TTI of the second set of downlink TTIs comprising the portion of the control region.

32. An apparatus for wireless communications, comprising:

a processor, memory coupled with the processor; and instructions stored in the memory and executable by the processor to cause the apparatus to:

identify a first set of downlink transmission time intervals (TTIs) for a first wireless service that is associated with a first latency and a second set of downlink TTIs for the first wireless service, wherein an initial TTI of each of the sets of downlink TTIs comprises a portion of a control region for a second wireless service that is associated with a second latency different than the first latency;

receive a downlink message for the first wireless service during a TTI of the first set of downlink TTIs;

transmit a negative acknowledgement for the downlink message during a subsequent TTI of the first set of downlink TTIs; and receive a retransmission of the downlink message during the initial TTI of the second set of downlink TTIs comprising the portion of the control region.

33. An apparatus for wireless communications, comprising:

a processor, memory coupled with the processor; and instructions stored in the memory and executable by the processor to cause the apparatus to:

identify a set of downlink transmission time intervals (TTIs) for a first wireless service that is associated with a first latency, wherein the set of downlink TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion associated with a second wireless service that is associated with a second latency different than the first latency;

transmit a downlink message for the first wireless service during a first TTI of the third subset of TTIs;

receive a negative acknowledgement for the downlink message during a subsequent TTI of the set of TTIs; and retransmit the downlink message during a second TTI of the third subset of TTIs.

34. An apparatus for wireless communications, comprising:

a processor, memory coupled with the processor; and instructions stored in the memory and executable by the processor to cause the apparatus to:

identify a set of downlink transmission time intervals (TTIs) for a first wireless service that is associated with a first latency, wherein the set of downlink TTIs comprises a first subset of TTIs each having a first duration, a second subset of TTIs each having a second duration that is less than the first duration, a third subset of TTIs each having a third duration that is less than the second duration, and an initial TTI having a duration equal to the first or the second duration and comprising a portion associated with a second wireless service that is associated with a second latency different than the first latency;

receive a downlink message for the first wireless service during a first TTI of the third subset of TTIs;

transmit a negative acknowledgement for the downlink message during a subsequent TTI of the set of TTIs; and receive a retransmission of the downlink message during a second TTI of the third subset of TTIs.

* * * * *